United States Patent [19]
Hasebe et al.

[11] Patent Number: 5,654,115
[45] Date of Patent: Aug. 5, 1997

[54] HYDROGEN-ABSORBING ALLOY FOR BATTERY, METHOD OF MANUFACTURING THE SAME, AND SECONDARY NICKEL-METAL HYDRIDE BATTERY

[75] Inventors: Hiroyuki Hasebe, Kawasaki; Shusuke Inada, Yokohama; Yoshiyuki Isozaki, Chigasaki; Takamichi Inaba; Takao Sawa, both of Yokohama; Hiromichi Horie, Yokosuka; Noriaki Yagi, Yokohama; Hiromi Shizu, Fujisawa; Yoshiko Kanazawa, Yokohama, all of Japan

[73] Assignee: Kabushiki Kaisha Toshiba, Kawasaki, Japan

[21] Appl. No.: 452,544

[22] Filed: May 30, 1995

Related U.S. Application Data

[63] Continuation of Ser. No. 120,412, Sep. 14, 1993, abandoned

[30] Foreign Application Priority Data

Sep. 14, 1992 [JP] Japan .................................. 4-271121
Mar. 11, 1993 [JP] Japan .................................. 5-050295

[51] Int. Cl.$^6$ ..................................................... H01M 4/02
[52] U.S. Cl. .............................. 429/218; 421/59; 421/101; 421/219; 421/221; 420/900
[58] Field of Search .................................. 429/59, 101, 223, 429/218, 219, 220, 221, 225; 420/900

[56] References Cited

U.S. PATENT DOCUMENTS

| | | |
|---|---|---|
| 4,605,603 | 8/1986 | Kanda ........................ 429/59 |
| 5,008,164 | 4/1991 | Furukawa et al. .................. 429/59 |
| 5,219,678 | 6/1993 | Hasebe et al. . | |

FOREIGN PATENT DOCUMENTS

| | | |
|---|---|---|
| 0 251 384 | 1/1988 | European Pat. Off. . |
| 0 420 669 | 4/1991 | European Pat. Off. . |
| 0 432 342 | 6/1991 | European Pat. Off. . |
| 63-264867 | 11/1988 | Japan . |
| 2-220356 | 9/1990 | Japan . |
| 2-301531 | 12/1990 | Japan . |
| 3-188236 | 8/1991 | Japan . |
| 4-358008 | 12/1992 | Japan . |
| 5-156382 | 6/1993 | Japan . |

OTHER PUBLICATIONS

JP 3188236, Aug. 16, 1991, abstract only.
Journal of Alloys and Compounds, 192(1993), pp. 176–178, R. Mishima, et al., "Hydrogen Storage Alloys Rapidly Solidified by the Melt–Spinning Method and Their Characteristics as Metal Hydride Electrodes" (month N/A).

*Primary Examiner*—M. Nuzzolillo
*Attorney, Agent, or Firm*—Oblon, Spivak, McClelland, Maier & Neustadt, P.C.

[57] ABSTRACT

A hydrogen-absorbing alloy for battery according to the present invention comprises an alloy having the composition represented by a general formula A $Ni_a$ $Mn_b$ $M_c$ [where, A is at least one kind of element selected from rare earth elements including Y (yttrium), M is a metal mainly composed of at least one kind of element selected from Co, Al, Fe, Si, Cr, Cu, Ti, Zr, Zn, Hf, V, Nb, Ta, Mo, W, Ag, Pd, B, Ga, In, Ge and Sn, $3.5 \leq a \leq 5$, $0.1 \leq b \leq 1$, $0 \leq c \leq 1$, $4.5 \leq a+b+c \leq 6$], wherein the alloy has columnar structures in which the area ratio of the columnar structures having the ratio of a minor diameter to a major diameter (aspect ratio) of 1:2 or higher is 50% or more. Further, an average minor diameter of the columnar structures is set to 30 microns or less. With this arrangement, there can be provided a nickel-metal hydride battery capable of satisfying the three leading characteristics of a high electrode capacity, long life and good rising-up all together.

26 Claims, 25 Drawing Sheets

HYDROGEN-ABSORBING ALLOY FOR BATTERY, METHOD OF MANUFACTURING THE SAME, AND SECONDARY NICKEL-METAL HYDRIDE BATTERY

This application is a Continuation of application Ser. No. 08/120,412, filed on Sep. 14, 1993, now abandoned.

BACKGROUND OF THE INVENTION

1. Field of the Invention

The present invention relates to a hydrogen-absorbing alloy for a battery, a method of manufacturing the same and a nickel-metal hydride battery using the alloy, and more specifically, to a hydrogen-absorbing alloy for a battery capable of, when applied to a negative electrode of the battery, satisfying all of the three leading characteristics or a high electrode capacity (battery capacity), long life (long cycle life) durable for repeated use and excellent initial activity as well as a stabilized electric potential (evenness of a voltage), a method of manufacturing the same and a secondary nickel-metal hydride battery.

2. Description of the Related Art

Recently, the miniaturization and portability of electronic appliances, which cannot be conventionally expected, has been achieved by the progress of a power saving technology and mounting technology realized by the progress of electronics. Under such a circumstance, a secondary battery used as a power source of these electronic appliances is required to have a large capacity and long life. For example, in the field of office automation appliances, telephone devices, audio/visual appliances having been developed for personal use and portable use, the development of battery having a high performance is desired to operate these appliance for a longer time without using a power supply cable. Although a non-sintering type nickel-cadmium battery having the electrode substrate, which is composed of three-dimensional structure, of a conventional sintering type nickel-cadmium battery has been developed, the capacity of this battery has not been remarkably increased.

Thus, there is recently proposed and highlighted a secondary alkaline battery (secondary nickel-metal hydride battery) using the hydrogen-absorbing alloy powder fixed to a collector as a negative electrode. The electrode used to this nickel-metal hydride battery is made by the following procedure. That is, hydrogen-absorbing alloy is melted by a high frequency induction melting method, arc melting method or the like and then cooled and pulverized and the thus obtained pulverized powder is added with an electric conductive agent and binder to form a kneaded material, and this kneaded material is coated to or pressingly attached to a collector. The negative electrode using the hydrogen-absorbing alloy is characterized in that it can not only increase an effective energy density per a unit weight or capacity but also has a less amount of poisonous property and a less possibility of environmental pollution as compared with cadmium used as a material for the negative electrode of a conventional typical secondary alkaline battery.

The negative electrode containing the hydrogen-absorbing alloy, however, is immersed into a thick alkaline solution as a battery electrolyte when it is assembled to a secondary battery as well as exposed to oxygen evolved from a positive electrode when the battery is excessively charged, and thus the hydrogen-absorbing alloy is corroded and the electrode characteristics thereof are liable to be deteriorated. Further, when the battery is charged, hydrogen is absorbed into and released from the hydrogen-absorbing alloy to cause the volume of the alloy to be expanded and shrank, and thus cracks are produced to the hydrogen-absorbing alloy, by which the pulverization of the hydrogen-absorbing alloy is progressed. When the pulverization of the hydrogen-absorbing alloy is progressed, the increase of the specific surface area of the hydrogen-absorbing alloy is accelerated, and thus the ratio of the surface area of the hydrogen-absorbing alloy deteriorated by the alkaline battery electrolyte is increased.

Moreover, since the electric conductivity between the hydrogen-absorbing alloy and the collector is also deteriorated, a cycle life is shortened as well as the electrode characteristics are also deteriorated.

To solve the above problems, although there are proposed such methods as providing the hydrogen-absorbing alloy with a multi-element structure, preventing the direct contact of the hydrogen-absorbing alloy with the battery electrolyte by covering a copper thin film or nickel thin film onto the surface of the hydrogen-absorbing alloy powder or the surface of a negative electrode containing the hydrogen-absorbing alloy by a plating method, vapor deposition method or the like to improve the corrosion resistance of the hydrogen-absorbing alloy, preventing cracks by increasing the mechanical strength of the hydrogen-absorbing alloy, or suppressing the deterioration of the surface of the hydrogen-absorbing alloy by drying the same after it has been immersed into an alkaline solution, these methods cannot always achieve a sufficient improvement and sometimes lower an electrode capacity on the contrary.

Further, as described above, although the electrode characteristics of the conventional hydrogen-absorbing alloy are deteriorated by a kind of corrosive reaction caused by the alkaline battery electrolyte, the battery electrolyte is consumed by the reaction. Therefore, the battery electrolyte in the conventional battery has an amount larger than that necessary to smoothly cause a battery reaction so that the battery reaction is not prevented even if the amount of the battery electrolyte is reduced to some extent. When, however, the amount of the electrolyte is increased and the surface of the hydrogen-absorbing alloy electrode is covered with it, the reaction speed for consuming an oxygen gas evolved in an excessively charged region is lowered, and thus a problem arises in that a battery internal pressure is increased.

Further, the aforesaid deterioration of the hydrogen-absorbing alloy is also a problem when battery is designed.

That is, a secondary alkaline battery is designed to sealed in such a manner that when the battery is discharged, a portion of the hydrogen-absorbing alloy electrode usually remains in a charged state and when the battery is charged, a portion of the hydrogen-absorbing alloy electrode partially remains in an uncharged state. Since, however, the hydrogen-absorbing alloy is deteriorated with the progress of charge and discharge, a large amount of the hydrogen-absorbing alloy must be contained so that the above relationship can be maintained even if the alloy is deteriorated in order to obtain a sufficient cycle life as a battery. Consequently, since the volume of a nickel electrode as a capacity-limiting electrode is reduced and the volume of the hydrogen-absorbing alloy electrode is increased, the increase of the battery capacity is prevented as well as a cost of the battery is increased because the hydrogen-absorbing alloy is expensive.

Incidentally, the aforesaid hydrogen-absorbing alloy is composed of, for example, $AB_2$ type or $A_2B$ type hydrogen-absorbing alloy represented by Zr-Ti-Mn-Fe-Ag-V-Al-W, $Ti_{15}Zr_{21}V_{15}Ni_{29}Cr_5Co_5Fe_1Mn_8$ and the like. These hydrogen-absorbing alloys are made by a usual method of pulverizing an alloy made by being melted and cast. When this series of alloys are used to a negative electrode, they exhibit a high electrode capacity and provide a good capacity of about 300 mAh/g, 400 mAh/g, respectively as well as almost all the metal materials constituting the alloys are less expensive.

These alloys, however, have a drawback in that they are generally difficult to be made to have a composition distributed uniformly. Further, a battery using this series of alloys as an electrode material has a drawback in that the battery has a delayed rising-up of a capacity, and thus a high electrode capacity can be obtained for the first time after an activating operation (charge/discharge operation) of several tens of cycles is repeated after the battery has been assembled. Moreover, this series of alloys also have a drawback in that discharging characteristics are bad in a large current and further a voltage greatly drops at a low temperature. That is, this series of the alloys cannot achieve the high capacity in the three leading characteristics or a high electrode capacity, long life and excellent initial activity, whereas they cannot satisfy the technical requirements in the aspect of the initial activity (rising-up property).

On the other hand, there is an $AB_5$ type alloy represented by $LaNi_5$ as another hydrogen-absorbing alloy used to secondary alkaline battery. A negative electrode using this series of an alloy having a hexagonal-crystal structure has the feature that it can increase the effective energy density per a unit weight or unit volume of a battery and a battery capacity as well as has a less possibility to cause the environmental pollution due to cadmium and the like and good battery characteristics when compared with the case in which cadmium as a conventional typical negative electrode material for secondary alkaline battery is used. Further, the battery using the $AB_5$ type alloy has an advantage that it can discharge a large current. In this connection, an $AB_5$ type hydrogen-absorbing alloy composed of Mm-Ni-Co-Al alloy (Mm is referred to as misch metal) has a low electrode capacity of less than 200 mAh/g and a cycle life determined by charge/discharge is about 400 cycles, which does not reach the level for satisfying the electrode capacity and cycle life needed by the recent technical requirements.

Thus, a technology of relatively increasing the content ratio of the A site is also employed to increase the electrode capacity of the battery using the $AB_5$ type hydrogen-absorbing alloy. According to this technology, although the electrode capacity can be increased by about 30%, a drawback arises in that the charge/discharge cycle life is shortened.

Further, there is also employed a technology for increasing the amount of La content in misch metal (Mm: a mixture of rare earth elements containing 10–50 wt % of La, 5–60 wt % of Ce, 2–10 wt % of Pr, 10–45 wt % of Nd and the like) constituting the A component. That is, it is possible to increase the electrode capacity by about 30% by using misch metal containing an reduced amount of a Ce element and a relatively increased amount of La. In this case, however, it is also difficult to increase the cycle life.

As described above, a hydrogen-absorbing alloy suitable for secondary nickel-metal hydride battery for satisfying the electrode capacity, cycle life, initial rising-up characteristics and stability of electric potential required by the recent technical level is not yet realized for practical use.

SUMMARY OF THE INVENTION

A first object of the present invention made to solve the above problems is to provide a hydrogen-absorbing alloy for battery capable of satisfying three leading characteristics of a high electrode capacity, long life and good rising-up together, a method of manufacturing the same and a secondary nickel-metal hydride battery using the hydrogen-absorbing alloy.

A second object of the present invention is to provide a hydrogen-absorbing alloy for battery particularly excellent in long life characteristics when used as a negative electrode activating material of a secondary nickel-metal hydride battery and a secondary nickel-metal hydride battery using the hydrogen-absorbing alloy.

A third object of the present invention is to provide a secondary nickel-metal hydride battery having a high capacity and long life and further made by low cost by using a hydrogen-absorbing alloy having a less amount of deterioration and limiting the amount of a battery electrolyte and an electrode capacity ratio.

To achieve the first object, the inventors selected an $AB_5$ type hydrogen-absorbing alloy as an object to be studied, taking into consideration the point that an electrode capacity can be easily increased and the point that hydrogen can be absorbed/released in the vicinity of an ordinary temperature and ordinary pressure. Then, the inventors trially made hydrogen-absorbing alloys having various compositions by substituting the components of the $AB_5$ type alloy for various elements and changing manufacturing methods and studied the effect of the compositions, manufacturing methods, heat treatment conditions and the like of the hydrogen-absorbing alloys on battery characteristics. As a result, a knowledge as described below was obtained step by step.

First, an invention for achieving the first object will be described. It is found that when a part of the $AB_5$ type hydrogen-absorbing alloy is substituted for Mn, an electrode capacity can be greatly improved to about 280 mAh/g. The inventors find, however, the fact that when a substituted amount of Mn exceeds a predetermined amount, the corrosion resistance of the hydrogen-absorbing alloy is lowered and the life characteristics of a battery using the hydrogen-absorbing alloy are lowered on the contrary.

More specifically, a problem is made clear that the corrosion caused by a thick alkaline solution as the battery electrolyte of a secondary alkaline battery is liable to progress particularly when the solution coexists with oxygen produced when the battery is excessively charged, and thus the battery characteristics are deteriorated.

Then, the inventors studied the reason why the life characteristics of the battery is lowered by the addition of Mn. When the elements constituting various $AB_5$ type alloy structures added with Mn were analyzed by an X-ray microanalyzer, there was confirmed the tendency that an amount of segregated Mn was increased in each alloy structure with the increase in the substituted amount of Mn. When assumed from this tendency, it was found that the reduced life of battery progressed with the increase in the substituted amount of Mn was mainly caused by the segregations of Mn.

That is, when a casting method having a low cooling capability as a conventional method of manufacturing hydrogen-absorbing alloy is used, since crystals are grown isotropic in a cooling process, particle boundaries are liable to be made irregular in the particles of a hydrogen-absorbing alloy as well as the alloy exists in a liquid phase state for a long time, and thus segregations are liable to be made to particle boundaries. Further, even if columnar crystals are partially formed by using a casting method having a high cooling capability, the crystal growth with columnar structure in a minor diameter direction is progressed, segregation is promoted and the corrosion resistance of an alloy is liable to be lowered. Further, Mn has a feature that it is more embrittle than other alloy-constituting elements. As a result, the segregations on the particle boundaries act as a starting point of corrosion as well as a mechanical strength is lowered by the segregations, and thus the alloy is remarkably pulverized.

Further, it is supposed that the segregations in the hydrogen-absorbing alloy are liable to form a local battery, Mn is solved out into an alkaline battery electrolyte by the electric erosive action thereof and Mn on the surface of the alloy is changed to $Mn(OH)_2$ to thereby accelerate the corrosion of the alloy, and thus the amount of hydrogen absorbed to the hydrogen-absorbing alloy itself is reduced and a battery capacity is lowered by electrode exfoliated from the hydrogen-absorbing alloy by being corroded. Further, it is also supposed that the pulverization of the alloy is accelerated by the reduced strength of the particle boundaries caused by the segregation, and thus the deterioration of battery characteristics is progressed with age.

From the facts mentioned above, it can be expected to obtain a hydrogen-absorbing alloy having a high capacity and long life by reducing the segregations of Mn.

Thus, the following methods were executed by the inventors as a trial to reduce the segregations of Mn:

(1) when an alloy material was melted, it was put into a crucible after it had been pulverized as much as possible and sufficiently mixed. The alloy material was relatively well mixed in a molten state, however, segregations were formed in the size of from several tens of microns to several hundreds of microns when cooled;

(2) when the alloy material was melted, a resistance heating member was not used but a high frequency induction heating apparatus was used and the molten alloy was forcibly stirred, and in this case, although the alloy was very uniformly stirred in a molten state, segregations were formed in the size of from several tens of microns to several hundreds of microns when cooled;

(3) when a molten alloy was cast, it was homogenized by lowering the viscosity of the molten alloy by increasing the temperature thereof as high as possible and in this case, however, segregations were formed in the size of from several tens of microns to several hundreds of microns when cooled; and (4) after the molten alloy had been cast, it was subjected to a heat treatment (e.g., at 1000° C. for 8 hours) to reduce the segregations, and in this case, although the effect of the heat treatment was large, segregations of the size of several tens of microns remained.

As described above, even if a processing was executed by any one of the methods or by combining two or more of the methods, required characteristics could not be sufficiently satisfied although segregations were reduced.

As a result of the various studies of countermeasures for preventing the segregations of Mn and the like effected by the inventors, at first, the inventors employed a method of quenching an molten alloy having a predetermined composition containing Mn at a quenching rate of 1000°–1200° C./sec. which was higher than that of a conventional casting method.

Although this method could reduce the segregations of Mn, it also could not satisfy the required characteristics.

Thus, the experiment was further continued by employing a high quenching rate of 1800° C./sec. or more. As a result, it was discovered that the result of the experiment was completely different from that obtained from the low quenching rate in the range of 1000°–1200° C./sec. More specifically, it was discovered that when the quenching rate was 1800° C./sec. or higher, the maximum value of the Mn concentration distributed in the alloy was 1.3 times or less the average value of the Mn concentration in the entire alloy as well as the maximum diameter of Mn segregated in the alloy was 0.5 micron or less.

Further, it was found that when the alloy having the above Mn distribution was applied to secondary nickel-metal hydride battery, the charge/discharge cycle life characteristics of the battery was greatly improved without lowering capacity characteristics.

Here, first, the distribution of the Mn concentration will be described. In the hydrogen-absorbing alloy in which the maximum value of the Mn concentration distributed in the alloy exhibits a value exceeding 1.3 times the average value of the Mn concentration in the entire alloy, locations having a partially large Mn concentration are scattered in the alloy.

When the alloy is used to the negative electrode of nickel-metal hydride battery, a corrosive reaction is liable to be caused in these locations and the deterioration of the hydrogen-absorbing alloy itself is liable to be progressed. Further, when the locations having the different Mn concentration exist as described above, the degree of expansion/shrinkage of the volume of the hydrogen-absorbing alloy caused by the hydrogen absorption/release due to a battery reaction is partially different, and thus the pulverization of the alloy is liable to be progressed by the stress caused in the alloy. Therefore, the deterioration of the hydrogen-absorbing alloy is further progressed-by the increase in the specific surface area resulting from the pulverization.

The above phenomenon is difficult to be caused in the hydrogen-absorbing alloy in which the maximum value of the Mn concentration distributed in the alloy exhibits a value 1.3 times or less the average value of the Mn concentration in the entire alloy. Consequently, it is supposed that when this alloy is applied to a negative electrode, the progress of corrosion of the alloy can be suppressed and the cycle life characteristics of the nickel-metal hydride battery is improved.

FIG. 29 shows the relationship between the ratio of the maximum value of the Mn concentration in the alloy to the average value of the Mn concentration in the entire alloy and the cycle life of the battery obtained from the experiment of the inventors.

The graph of FIG. 29 shows that a peculiar point exists in the vicinity of the point where the maximum value of the Mn concentration is 1.3 times the average value thereof. That is, the inventors have discovered for the first time the fact that battery life characteristics are greatly changed on the boundary of the peculiar point where the maximum value of the Mn concentration reaches 1.3 time the average value thereof.

Next, the maximum diameter of segregated Mn will be described. Since the hydrogen-absorbing alloy in which the segregated Mn has a maximum diameter of 0.5 micron has a large segregated portion, when this alloy is used to a nickel-metal hydride battery, the segregated point acts as the starting point of a corrosive reaction and the deterioration of the alloy itself is liable to be progressed. Further, when the alloy is expanded/shrank by the hydrogen absorption/release caused by a battery reaction, since stress is concentrated to the Mn segregated point, cracks are liable to be caused from the segregated point and pulverization is further progressed.

On the other hand, the above phenomenon is difficult to be caused in the hydrogen-absorbing alloy in which the segregated Mn has a maximum diameter 0.5 micron or less.

Therefore, it is supposed that when this alloy is applied to the negative electrode of a nickel-metal hydride battery, the progress of corrosion of the negative electrode is suppressed and thus the cycle life characteristics of the nickel-metal hydride battery is improved.

FIG. 30 shows the result of measurement of the maximum Mn diameter segregated in the alloy and the cycle life of the electrode using this alloy obtained by an experiment.

It is found from the graph shown in FIG. 30 that a peculiar point exists in the vicinity of the location where the maximum value of Mn segregated in the alloy is 0.5 micron. That is, the inventors have discovered for the first time the fact that a battery life is greatly changed on the boundary of the peculiar point where the maximum diameter of segregated Mn is 0.5 micron.

As described above, the inventors have found for the first time that the peculiar points exist between the distribution of the Mn concentration and the maximum diameter of segregated Mn and the required characteristics of battery and that hydrogen-absorbing alloy must be prepared by quenching a molten alloy at a quenching rate of 1800° C./sec. or higher to achieve the uniformity of the Mn concentration and the reduction of segregations, and thus the above object cannot be achieved by the conventional low quenching rate of about 1000°–1200° C./sec.

Further, a columnar crystal structure with a special or novel shape could be made for the first time by the high quenching rate of 1800° C./sec. or higher (refer to Table 11).

The columnar crystal structure with the novel shape is composed of crystal particles in which the ratio of minor diameter (width) to major diameter (length) (aspect ratio) of columnar crystal particles is 1:2 or higher. Then, it has been discovered that when the ratio of fine columnar crystals occupying in the cross section of the pulverized particles of the alloy is 50% or higher, preferably 70% or higher and more preferably 80% or higher, a higher electrode capacity and longer life cycle can be achieved at the same time. That is, it has been discovered for the first time that when the above fine columnar crystal structure is formed, the high electrode capacity of 240 mAh/g or more and long cycle life of 500 times or more are achieved at the same time.

That is, as a result of the various studies effected by the inventors, it has been discovered that the characteristics of the hydrogen-absorbing alloy as a negative electrode material can be greatly improved by forming fine crystal particles having a predetermined feature in the alloy by a rapidly-quenched method from the melt at a quenching rate of 1800° C./sec. or higher.

As a result of the examination effected by the inventors, the hydrogen-absorbing alloy made by the rapidly-quenched method from the melt can effectively prevent the segregations of Mn and the like.

Further, the inventors have obtained the knowledge that a hydrogen-absorbing alloy for battery more excellent in characteristics can be obtained by removing the fine internal distortion produced by a rapid quenching process, by taking attention to the internal distortion. More specifically, when an alloy material in a molten state is rapidly quenched by the above method, the quenching is rapidly executed by forming many crystal nuclei, different from a casting method, and thus distortion is liable to be made in the interior of the alloy by the quenching. It is found that hydrogen is difficult to enter into the interior of such alloy and to exit therefrom due to the formation of the internal distortion, by which battery characteristics are degraded.

Thus, as a result of various studies, the inventors have obtained the knowledge that in the case of the hydrogen-absorbing alloy according to the present invention having formed once the fine crystal structure by the rapidly-quenched method from the melt, the internal distortion can be removed while keeping the uniformity of the alloy by only subjecting the alloy to a heat treatment within the temperature range of 200°–500° C. which is far lower than a recrystallizing temperature for a short time, thus a hydrogen-absorbing alloy for battery more excellent in the characteristics can be obtained.

More specifically, it has been found that the mitigation of the internal distortion by the heat treatment enables hydrogen to more easily enter into and exit from the interior of the alloy so that the characteristics of a negative electrode material can be further improved. At least one hour is necessary for the heat treatment.

The present invention has been completed based on the above various knowledges and findings. That is, a first hydrogen-absorbing alloy according to the present invention comprises an alloy having the composition represented by a general formula $A Ni_a Mn_b M_c$ [where, A is at least one kind of element selected from rare earth elements including Y (yttrium), M is a metal mainly composed of at least one kind of element selected from Co, Al, Fe, Si, Cr, Cu, Ti, Zr, Zn, Hf, V, Nb, Ta, Mo, W, Ag, Pd, B, Ga, In, Ge and Sn, $3.5 \leq a \leq 5$, $0.1 \leq b \leq 1$, $0 \leq c \leq 1$, $4.5 \leq a+b+c \leq 6$], wherein the alloy has a columnar structure in which the area ratio of columnar structure having the ratio of a minor diameter to a major diameter (aspect ratio) of 1:2 or higher is 50% or more. More specifically, an electrode capacity is increased by substituting a portion of the B component of an $AB_5$ type hydrogen-absorbing alloy for Mn as well as a hydrogen-absorbing- alloy with a novel shape capable of forming an electrode having a long cycle life is formed.

Further, when the above alloy is made by the rapidly quenching process, the rapidly-quenched molten alloy preferably has a thickness set to 10–150 microns. In addition, the columnar crystals preferably have an average minor diameter of 30 microns or less.

A second hydrogen-absorbing alloy according to the present invention comprises an alloy having the composition represented by a general formula $A Ni_a Mn_b M_c$ [where, A is at least one kind of element selected from rare earth elements including Y (yttrium), M is a metal mainly composed of at least one kind of element selected from Co, Al, Fe, Si, Cr, Cu, Ti, Zr, Zn, Hf, V, Nb, Ta, Mo, W, Ag, Pd, B, Ga, In, Ge and Sn, $3.5 \leq a \leq 5$, $0.1 \leq b \leq 1$, $0 \leq c \leq 1$, $4.5 \leq a+b+c \leq 6$], wherein when the characteristic X-ray intensity of Mn contained in the alloy is observed by an X-ray microanalyzer in the respective unit regions of the alloy obtained by vertically and horizontally dividing into 100 portions the observation regions of the alloy each composed of a cross sectional area of 20 microns×20 microns, the maximum value among the characteristic X-ray intensities of Mn in the respective observation regions is 1.3 times or less the average value of the characteristic X-ray intensities of Mn in the respective observation regions. The aforesaid value of (the maximum value of the Mn concentration in the alloy) /(the average value of the Mn concentration in the alloy) can approximate (the maximum value among the characteristic X-ray intensities of Mn in the respective unit regions)/ (the average value of the characteristic X-ray intensities of Mn in the respective unit regions) when observed by the X-ray microanalyzer in the respective unit regions of the alloy obtained by vertically and horizontally dividing into 100 portions the observation regions of the alloy each composed of a cross sectional area of 20 microns×20 microns. In the present invention, this value is set to 1.3 or less, and more preferably set to 1.2 or less.

Further, a third hydrogen-absorbing alloy according to the present invention comprises an alloy having the composition represented by a general formula A $Ni_a Mn_b M_c$ [where, A is at least one kind of element selected from rare earth elements including Y (yttrium), M is a metal mainly composed of at least one kind of element selected from Co, Al, Fe, Si, Cr, Cu, Ti, Zr, Zn, Hf, V, Nb, Ta, Mo, W, Ag, Pd, B, Ga, In, Ge and Sn, $3.5 \leq a \leq 5$, $0.1 \leq b \leq 1$, $0 \leq c \leq 1$, $4.5 \leq a+b+c \leq 6$], wherein the maximum diameter of the Mn particles segregated in the alloy is 0.5 micron or less.

A first manufacturing method of a hydrogen-absorbing alloy for battery according to the present invention comprises the step of injecting a molten alloy having the composition represented by a general formula A $Ni_a Mn_b M_c$ [where, A is at least one kind of element selected from rare earth elements including Y (yttrium), M is a metal mainly composed of at least one kind of element selected from Co, Al, Fe, Si, Cr, Cu, Ti, Zr, Zn, Hf, V, Nb, Ta, Mo, W, Ag, Pd, B, Ga, In, Ge and Sn, $3.5 \leq a \leq 5$, $0.1 \leq b \leq 1$, $0 \leq c \leq 1$, $4.5 \leq a+b+c \leq 6$] onto the traveling surface of a cooling roll(s) rotating at a high speed and rapidly quenching and solidifying the molten alloy at a quenching rate of 1800° C./sec. or higher to form the hydrogen-absorbing alloy.

A second manufacturing method of a hydrogen-absorbing alloy for battery according to the present invention comprises the steps of rapidly quenching a molten metal having the aforesaid composition at a quenching rate of 1800° C./sec. or higher and subjecting the thus obtained rapidly-quenched molten alloy to a heat treatment at the temperature range of from 200°–500° C. for at least one hour to form a hydrogen-absorbing alloy for battery.

Further, the rapid quenching process of the molten alloy is preferably executed in vacuum or an atmosphere of an inert gas such as Ar. In addition, the heat treatment is preferably executed in vacuum or an inert gas atmosphere.

In the first to third hydrogen-absorbing alloys for battery according to the present invention, when $Ni_a Mn_b M_c$ are represented by B, the alloy composition according to the present invention is $AB_{4.5}$–$AB_6$ from $4.5 \leq a+b+c \leq 6$.

When the composition ratio x of B (i.e., the value of a+b+c) is other than the above range, the amount of phases (for example, phases composed of AB, $AB_2$, $AB_3$, $A_2B_7$ and the like and a phase composed of a single element constituting a B site, [hereinafter, referred to as a second phase]) other than $AB_{4.5}$–$AB_6$ created in the alloy is increased.

When the amount of the second phase other than $AB_x$ is increased in the alloy, the ratio of the alloy phases which have two or more different compositions including the second phase and come into contact with one another is increased in the hydrogen-absorbing alloy. The boundaries of the alloy phases having the different compositions are weak in a mechanical strength and cracks are liable to be made from these boundaries by the absorption/release of hydrogen.

Further, segregations are liable to be made to the boundaries and the hydrogen-absorbing alloy is liable to be corroded from the segregations. Further, the second phase absorbs a less amount of hydrogen as compared with $AB_x$ when used as an electrode, and thus when an alloy including a large amount of the second phase as the electrode, an electrode capacity per a unit volume is reduced. In any way, when the hydrogen-absorbing alloy is used as an electrode material, it reduces the electrode capacity and life.

After all, the reason why the value of x is limited is as follows. When x is less than 4.5, a hydrogen-absorbing alloy which is less corroded when a battery is charged/discharged and difficult to be cracked and pulverized cannot be obtained. On the other hand, when x exceeds 6, the creation of the second phase is admitted in an alloy making method which can be usually employed in the industry and thus the characteristics of the hydrogen-absorbing alloy cannot be improved.

Therefore, although the value of x or (a+b+c) is set within the range of 4.5–6, it is preferably 4.6–5.6 and more preferably within the range of 5.05–5.5.

The component A constituting A $Ni_a Mn_b M_c$ according to the present invention shows at least one kind selected from rare earth elements including Y (specifically, Y, La, Ce, Pr, Nd, Pm, Sm, Eu, Gd, Tb, Dy, Ho, Er, Tm, Yb, Lu). Note, since rare earth elements of high purity or a rare earth element as a single element are very expensive. Thus, the material cost of the hydrogen-absorbing alloy can be greatly reduced by using a misch metal (hereinafter, abbreviated as Mm or Lm) as a mixture of a plurality of rare earth elements. A composition containing La of 10–50 wt %, Ce of 5–60 wt %, Pr of 2–10 wt %, Nd of 10–45 wt % is usually used as the Mm.

Further, the reason why the value of the composition ratio a of Ni is limited within the range of 3.5–5 is as follows. When the value a is set to less than 3.5, the electrode capacity is lowered, whereas when the value a exceeds 5, the mixing ratio of other alloy components is relatively lowered and thus the capacity is difficult to be increased.

Further, since Mn is effective to increase the capacity of the negative electrode containing the hydrogen-absorbing alloy and reduce a hydrogen absorption/release pressure (equilibrium pressure), it is used as an essential element constituting the alloy of the present invention. Mn is added within such a range that the constitution ratio b thereof is 0.1–1.0. When the constitution ratio b exceeds 1, the alloy electrode is liable to be pulverized and its cycle life is shortened, and thus the upper limit of the constitution ratio b is set to 1. On the other hand, when the constitution ratio b of Mn is less than 0.1, the improvement of the electrode capacity as one of the objects of the present invention cannot be achieved.

Further, the component M in a general formula shows a metal mainly composed of at least one kind of element selected from Co, Al, Fe, Si, Cr, Cu, Ti, Zr, Zn, Hf, V, Nb, Ta, Mo, W, Ag, Pd, B, Ga, In, Ge and Sn. The elements Co, Al, Fe, Si, Cr, Cu of the component M are particularly effective to extend the life of the hydrogen-absorbing alloy. The M component is added within such a range that the constitution ratio c thereof is 1 or less. When the constitution ratio c exceeds 1, the capacity of the electrode formed of the alloy lowered, and thus the upper limit of the constitution ratio c is set to 1.

Further, when the alloy is made by using a rapidly-quenched method from the melt, a life can be extended to some extent because segregations are prevented. Therefore, the lower limit of the composition ratio c of the component M is set to 0.

Al of the component M has a function for lowering the hydrogen absorbing/releasing pressure (dissociation) in the same way as Mn as well as can increase durability.

Further, Co of the component M is effective to improve the corrosion resistance of the alloy against a battery electrolyte and the like and the pulverization of the alloy is greatly suppressed by it. More specifically, when the substituted amount of Co is increased, the cycle life is increased but there is the tendency that the electrode capacity and the high rate discharge ability are lowered, and thus the substituted amount of Co must be optimized in accordance with the application of battery.

In addition to the above, the hydrogen-absorbing alloy according to the present invention may contain at least one kind of element selected from Pb, C, N, O, F Cl, S, P and the like as impurities in the range by which the characteristics of the alloy of the present invention is not obstructed.

The content of the impurities is preferably in the range of 6000 ppm or less, more preferably 5000 ppm or less and still more preferably 4000 ppm.

Although a method of manufacturing the hydrogen-absorbing alloy for battery according to the present invention is not particularly limited so long as it can make a uniform alloy composition, prevent segregations and obtain the crystal structure according to the present invention, the hydrogen-absorbing alloy can be stably manufactured in a large amount by using a molten-metal-rapidly-quenching method such as a single roll method, double roll method and the like to be describe below in detail with reference to drawings and optimizing the material of a cooling roll(s), rotating speed of the cooling roll(s) (peripheral speed of the traveling surface thereof), a molten alloy temperature, kind of gas in a cooling chamber, pressure, amount of the molten alloy to be injected.

Single Roll Method

FIG. 1 shows a hydrogen-absorbing alloy manufacturing apparatus using the single roll method. This manufacturing apparatus comprises a cooling roll 5 composed of copper, nickel or the like excellent in thermal conductivity and having a diameter of about 300 mm and a molten metal injection nozzle 4 for injecting a molten hydrogen-absorbing alloy 3 supplied from a ladle 2 to the traveling surface of the cooling roll 5 after storing the same. The cooling roll 5 and the like are accommodated in a cooling chamber 1 adjusted to vacuum or an inert gas atmosphere. Further, although the rotating speed of the cooling roll 5 depends upon the wetting property thereof, cooling speed and an injection amount of the molten hydrogen-absorbing alloy, it is generally set to 300-5000 rpm.

In the aforesaid manufacturing apparatus shown in FIG. 1, when the molten hydrogen-absorbing alloy 3 supplied from the ladle 2 is injected onto the traveling surface of the cooling roll 5 through the molten metal injection nozzle 4, the molten alloy is solidified from the surface thereof in contact with the cooling roll 5, crystals begin to be grown and the solidification of the molten metal is perfectly completed before it leaves from the cooling roll 5. Thereafter, the molten metal is further cooled while it flies in the cooling chamber 1 so that a hydrogen-absorbing alloy 6 is made which has the uniform concentration of constituting elements, a less amount of segregations and crystals grown in the same direction.

Double Roll Method

FIG. 2 shows a hydrogen-absorbing alloy manufacturing apparatus using the double roll method. This manufacturing apparatus comprises a pair or more of cooling rolls 5a, 5b disposed in a cooling chamber 1 so that the respective traveling surfaces thereof are confronted to each other, a melting furnace 7 for preparing a molten hydrogen-absorbing alloy 3 by melting material metals, and a molten metal injection nozzle 4 for injecting the molten hydrogen-absorbing alloy 3 supplied from the melting furnace 7 between the cooling rolls 5a, 5b through a tundish 8.

The cooling rolls 5a, 5b are composed of a material excellent in thermal conductivity such as copper, nickel or the like and having a diameter of about 50 mm. These cooling rolls 5a, 5b are rotated at a high speed of about 300-2000 rpm while keeping a fine gap d of about 0-0.5 mm therebetween.

Note, although traveling surfaces of the cooling rolls are parallel to each other as shown in FIG. 2, a so-called shape roll in which the cross section of the traveling surface thereof is formed to a U-shape or V-shape may be employed. Further, when the gap d between the cooling rolls 5a, 5b is excessively large, since the molten alloy is not quenched in the same direction and as a result a hydrogen-absorbing alloy having a columnar structure whose growing direction is disturbed is made, the gap d is preferably set to 0.2 mm or less. Further, when the gap d is excessively large, since a quenching rate is lowered and the segregations of Mn are accelerated, the uniformity of the Mn concentration is lowered and a hydrogen-absorbing alloy having segregated particles of Mn grown to a large size on particle boundaries is made, and thus the gap d is set to 0.2 mm or less.

In the aforesaid manufacturing apparatus shown in FIG. 2, when the molten hydrogen-absorbing alloy 3 is injected in the direction between the cooling rolls 5a, 5b from the injection nozzle 4, it is solidified from the sides thereof in contact with the cooling roll 5a, 5b on the both sides, crystals begin to be grown and the solidification of the molten metal is perfectly completed before it leaves from the cooling rolls 5a, 5b. Thereafter, the molten metal is further quenched while it flies in the cooling chamber 1 so that a hydrogen-absorbing alloy 6 is made which has a less amount of segregations and a columnar structure according to the present invention.

Rotating Disc Method

FIG. 32 shows a hydrogen-absorbing alloy particles manufacturing apparatus using a rotating disc method. This manufacturing apparatus comprises a rotary disc member 9 as a high speed rotary member disposed in a cooling chamber 1 in an argon gas atmosphere and a molten metal injection nozzle 4 for temporarily storing a molten hydrogen-absorbing alloy supplied from a ladle 2 and further injecting the same onto the traveling surface of the rotary disc member 9. The rotary member 9 is composed of a ceramics or metal material having a relatively low wetting property to a molten metal to prevent the molten hydrogen-absorbing alloy 3 from adhering to and solidifying on the rotary member 9.

In the manufacturing apparatus shown in FIG. 32, when the molten hydrogen-absorbing alloy 3 supplied from the ladle 2 is injected onto the traveling surface of the rotary disc member 9 from the molten metal injection nozzle 4, it is finely dispersed by the moving force of the rotary member 9 and spheroidized by the surface tension of itself while frying in the cooling chamber 1 without coming into contact with the inner surface of the cooling chamber 1 and further solidified by being quenched by the atmosphere gas such as the argon gas or the like. As a result, hydrogen-absorbing alloy particles 6 each having a spherical shape covered with a free cooling surface are made. The hydrogen-absorbing alloy particles 6 are collected into a particle collection vessel 10 disposed on the bottom of the cooling chamber 1.

Gas Atomizing Method

FIG. 33 shows a hydrogen-absorbing alloy particle manufacturing apparatus using a gas atomizing method. This manufacturing apparatus comprises a melting furnace 24 for heating and melting a metal material disposed in a cooling chamber 1 in an argon gas atmosphere by a heater 23 and preparing a molten hydrogen-absorbing alloy 3, a molten metal injection nozzle 4 formed on the bottom of the melting furnace 24 and having an inner diameter of about 2 mm, a plurality of inert gas nozzles 25 disposed in the vicinity of the lower end opening of the molten metal injection nozzle 4 in confrontation therewith to inject an cooling inert gas such as an argon gas or the like, and a shut-off valve 26 for opening/closing the molten metal injection-nozzle 4.

In the manufacturing apparatus shown in FIG. 33, when the argon gas is supplied to the melting furnace 24 in which the molten hydrogen-absorbing alloy 3 is accommodated, the liquid surface of the molten alloy 3 in the melting furnace 24 is pressurized and the molten alloy 3 is injected from the front end opening of the molten metal nozzle 4 on the bottom of the melting furnace 24. At this time, the inert gas nozzles 25, which are disposed substantially perpendicularly to the direction in which the molten alloy 3 is injected, inject the inert gas such as the argon gas or the like toward the injected molten alloy at a high speed. With this operation, the molten hydrogen-absorbing alloy 3 is atomized and dispersed by the inert gas in the cooling chamber 1 without coming into contact with the inner wall thereof and quenched and solidified while being flown downwardly along the revolution flow of the inert gas. As a result, hydrogen-absorbing alloy particles 6 each having a spherical shape covered with a free cooling surface are made.

When a ribbon-shaped, flake-shaped or particle-shaped hydrogen-absorbing alloy is made by using the aforesaid molten-metal-rapidly-quenching method, equi-axed crystals and columnar structure are made in an alloy structure depending upon the conditions of the material of the cooling roll and rotary disk, quenching rate of the molten alloy and the like.

The first to third hydrogen-absorbing alloys of the present invention are suitably obtained by rapidly quenching molten alloy particularly at a quenching rate of 1800° C./sec. or higher. Further, when the hydrogen-absorbing alloy is made by rapidly quenching the molten alloy at the quenching rate of 1800° C./sec. or higher, the respective crystal particles constituting the alloy are finely crystallized to about 1–100 microns so that the strength of the alloy is increased and the disturbance of particle boundaries is reduced, and thus an amount of hydrogen to be absorbed is increased and the electrode capacity can be increased.

The above columnar structure is particularly developed in the first hydrogen-absorbing alloy for battery according to the present invention.

It has been confirmed by the experiment effected by the inventors that since the columnar structure has crystals grown in the same direction different from those in the equi-axed crystal structure, grain boundaries are less disturbed, an amount of hydrogen to be absorbed is increased and the electrode capacity can be increased. More specifically, in the columnar structure, since the paths of hydrogen molecules or hydrogen atoms are formed along the boundaries of the columnar structure, hydrogen can be easily absorbed to and released from the alloy to thereby increase the electrode capacity. Further, segregations are greatly reduced in the columnar structure. Therefore, a local battery is not formed by the segregations and the reduction of life due to the pulverization of the alloy can be effectively prevented.

In the crystal structure of the hydrogen-absorbing alloy made by the rapidly-quenched method from the melt, the area ratio of the columnar structure must be 50% or more, preferably 70% or more and more preferably 80% or more in the cross section in the thickness direction of the hydrogen-absorbing alloy, from the view point of increasing battery characteristics when the alloy is assembled to a battery as a hydrogen-absorbing alloy electrode. When the area ratio of columnar structure is 50% or more, the cycle life of a negative electrode using the alloy is extended than that of a negative electrode using a hydrogen-absorbing alloy made by a casting method. When the rapidly-quenched molten alloy is entirely formed of columnar structure, segregations are particularly reduced so that the capacity and life of an alloy electrode can be further improved. On the other hand, when the area ratio is less than 50%, there is no remarkable difference between the cycle life of the negative electrode using the above alloy and that of the negative electrode using the alloy made by the casting method. That is, the excellent battery characteristics that the electrode capacity is 240 mAh/g or more and the cycle life is 500 times or more can be simultaneously obtained by using the hydrogen-absorbing alloy of the present invention made by the above molten-metal-rapidly-quenching method and having the area ratio of the columnar structure of 50% or more in the cross section in the thickness direction of the alloy. The more preferable value of the electrode capacity is 250 mAh/g or more and the still more preferable value thereof is 255 mAh/g. Further, the more preferable value of the cycle life is 550 times or more and the still more preferable value thereof is 600 times or more.

Here, the columnar structure is defined as columnar crystal particles having a ratio of minor diameter to major diameter (aspect ratio) of 1:2 or higher.

The method of manufacturing the hydrogen-absorbing alloy according to the present invention will be described in more detail.

The hydrogen-absorbing alloy for battery having the developed columnar structure and a reduced amount of the segregations of Mn and the like as described above is made by strictly controlling the conditions for preparing and quenching a molten alloy in the single roll method or double roll method or the like.

More specifically, although the molten alloy may be prepared by accommodating a hydrogen-absorbing alloy (mother alloy) having the above composition previously made by the casting method in a melting crucible and melting the same by high frequency induction heating, it is also possible that respective constituting elements are directly put into a crucible after the substituted amounts thereof have been adjusted to prepare the molten alloy without using the mother alloy. At this time, it is preferable to add some elements such as, for example, rare earth elements and Mn having a high vapor pressure in a slightly greater amount in the elements constituting the hydrogen-absorbing alloy. That is, an adjustment is preferably made so that the change of the alloy composition caused by the volatilization of the elements having the high vapor pressure is prevented and the hydrogen-absorbing alloy having been rapidly quenched has a target composition.

The thus obtained molten alloy is injected onto the traveling surface (cooling surface) of the cooling roll(s) at a predetermined pressure and rapidly quenched and solidified to be made to the ribbon-shaped or flake-shard hydrogen-absorbing alloy. At this time, columnar structure are grown from the surface of the cooling roll(s) toward the high temperature portion of the molten alloy, that is, in the vertical direction with respect the surface of the cooling roll(s). To enable the columnar structure to be sufficiently grown, the thickness of the ribbon-shaped or flake-shaped hydrogen-absorbing alloy is set to the range of 10–150 microns and preferably to the range of 15–100 microns and the peripheral speed of the traveling surface of the cooling roll(s) is set to the range of 5–15 m/sec. in the case of a copper roll and to the range of 8–30 m/sec. in the case of an iron roll. When the peripheral speed of the cooling roll(s) is less than the lower limit of the above range, the molten alloy is quenched at a low quenching rate and a columnar structure cannot be sufficiently developed in the range of the above thickness. On the other hand, when the peripheral speed of the cooling roll(s) exceeds the upper limit of the above range, the molten alloy is driven off from the cooling roll(s) at the moment it comes into contact therewith, and thus the molten metal is not sufficiently quenched by the cooling roll(s) so that the ratio of equi-axed crystals is increased. As a result, the columnar structure having the area ratio of 50% in the thickness direction thereof cannot be obtained, any way.

Further, the quenching rate for rapidly quenching the molten alloy is preferably 1800° C./sec. or higher as described above. When the quenching rate is less than 1800° C. sec., the formation of the columnar structure with the special shape as described above is impossible. The quenching rate is preferably set to 2000° C./sec. or higher and more preferably to 2400° C./sec. or higher.

The above rapidly-quenching process of the molten metal is preferably executed in an inert gas atmosphere of Ar or He and in particular in vacuum to prevent the deterioration of the molten alloy by oxidation. That is, when the rapidly-quenching process is executed in the inert gas atmosphere, an inert gas may be rolled in between the cooling roll(s) and the molten alloy, and thus the conditions for achieving a sufficient quenching effect is narrowed. On the other hand, when the processing is executed in vacuum, the inert gas is not rolled in on the contrary to the case described above, and thus the molten metal is sufficiently quenched on the surface of the cooling roll(s).

Further, a material such as Cu group alloy, Fe group alloy, Ni group alloy or the like excellent in thermal conductivity is used as the material constituting the cooling roll. Further, a cooling roll composed of the above material and having a surface hardened by the formation of Cr plating or the like may be used.

Further, quartz generally used conventionally may be used as the material for constituting the crucible for preparing the molten alloy. A quartz crucible, however, has a drawback in that since it does not produce heat when heated by high frequency induction heating, the molten metal is cooled by the quartz when passing through the outlet of the crucible and thus the outlet is liable to be closed. The closing of the outlet can be effectively prevented by using a crucible formed of ceramics of such as Ti-boride or the like excellent in heat conductivity.

Since the hydrogen-absorbing alloy prepared by the above molten-metal-rapidly-quenching method has a fine crystal structure and a less amount of segregations of Mn or the like, when a negative electrode is formed of it, the electrode capacity may be improved to the level of 240 mAh/g or more and cycle life characteristics to the level of 500 cycles or more at the same time. Further, the inventors have found from the experiment that a hydrogen-absorbing alloy for battery having more excellent characteristics can be obtained by removing the internal distortion of the alloy produced by the rapidly-quenching processing, by paying attention to the internal distortion.

Thus, in the present invention, the above internal distortion is removed by subjecting the hydrogen-absorbing alloy with the above composition prepared by the molten-alloy-rapidly quenching processing to a heat treatment at a relatively low temperature of 200°–500° C. for one hour or longer. More specifically, as a result of the further studies of the inventors, a new knowledge has been obtained that the capacity and life of the hydrogen-absorbing alloy of the present invention prepared at the aforesaid quenching rate of 1800° C./sec. are further improved together by being subjected to the heat treatment.

When the heat treatment temperature is less than 200° C., the internal distortion is difficult to be removed, whereas when it exceeds 500° C., the composition of the alloy is changed by the evaporation of the alloy components such as Mn and the like or an alloy strength is lowered by a secondary recrystallization. Therefore, the heat treatment temperature is set to the range of 200°–500° C. In particular, the range of 250°–350° C. is preferable to improve electrode characteristics.

Further, when the heat treatment time is shorter than one hour, the effect for removing the internal distortion is reduced. On the other hand, when the heat treatment is executed for a longer time, there is a possibility that the size of crystal particles is increased and thus the heat treatment time is preferably about 2–5 hours by taking a manufacturing effect into consideration.

Note, the heat treatment atmosphere is preferably composed of an inert gas or vacuum to prevent the oxidation of the hydrogen-absorbing alloy at a high temperature.

As described above, the internal distortion of the hydrogen-absorbing alloy can be effectively removed by the heat treatment of the alloy effected at the relatively low temperature while keeping the homogeneity thereof, and thus the electrode capacity and life can be further extended. In particular, although the effect of the heat treatment is low in a rapidly-quenched molten alloy having a composition not containing Mn, when the rapidly-quenched molten alloy of the present invention having the composition containing Mn is subjected to the heat treatment, the electrode capacity and battery life thereof can be greatly improved together.

Next, a fourth hydrogen-absorbing alloy of the present invention for achieving the above second object will be described.

At least 90 wt % of the fourth hydrogen-absorbing alloy of the present invention is composed of $AB_x$ of single phase [where, A is at least one kind of element selected from rare earth elements including Y (yttrium), B is a metal mainly composed of Ni and at least one kind of element selected from Co, Al, Fe, Si, Cr, Cu, Mn, Ti, Zr, Zn, Hf, V, Nb, Ta, Mo, W, Ag, Pd, B, Ga, In, Ge and Sn, $5.05 \leq x \leq 6$].

At least 90% of the fourth hydrogen-absorbing alloy for battery of the present invention must have the single phase composed of the $AB_x$. If a phase (for example, phases composed of B, AB, $AB_2$, $AB_3$, $A_2B_7$, $AB_5$, $AB_{1.4}$ and the like [hereinafter referred to a second phase]) other than the above phase composed of $AB_x$ exceeds 10 wt % in the alloy, there are increased chances in which two or more kinds of alloy phases having a different composition come into contact with each other. The boundaries of the alloy phases having the different composition have a weak mechanical strength and cracks are liable to be formed from these boundaries as hydrogen is absorbed and released.

Further, segregations are liable to be produced to the boundaries and the alloy is liable to be corroded from the segregations. Further, the second phase absorbs a less amount of hydrogen as compared with $AB_x$ when used as an electrode, and thus when an alloy including the second phase in an amount exceeding 10 wt % is used as electrode, the electrode capacity per a unit volume is reduced.

Further, the reason why the value of x is limited is as follows. When x is less than 5.05, a hydrogen-absorbing alloy which is less corroded when battery is charged/discharged and difficult to be cracked and pulverized cannot be obtained. On the other hand, when x exceeds 6, the creation of the second phase is admitted in the alloy making method which can be usually employed in the industry and thus the characteristics of the hydrogen-absorbing alloy cannot be improved.

A constituting the $AB_x$ ($5.05 \leq x \leq 6$) shows at least one kind selected from rare earth elements including Y (specifically, Y, La, Ce, Pr, Nd, Sm, Eu, Gd, Tb, Dy, Ho, Er, Tm, Lu).

Further, the element B shows a metal mainly composed of Ni and at least one kind selected from Co, Al, Fe, Si, Cr, Cu, Mn, Ti, Zr, Zn, Hf, V, Nb, Ta, Mo, W, Pd, B, Ga, In, Ge and Sn. In the present invention, so long as the crystal system of the alloy maintains a $CaCu_5$ system, the type of crystals is not a problem, but it preferably forms columnar structure.

When a hydrogen-absorbing alloy for battery is made from a molten alloy having the composition exhibiting $AB_x$ by the method of manufacturing the hydrogen-absorbing alloy according to the present invention by using various kinds of molten-metal-rapidly-quenching methods, the aforesaid hydrogen-absorbing alloy can be stably obtained, and thus this manufacturing method is suitable. The molten-metal-rapidly-quenching method includes the above rotating disk method, single- roll method, double roll method, gas atomizing method and the like.

Next, a secondary nickel-metal hydride battery (cylindrical secondary nickel-metal hydride battery) according to the present invention using the above first to fourth hydrogen-absorbing alloys as a negative electrode activating material will be described below with reference to FIG. 3.

A hydrogen-absorbing alloy electrode (negative electrode) 11 containing the hydrogen-absorbing alloy is wound with a non-sintering type nickel electrode (positive electrode) 12 to a spiral-shape with a separator 13 disposed therebetween and contained in cylindrical container 14 having a bottom. An alkaline battery electrolyte is contained in the container 14.

A disc-shaped opening seal plate 16 having a hole 15 defined at the center thereof is disposed on the upper opening of the container 14. A ring-shaped insulating gasket 17 is interposed between the peripheral edge of the seal plate 16 and the inner surface of the upper opening of the container 14 to fix the opening seal plate 16 to the container 14 in a gas-tight state through the gasket 17 by narrowing the diameter of the above upper opening inwardly by caulking. A positive electrode lead 18 has an end connected to the positive electrode 12 and the other end connected to the lower surface of the opening seal plate 16. A hat-shaped positive electrode terminal 19 is mounted on the opening seal plate 16 to cover the hole 15. A rubber safety valve 20 is disposed in the space surrounded by the opening seal plate 16 and positive electrode terminal 19 to close the hole 15. An insulating tube 21 is attached to the vicinity of the upper end of the container 14 to fix the positive electrode terminal 19 and a collar 22 disposed on the upper end of the container 14.

The above hydrogen-absorbing alloy electrode 11 includes a paste type and a non-paste type as described below:

(1) a paste type hydrogen-absorbing alloy electrode is made in such a manner that a hydrogen-absorbing alloy powder obtained by pulverizing the above hydrogen-absorbing alloy, a polymer binder and an electric conductive powder added when necessary are mixed to make a paste and the paste is coated to and filled with an electric conductive substrate as a collector and dried and then pressed by a roller press or the like; and (2) a non-paste type hydrogen-absorbing alloy electrode is made in such a manner that the hydrogen-absorbing alloy powder, polymer binder and electric conductive powder added when necessary are stirred and dispersed to the electric conductive substrate as a collector and then pressed by a roller press or the like.

As a method of pulverizing the hydrogen-absorbing alloy, there are employed a mechanical pulverizing method effected by a ball mill, pulverizer, jet mill or the like and a method of causing the hydrogen-absorbing alloy to absorb/release high pressure hydrogen and pulverizing the same by the expansion of the volume thereof at the time.

The polymer binder includes, for example, sodium polyacrylate, polytetrafluoroethylene (PTFE), carboxymethyl cellulose (CMC), polyvinyl alcohol (PVA) and the like. Each of these polymer binders in the range of 0.5–5 weight parts is preferably combined with 100 weight parts of the hydrogen-absorbing alloy. When, however, the non-paste type hydrogen-absorbing alloy electrode of the above item (2) is to be made, polytetrafluoroethylene (PTFE) is preferably used as the polymer binder because PTFE is made to fibers by being stirred and can fix the hydrogen-absorbing alloy powder and the electric conductive powder added when necessary to a three-dimensional state (mesh-state).

The electric conductive powder includes, for example, a carbon powder such as a graphite powder, ketchen black and the like and a metal powder such as a nickel powder, copper powder, cobalt powder and the like. Each of these electric conductive powders in the range of 0.1–5 weight parts is preferably combined with 100 weight parts of the hydrogen-absorbing alloy.

The electric conductive substrate includes, for example, a two-dimensional substrate such as a punched metal, expanded metal, wire net and the like and a three-dimensional substrate such as a foamed metal substrate, net-shaped sintered fiber substrate, plated-felt substrate composed of a non-woven fabric to which metal is plated, and the like. When, however, the non-paste type hydrogen-absorbing alloy electrode of the above item (2) is made, the two-dimensional substrate is preferably used as the electric conductive substrate because a combined material containing the hydrogen-absorbing alloy powder is dispersed.

The non-sintering type nickel electrode 12 combined with the hydrogen-absorbing alloy electrode is made in such a manner that a paste is prepared by suitably combining the mixture of nickel hydroxide, cobalt hydroxide ($Co(OH)_2$) added when necessary and cobalt monoxide (CoO), metallic cobalt and the like with polyacrylate such as carboxymethyl cellulose (CMC), sodium polyacrylate and the like, and the paste is filled with the three-dimensional substrate such as the foamed metal substrate, net-shaped sintered fiber substrate, plated-felt substrate composed of the non-woven fabric to which metal is plated, and the like and dried and then pressed by the roller press or the like.

A non-woven fabric composed of polymer fibers used as the separator 13 includes simple polymer fibers such as nylon, polypropylene, polyethylene and the like and complex polymer fibers mixed with these polymer fibers.

Used as the alkali battery electrolyte is, for example, a 6N to 9N potassium hydroxide solution or the potassium hydroxide solution mixed with lithium hydroxide, sodium hydroxide or the like.

Next, a nickel-metal hydride battery achieving the third object of the present invention will be described.

In the secondary nickel-metal hydride battery according to the present invention, an alloy made by a molten-metal-rapidly-quenching method is used a hydrogen-absorbing alloy constituting a hydrogen-absorbing alloy electrode. Further, the amount of the battery electrolyte of the secondary nickel-metal hydride battery composed by using the hydrogen-absorbing alloy electrode is within the range of 0.4–1.8 ml/Ah with respect to the capacity of the hydrogen-absorbing alloy electrode and further the capacity ratio of an alloy in an uncharged state in the battery discharged state of the hydrogen-absorbing electrode to the capacity of a nickel electrode is set within the range of 1.1–2.0. The hydrogen-absorbing alloy is made by the aforesaid molten-metal-rapidly-quenching method such as the rotating disc method, single roll method, double roll method, gas atomizing method and the like.

The reason why the amount of the battery electrolyte is limited to the above range in the relationship with the hydrogen-absorbing alloy electrode is as follows. When the amount of the battery electrolyte is less than 0.4 ml/Ah, the area in which the hydrogen-absorbing alloy electrode is in contact with the battery electrolyte is reduced, and thus a smooth battery reaction is prevented and the capacity of the nickel electrode constituting the battery cannot be sufficiently extracted, with the result of the reduction of the battery capacity. When the amount of the battery electrolyte exceeds 1.8 ml/Ah, the surface of the hydrogen-absorbing alloy electrode is covered with an excessive battery electrolyte and thus the smooth reduction of the oxygen gas evolved from the nickel electrode is prevented in an excessively charged state. As a result, a battery inner pressure is increased and battery characteristics are deteriorated together with the operation of the safety valve.

The reason why the capacity ratio of an alloy in an uncharged state in the battery discharged state of the hydrogen-absorbing electrode to the capacity of a nickel electrode is set within the above range is as follows. When the capacity ratio is less than 1.1, since the battery capacity is limited by the capacity of the hydrogen-absorbing alloy electrode, the battery inner pressure is increased at the end of charge/discharge operation unless a special charge/discharge method is employed, and thus the battery characteristics are deteriorated together with the operation of the safety valve. On the other hand, when the capacity ratio exceeds 2.0, the battery internal pressure is slightly increased, because the volume of the vacant space in the battery is reduced as well as the volume occupied by the hydrogen-absorbing electrode is increased in the battery container. As a result, the amount of the nickel electrode as a volume-limited electrode is reduced with reduction of the battery capacity.

The first to third hydrogen-absorbing alloys composed as described above are an $AB_5$ type alloy containing Mn as an essential element and excellent in the cycle life and initial characteristics with a high capacity, and further can provide the negative electrode material with a stable charging potential for nickel-hydrogen battery. These alloys can be obtained by rapidly quenching a molten alloy having a predetermined composition at a quenching rate of 1800° C./sec. or higher.

In addition, when thus prepared alloy is further subjected to a heat treatment at a relatively low temperature of about 200°–500° C., the internal distortion of the alloy can be effectively eliminated while keeping the homogeneity of the alloy, whereby there can also be provided a further improved nickel-metal hydride battery excellent in battery characteristics.

Although the reason why the first hydrogen-absorbing alloy with the above crystal structure has the aforesaid excellent characteristics is not clear, it is supposed to be resulted from the following operation. That is, in the columnar structure in which the crystals of the hydrogen-absorbing alloy are grown in the same direction, the alloy is expanded and shrank in a given direction as it absorbs and releases hydrogen, and thus the pulverization of the alloy is suppressed by the reduction of the stress in the alloy. As a result, since the increase of the area of the alloy in contact with the battery electrolyte is suppressed, the corrosion of the alloy is prevented. Further, in the hydrogen-absorbing alloy made by the conventional casting method, segregations are dispersed to particle boundaries from which corrosion begins.

It is supposed, however, that in the columnar structure having crystals grown from the quenched surface in the same direction as in the case of the present invention, the segregations of elements are concentrated to the particular locations of the alloy as the crystals are grown, and thus the locations from which corrosion begins are reduced. Therefore, the cycle characteristics of the secondly nickel-metal hydride battery to which the electrode containing the hydrogen-absorbing alloy is assembled are greatly improved.

The dispersion of a Mn concentration with respect to the second hydrogen-absorbing alloy according to the present invention will be described. An alloy, in which the maximum value of the Mn concentrations distributed therein exhibits a value exceeding 1.3 times the average value of the Mn concentrations in the entire alloy, has the locations in which partially large Mn concentrations are dispersed in the alloy. When the alloy is used to the negative electrode of the nickel-metal hydride battery, a corrosion reaction is liable to be caused in these locations and the thus the deterioration of the hydrogen-absorbing alloy itself is liable to be progressed.

Further, since the degree of expansion/shrinkage of the hydrogen-absorbing alloy volume caused by the hydrogen absorption/release due to an electrode reaction is made partially different by the existence of the locations having the different Mn concentrations, stress is produced in the alloy and pulverization is liable to be progressed to thereby increase a specific surface area, and thus the deterioration of the hydrogen-absorbing alloy is further accelerated.

The above phenomenon is difficult to be caused in an alloy in which the maximum value of the Mn concentrations distributed therein exhibits a value of 1.3 times or less the average value of the Mn concentrations in the entire alloy. Therefore, it is supposed that when this alloy is applied to a negative electrode, the progress of corrosion of the alloy is suppressed so that the cycle life characteristics of the nickel-metal hydride battery are improved.

Next, the maximum diameter of Mn segregations according to the third hydrogen-absorbing alloy of the present invention will be described. When an alloy, in which the maximum diameter of Mn segregations exceeds 0.5 micron, is used to the nickel-metal hydride battery, a corrosive reaction begins from the segregations because a segregated portion has a large size, and thus the deterioration of the hydrogen-absorbing alloy itself is liable to be progressed. Further, when the alloy is expanded/shrank by the hydrogen absorption/release due to an electrode reaction, since stress is concentrated to the segregated points of Mn, cracks are liable to be made from the segregated points to thereby further accelerate pulverization.

On the other hand, the above phenomenon is difficult to be caused in a hydrogen-absorbing alloy in which the maximum diameter of Mn segregations is 0.5 micron or less. Therefore, it is supposed that when this alloy is applied to the negative electrode of a nickel-metal hydride battery, the progress of corrosion of the negative electrode alloy is suppressed so that the cycle life characteristics of the nickel-metal hydride battery are improved.

Further, when the fourth hydrogen-absorbing alloy according to the present invention at least 90 wt % of which is composed of $AB_x$ of single phase [where, A is at least one kind of element selected from rare earth elements including Y (yttrium), B is a metal mainly composed of Ni and at least one kind of element selected from Co, Al, Fe, Si, Cr, Cu, Mn, Ti, Zr, Zn, Hf, V, Nb, Ta, Mo, W, Ag, Pd, B, Ga, In, Ge and Sn, $5.05 \leq x \leq 6$] is used as an activating material to form an electrode and a battery is arranged by using the electrode, a corrosion resistance to a thick alkaline battery electrolyte can be greatly improved. As a result, a secondary alkaline battery (e.g., secondary nickel-metal hydride battery) in which characteristics such as a cycle life and the like are improved can be realized.

Although the reason why the hydrogen-absorbing alloy with the alloy composition of the $AB_x$ of the single phase has the excellent corrosion resistance is not clear, this is supposed to be resulted from the following behavior.

That is, in a hydrogen-absorbing alloy whose crystal structure is found not to include a $CaCu_5$ type single phase but include a plurality of phases in an amount of 10 wt % or more when observed by an X-ray diffraction, there are increased chances in which alloy phases having a different composition come into contact with each other. The boundaries between the alloy phases having the different composition have a weak mechanical strength and cracks are liable to be made from the boundaries as hydrogen is absorbed/released. Further, corrosion is liable to be made to the boundaries due to segregations. Further, corrosion is liable to be made to the boundaries by the segregations. In addition, the phases having a composition other than $AB_x$ absorb a less amount of hydrogen ions as compared with the phase having $AB_x$ when used as an electrode. As a result, when the secondary nickel-metal hydride battery to which the electrode containing the hydrogen-absorbing alloy as the activating material is assembled is evaluated, not only the improvement of life is not admitted but also the reduction of capacity is admitted.

From the mentioned above, when at least 90 wt % of the hydrogen-absorbing alloy is composed of the $AB_x$ of the single phase, cracks and Corrosion can be suppressed and life can improved when the alloy is used as electrode. Further, since a hydrogen-absorbing alloy having a non-stoichiometric composition, although the crystal structure thereof is the $CaCu_5$ type, makes distortion in crystals, the alloy endures the expansion/shrinkage due to hydrogen absorption/release and as a result it can extend a cycle life of the electrode. Further, hydrogen is smoothly dispersed. As a result, when this hydrogen-absorbing alloy is assembled to battery, it has an effect to improve large current discharge characteristics.

On the other hand, the hydrogen-absorbing alloy made by the molten-metal-rapidly-quenching method can homogenize a composition as well as pulverize a crystal size and further suppress solidification and segregation when the alloy is quenched as compared with the hydrogen-absorbing alloy made by the conventional method of melting a material in a crucible in an inert gas atmosphere or vacuum and then casing the same to a casting mold. As a result, when an electrode is formed by using the hydrogen-absorbing alloy as an activating material and a battery is arranged by using the electrode, a speed of corrosion caused by an alkaline battery electrolyte can be reduced.

When the secondary nickel-metal hydride battery is arranged by using the negative electrode containing the hydrogen-absorbing alloy made by the molten-metal-rapidly-quenching method, however, there is a case wherein when a battery design similar to that applied to the alloy made by the conventional method is used, not only the feature of the hydrogen-absorbing alloy made by the molten-metal-rapidly-quenching method cannot not be exhibited but also particularly when the amount of a battery electrolyte is excessively large, even the battery characteristics of the alloy made by the conventional method cannot be reproduced.

From the mentioned above, the secondary nickel-metal hydride battery according to the present invention can achieve a smooth battery reaction and sufficiently extract the capacity of a nickel electrode to thereby improve a capacity by limiting the amount of the battery electrolyte within the range of 0.4–1.8 ml/Ah to the capacity of a hydrogen-absorbing alloy negative electrode. Furthermore, oxygen gas produced from the nickel electrode in an excessively charged state can be smoothly reduced, whereby the increase of the battery internal pressure can be suppressed.

Further, the battery capacity is avoided from being limited by the capacity of the hydrogen-absorbing alloy electrode in such a manner that the capacity ratio of an alloy in an uncharged state in the battery discharged state of the hydrogen-absorbing electrode to the capacity of a nickel electrode is set within the range of 1.1–2.0 and the increase of the battery internal pressure at the ends of charge and discharge can be restricted without the need of using a special charge/discharge method. Simultaneously, the volume occupied by the hydrogen-absorbing alloy electrode in the battery container can be reduced. Corresponding to the reduced volume, a volume of the nickel electrode as a volume-limited electrode can be increased, thereby to increase the battery capacity.

Accordingly, there can be provided a secondary nickel-metal hydride battery having a high capacity and a long cycle life at a low cost, the battery utilizing the characteristics of the hydrogen-absorbing alloy manufactured by molten-metal-rapidly-quenching method, and enabling to suppress the increase of the battery internal pressure.

DESCRIPTION OF THE PREFERRED EMBODIMENTS

Embodiments of the present invention will be described below more specifically.

Embodiments 1–9

Figure 1:
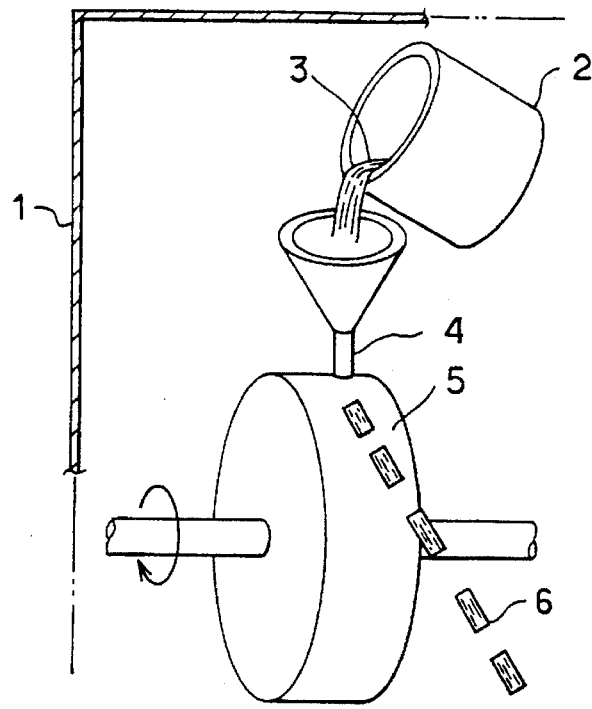
FIG. 1 is a schematic diagram showing a molten-metal-rapidly-quenching apparatus using a single roll method.

Mixture of various law materials were prepared, taking the amount of the law materials lost when they were melted into consideration, so that rapidly-quenched molten alloys obtained by being rapidly-quenched from the melt had the compositions shown in Table 1. The mixtures of the various law materials were put into a crucible made of Ti-boride and melted by a high frequency induction heating method, and various molten metal alloys were prepared. Next, the thus obtained various molten metal alloys were injected onto the surface of the cooling roll of an apparatus employing a single roll method shown in FIG. 1 so that flake-shaped rapidly-quenched molten alloys having a thickness of 50 microns were prepared. The cooling roll was composed of a copper roll having a diameter of 300 mm and the distance between an injection nozzle and the cooling roll was set to 50 mm and an injection pressure was set to 0.02 Kgf/cm$^2$.

Further, the rapid quenching was executed in vacuum, the rotating speed (rpm) of the cooling roll was set to 600 rpm and an adjustment was performed so that the molten metal alloy had an average quenching rate of 2400° C./sec.

Next, the thus obtained respective rapidly-quenched molten alloys were pulverized and classified to 200 mesh or less so that hydrogen absorbing-alloy powders for battery was prepared. Next, the thus prepared hydrogen absorbing-alloy powders for battery, PTFE powder and carbon powder were weighed so that they were 95.5 wt %, 4.0 wt % and 0.5 wt %, respectively and then kneaded so that respective electrode sheets were made.

The electrode sheets were cut off to a predetermined size and attached under pressure to a nickel collector to make hydrogen absorbing-alloy electrodes, respectively.

Then, the respective hydrogen absorbing-alloy electrodes were charged up to 300 mAh/g with a current (220 mA/g) per 1 g of alloy and discharged with the above current until a potential difference of −0.5 V was achieved with respect to an Hg/HgO reference electrode and at this time a maximum electrode capacities were measured. The result of the measurements is shown Table 1. Further, the number of activations of the respective electrodes was measured. The number of activations means the number of charge/discharge cycles necessary for the electrodes thus made to exhibit a maximum capacity and serves as an index for determining the good or bad rising-up of the battery characteristics of batteries made by using these alloys.

On the other hand, a paste was prepared by adding a small amount of CMC (carboxymethyl cellulose) and water to 90 wt % of nickel hydroxide and 10 wt % of cobalt monoxide and stirring and mixing them. This paste was filled to a porous nickel member having a three-dimensional structure and dried and rolled by a roller press to make a nickel electrode.

Then, AA type nickel-metal hydride batteries of the respective embodiments were assembled by combining the above respective hydrogen absorbing-alloy electrodes and the nickel electrode. Here, the capacity of the respective batteries was set to 650 mAh as the theoretical capacity of the nickel electrode and a solution mixed with 7N potassium hydroxide and 1N lithium hydroxide was used as a battery electrolyte.

Next, the respective batteries were charged with 650 mA for 1.5 hours and repeatedly subjected to charge/discharge cycles so that a current was discharged at the current of 1 A until the batteries had a voltage of 1 V and the number of the cycles at which the capacity of the batteries became 80% of an initial capacity was measured as a battery life.

Further, the respective batteries were assembled and charged 10 cycles and then they were disassembled to analyze the metal structure of the hydrogen absorbing-alloys used as the negative electrodes. Note, the hydrogen absorbing-alloy powder assembled once into the battery was integrated with a polymer binder and the like and further partially corroded by the electrolyte and an etching solution used to observe a fine structure, and thus it was difficult to observe the metal structure thereof as it was. Thus, specimens for analysis were made by the procedures shown in the following items (1)–(3) and further the metal structure of the specimens was analyzed by the method shown in item (4).

(1) Taking-Out of Negative Electrode

When the battery is disassembled in the state that it is not perfectly discharged, there is a possibility that the hydrogen absorbing-alloy contained in the negative electrode may be fired, and thus the nickel-metal hydride battery is perfectly discharged and then the battery is disassembled and the negative electrode is taken out. To prevent the firing, the negative electrode taken out from the battery is sufficiently washed with water and dried. If the negative electrode is not sufficiently washed with water and dried, it is not in intimate contact with a resin in the next resin burying process and may be exfoliated from the resin.

(2) Burying of Negative Electrode by Resin

Ten pieces of specimens of 10 mm×5 mm are cut off from the dried negative electrode and numbers from 1 to 10 were put to the specimens. Each of these specimens is vertically disposed in a mold so that longer side thereof is directed downward and a gap therebetween was filled with a resin flowed into it to form a composite member. A resin having a low viscosity such as an epoxy resin is used as the resin to be buried. Further, it is preferable that the resin is flowed into the mold in the state that the temperature thereof is increased to lower its viscosity so that the specimen is in intimate contact with the resin.

(3) Polishing of Composite Member

The surface of the cured composite member is polished by sequentially using water resistant abrasive papers (#600)–(#1500) to expose the cross section of the hydrogen absorbing alloy. This polishing operation may be carried out by a polishing machine. In this case, however, since the hydrogen absorbing-alloy in the electrode is liable to be exfoliated due to an excessive impact force, it is preferable that the polishing operation is manually carried out.

(4) Observation of Alloy Structure

When the metal structure of the hydrogen absorbing alloy contained in the specimens is observed by a scanning type electron microscope (SEM), the metal structure may not be partially confirmed clearly because the hydrogen absorbing alloy is integrated with the polymer binder. Therefore, only the alloys whose metal structure can be clearly recognized are selected as the objects of the observation.

Figure 10:
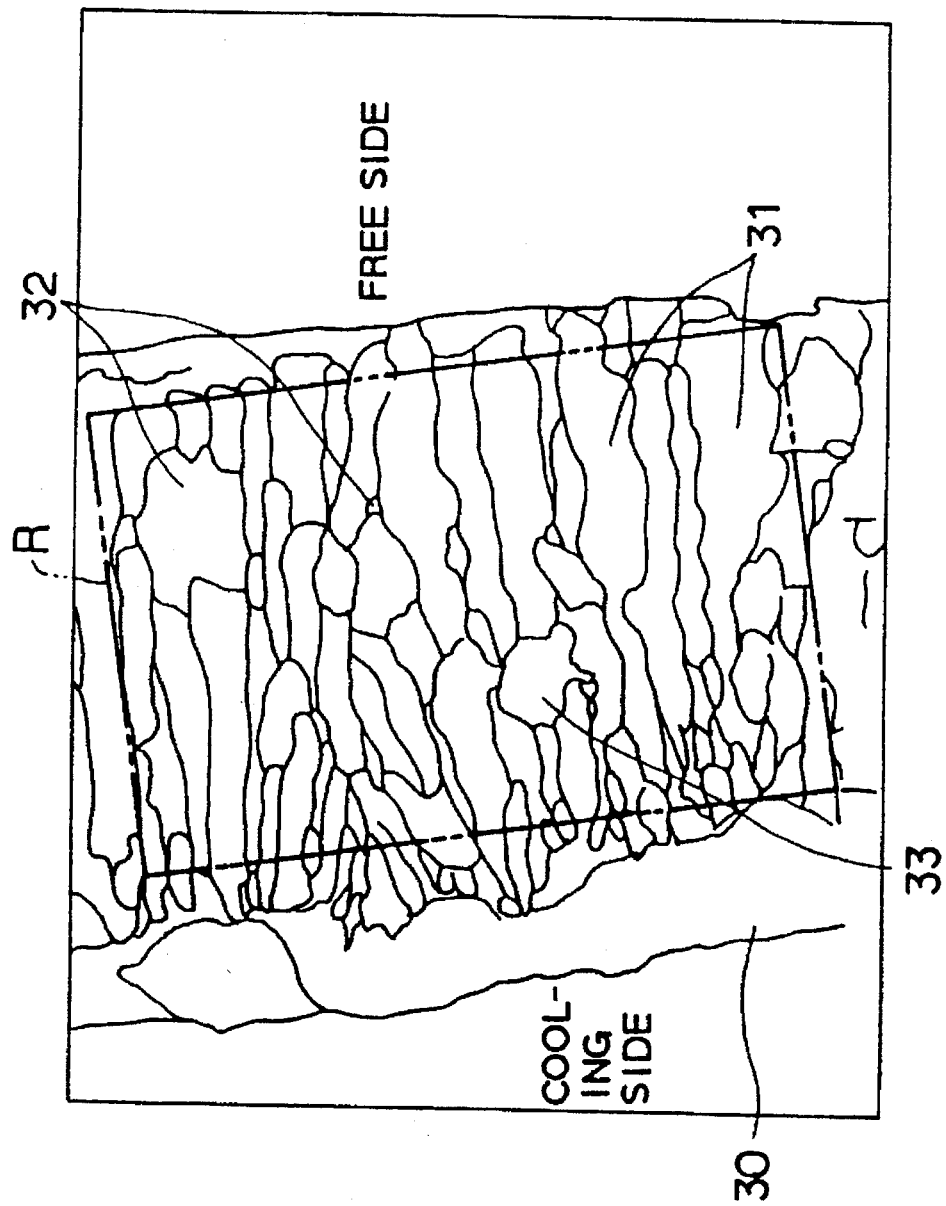
FIG. 10 is a schematic diagram copying the columnar structure of the metal structure shown in FIG. 9.
Figure 16:
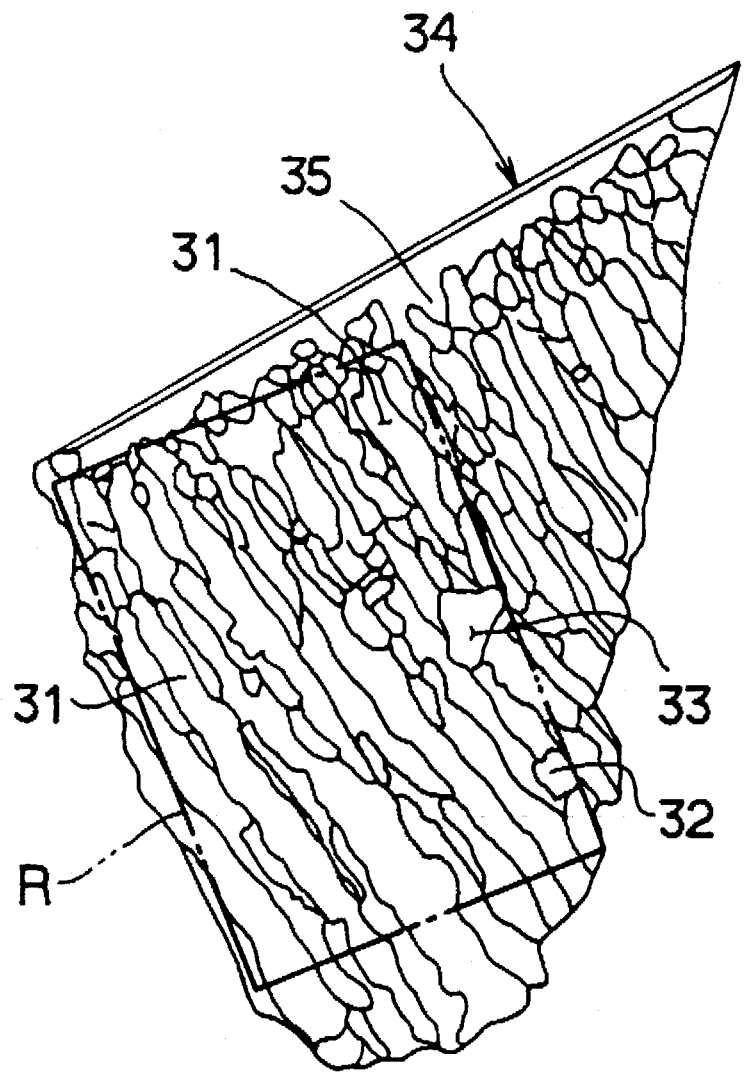
FIG. 16 is a schematic diagram copying the columnar structure of the metal structure shown in FIG. 15.
Figure 17:
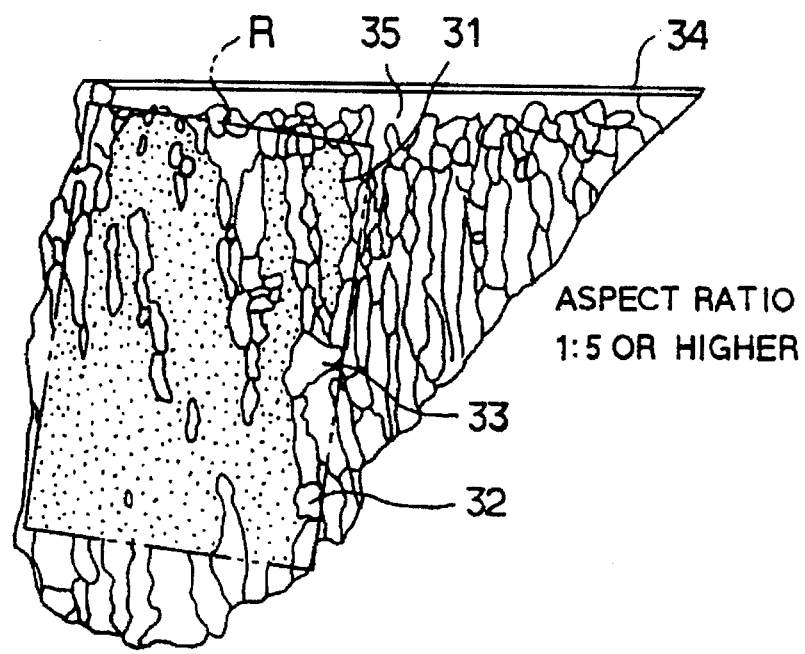
FIG. 17 is a schematic diagram showing the columnar structure having an aspect ratio of 1:5 or higher in the metal structure shown in FIG. 15.
Figure 18:
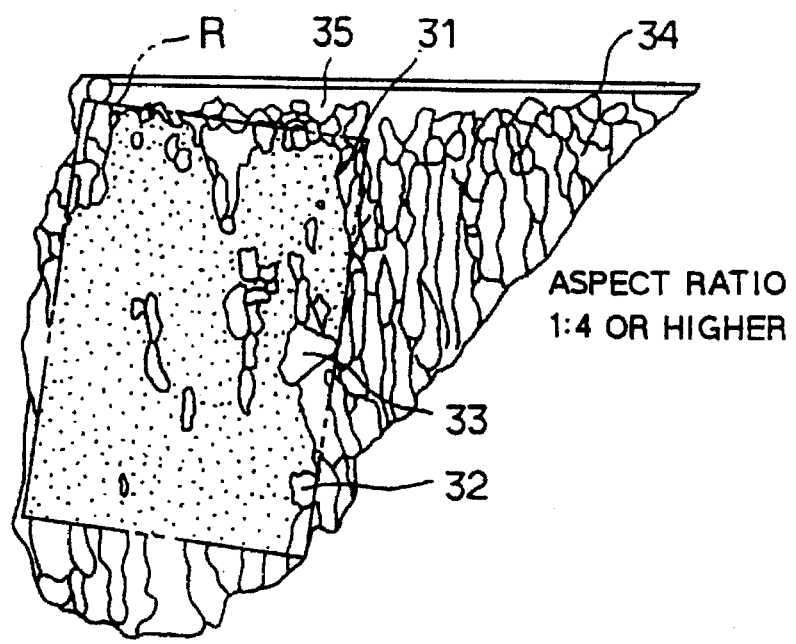
FIG. 18 is a schematic diagram showing the columnar structure having an aspect ratio of 1:4 or higher in the metal structure shown in FIG. 15.
Figure 19:
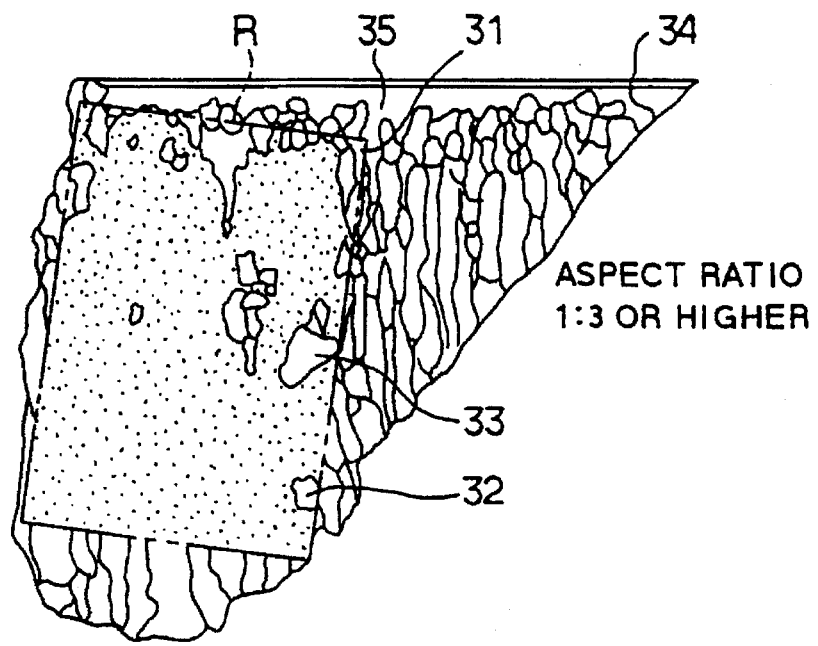
FIG. 19 is a schematic diagram showing the columnar structure having an aspect ratio of 1:3 or higher in the metal structure shown in FIG. 15.
Figure 20:
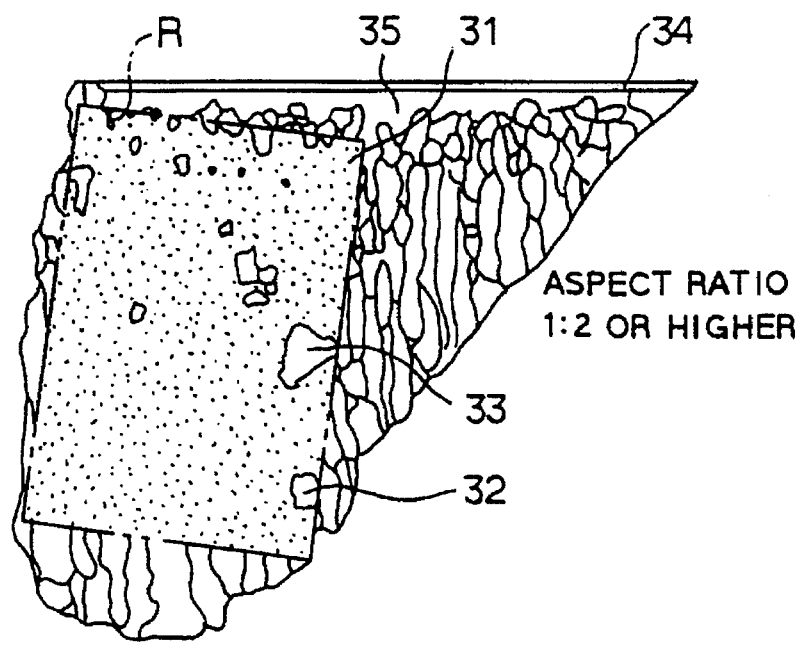
FIG. 20 is a schematic diagram showing the columnar structure having an aspect ratio of 1:2 or higher in the metal structure shown in FIG. 15.
Figure 22:
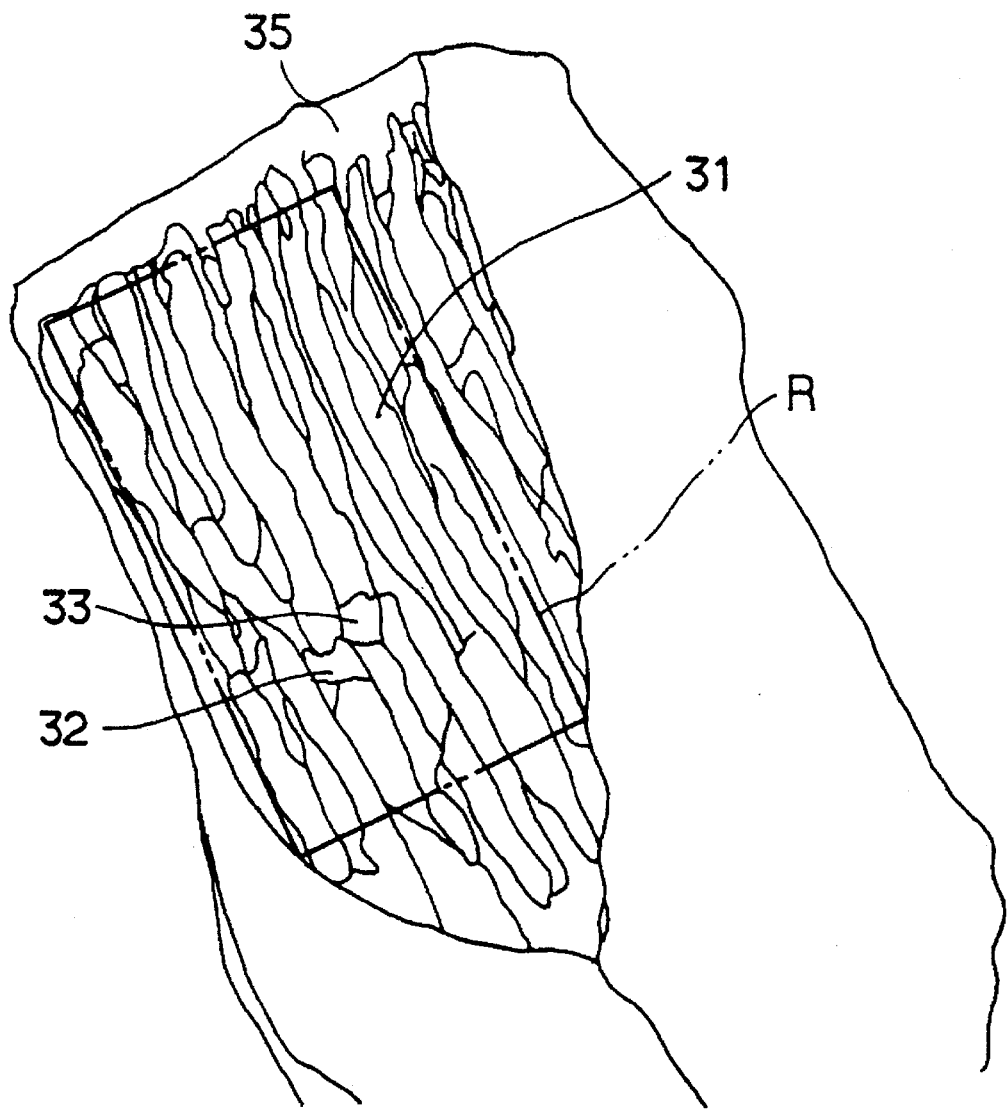
FIG. 22 is a schematic diagram copying the columnar structure of the metal structure shown in FIG. 21.
Figure 23:
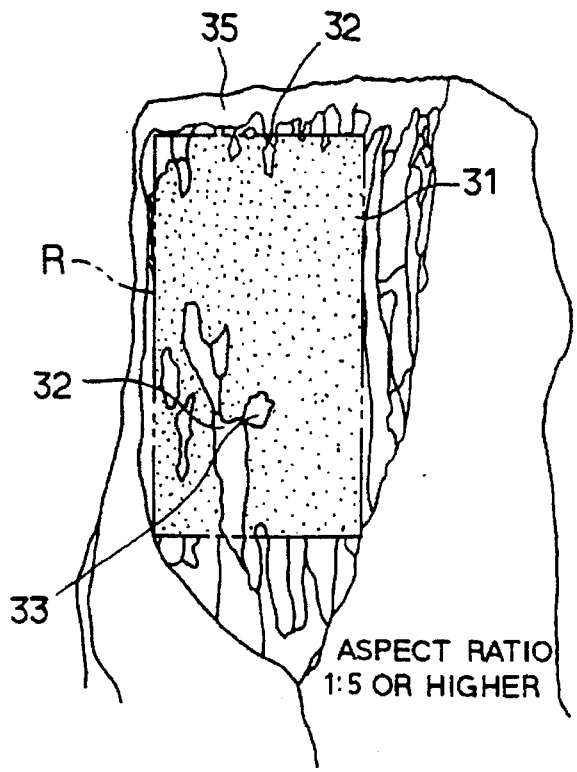
FIG. 23 is a schematic diagram showing the columnar structure having an aspect ratio of 1:5 or higher in the metal structure shown in FIG. 21.
Figure 24:
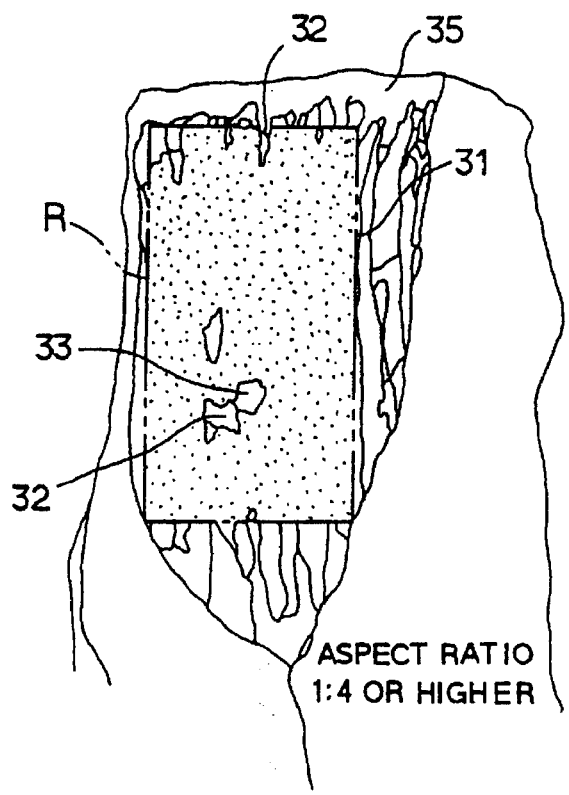
FIG. 24 is a schematic diagram showing the columnar structure having an aspect ratio of 1:4 or higher in the metal structure shown in FIG. 21.
Figure 25:
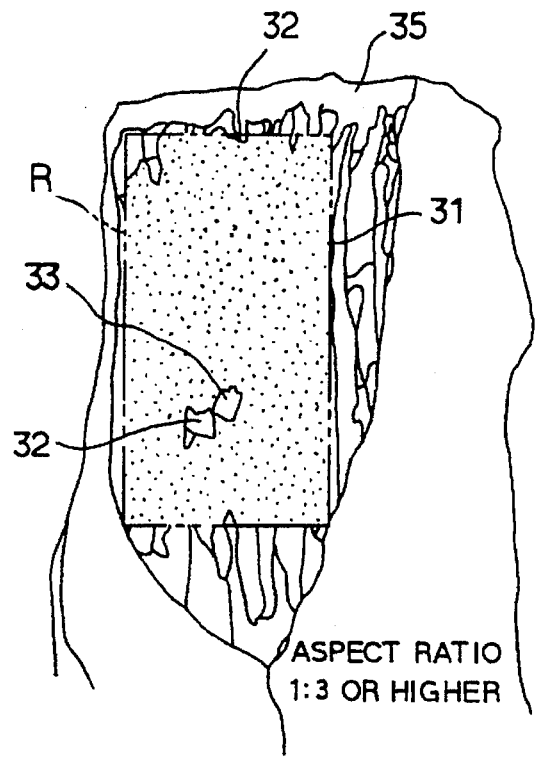
FIG. 25 is a schematic diagram showing the columnar structure having an aspect ratio of 1:3 or higher in the metal structure shown in FIG. 21.
Figure 26:
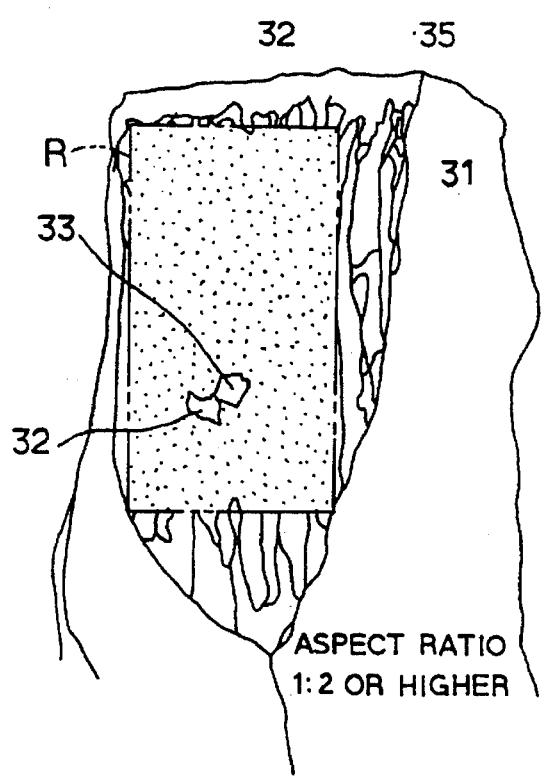
FIG. 26 is a schematic diagram showing the columnar structure having an aspect ratio of 1:2 or higher in the metal structure shown in FIG. 21.

The observation was carried out by selecting a visual field in which the metal structure of the hydrogen-absorbing alloy exposed to the cross section of the electrode could be observed as much as possible within the region R partitioned by a maximum rectangular shape in which the crystal structure of the alloy integrally touched when the metal structure is photographed by using the SEM at a magnification of, for example, 1500–2000 as shown in FIGS. 10, 16 and 22, the above crystal structure being a portion of the entire indefinite crystal structure in which crystal particles could be visually confirmed. At that time, with respect to each of the hydrogen-absorbing alloys of the present invention contained in the negative electrode, the ratio of the crystal particles having the aspect ratio of 1:2 or higher occupying in the metal structures which can be recognized is preferably 50% or higher, more preferably 70% or higher and further more preferably 80% or higher. This is because that when the ratio is less than 50%, a crystal particle boundaries are increased and as a result segregations are also increased, and thus the alloy particles are greatly deteriorated. Further, it is necessary that the ratio of the number of the alloy particles with crystal particles having the aspect ratio of 1:2 or higher and the area ratio of the columnar of 50% or more is preferably 30% or more, more preferably 50% or more and further more preferably 70% or more with respect to the number of the entire particles of the hydrogen-absorbing alloy having the metal structures which can be visually recognized. When the ratio of the number of the crystal particles is less than 30%, the number of the crystal particles liable to be deteriorated is relatively increased, and when a battery is formed, the life thereof is remarkably shortened.

The aspect ratio is the ratio of the minor diameter of a crystal particle to the major diameter thereof, and the major diameter is defined as the maximum length in the axial direction of the crystal particle and the minor diameter as the maximum length in the direction perpendicular to the axis.

In the metal structure of the hydrogen-absorbing alloy according to the present invention, the columnar crystal particles preferably have an average minor diameter of 30 microns or less, more preferably 20 microns or less and further more preferably 10 microns or less. When the average minor diameter exceeds 30 microns, many segregations are produced and the corrosion resistance of the alloy is lowered and the life thereof is shortened as well as a charge/discharge cycle is greatly lowered when a battery is made. Further, since the area of the crystal boundaries as the moving paths of hydrogen in the alloy is reduced, the hydrogen has an increased diffusion resistance and thus a battery voltage is liable to be lowered when a large current discharges.

Next, a method of determining the aspect ratio of the columnar structure constituting the metal structure of the hydrogen-absorbing alloy will be specifically described.

Figure 4:
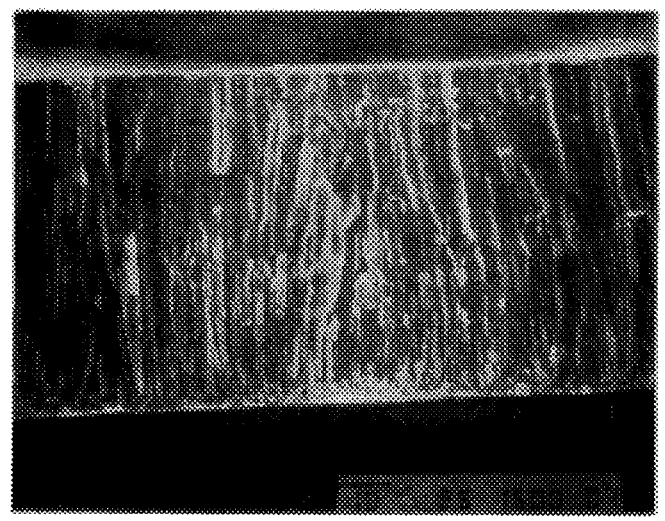
FIG. 4 is a photograph taken by an electron microscope to show the metal structure of a flake-shaped hydrogen-absorbing alloy subjected to a molten-molten-metal-rapidly-quenching processing.
Figure 5:
FIG. 5 is a photograph taken by an electron microscope to show the metal structure of hydrogen-absorbing alloy particles contained in a negative electrode taken out from a battery.

FIG. 4 is a photograph taken by an electron microscope to show an example of the metal structure of the hydrogen-absorbing alloy according to this embodiment and the photograph shows the cross section in the thickness direction of a rapidly-quenched molten alloy in contact with the cooling roll of the single roll apparatus. The hydrogen-absorbing alloy is a flake-shaped rapidly-quenched molten alloy before it is pulverized. In FIG. 4, the lower side of the cross section is a quenched surface in contact with the cooling roll and the upper side thereof is a free side. It can be clearly recognized the state that columnar structure having various aspect ratios is vertically grown from the quenched surface by the molten-alloy-rapidly-quenching process.

However, the alloy obtained by pulverizing the flake-shaped rapidly-quenched molten alloy is used to the negative electrode of an actual battery and the pulverized powder of the alloy is sometimes eroded by a battery electrolyte, and thus even if the columnar structure is observed by the SEM, the columnar structure is not always clearly observed. The cases in which the metal structure is made unclear will be described below with reference to FIGS. 5-8.

Figure 6:
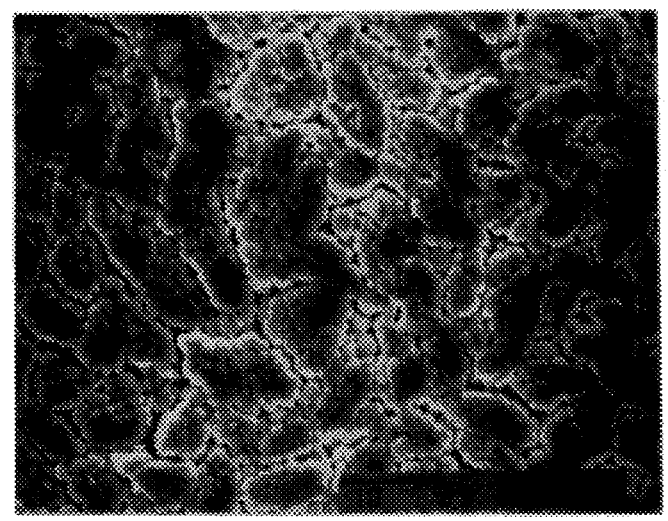
FIG. 6 is a photograph taken by an electron microscope to show the metal structure of hydrogen-absorbing alloy particles contained in the negative electrode taken out from the battery.
Figure 7:
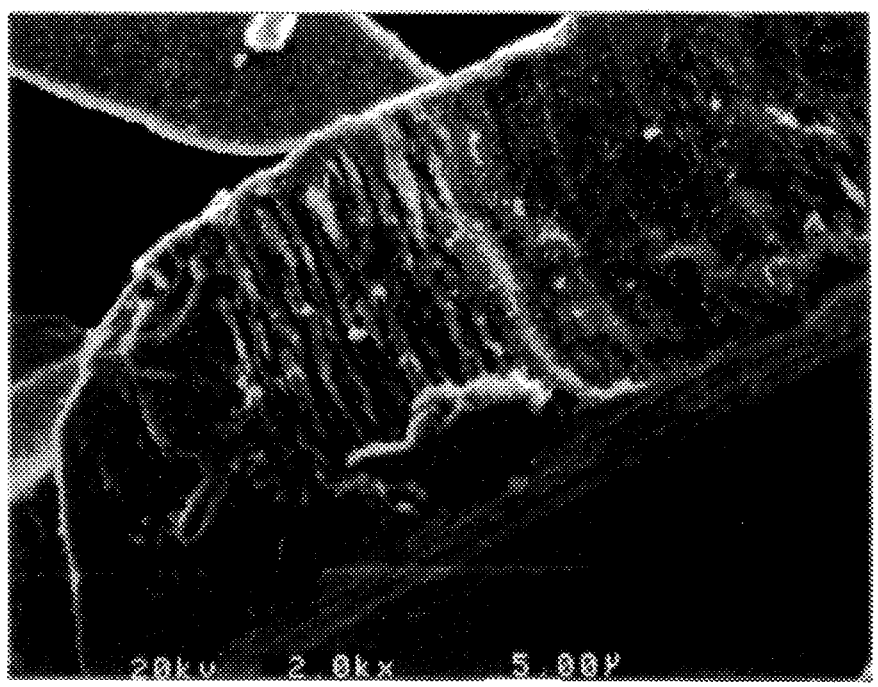
FIG. 7 is a photograph taken by an electron microscope to show the metal structure of hydrogen-absorbing alloy particles contained in the negative electrode taken out from the battery.
Figure 8:
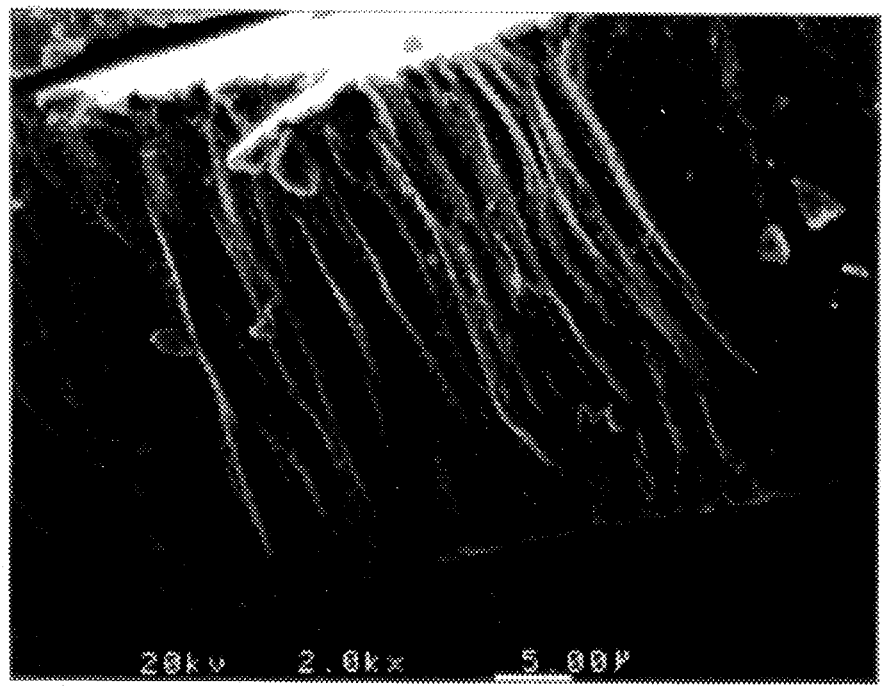
FIG. 8 is a photograph taken by an electron microscope to show the metal structure of hydrogen-absorbing alloy particles contained in the negative electrode taken out from the battery.

FIGS. 5-8 show the photographs taken by the SEM of the hydrogen-absorbing alloy contained in the negative electrode taken out from an actually used battery. More specifically, in FIG. 5, a cross section in the vertical direction with respect to the quenching surface of the cooling roll is observed and the state that columnar structure is vertically grown can be recognized. FIG. 6 shows the surface structure of the free side opposite to the side in contact with the cooling roll (the roll side). In this case, since only the edge faces corresponding to the minor diameter of columnar structure is observed, the columnar structure may be observed as if they were equi-axed crystals. In FIG. 7, although columnar structure is partially observed at the central portion thereof, since the right upper portion thereof is eroded by a battery electrolyte, it is difficult to clearly recognize a metal structure as a whole. FIG. 8 shows an example in which the upper surface (white portion) of a hydrogen-absorbing alloy is eroded by a battery electrolyte when observed by the SEM and a metal structure cannot be clearly recognized as a whole.

Thus, when the metal structure of the hydrogen-absorbing alloy contained in a negative electrode is to be observed, an object surface is mirror-polished and etched to expose the crystal boundaries of the metal structure. When, however, an etching solution is not suitable to the composition of the hydrogen-absorbing alloy, the etching solution excessively erodes the entire alloy, and thus the crystal boundaries cannot be clearly exposed. Therefore, even if columnar structure is formed, when they are greatly eroded, the recognition of the metal structure as a whole is difficult to be recognized. On the other hand, even when they are slightly eroded, crystal particle boundaries are difficult to be clearly recognized although the configuration of the columnar structure can be barely recognized visually. Note, in addition to the above cases, when a cross section perpendicular to the cooling roll is observed, columnar structure may observed as if they were equi-axed crystals depending upon an angle between the surface of the cooling roll and the cross section. Therefore, in this case, an attention must be taken when the area ratio of the columnar structure is measured.

Figure 9:
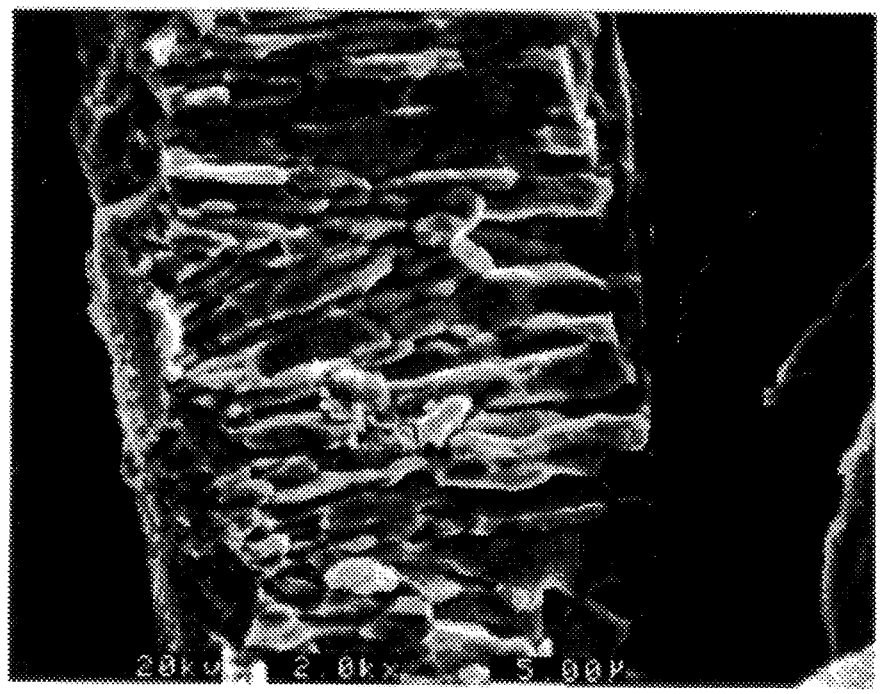
FIG. 9 is a photograph taken by an electron microscope to show the metal structure of the hydrogen-absorbing alloy according to an embodiment 9B.
Figure 15:
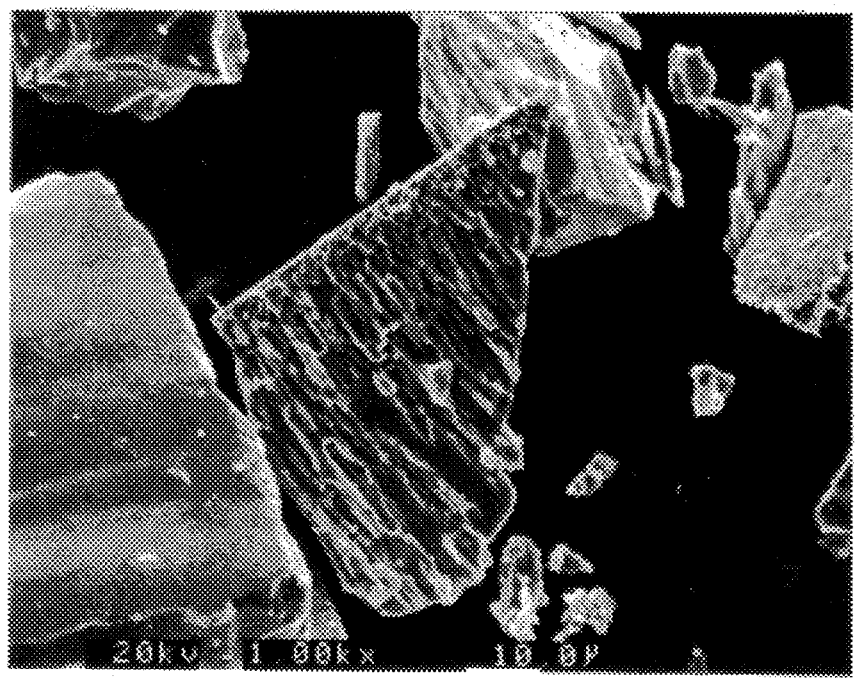
FIG. 15 is a photograph taken by an electron microscope to show the metal-structure of the hydrogen-absorbing alloy according to an embodiment 5A.
Figure 21:
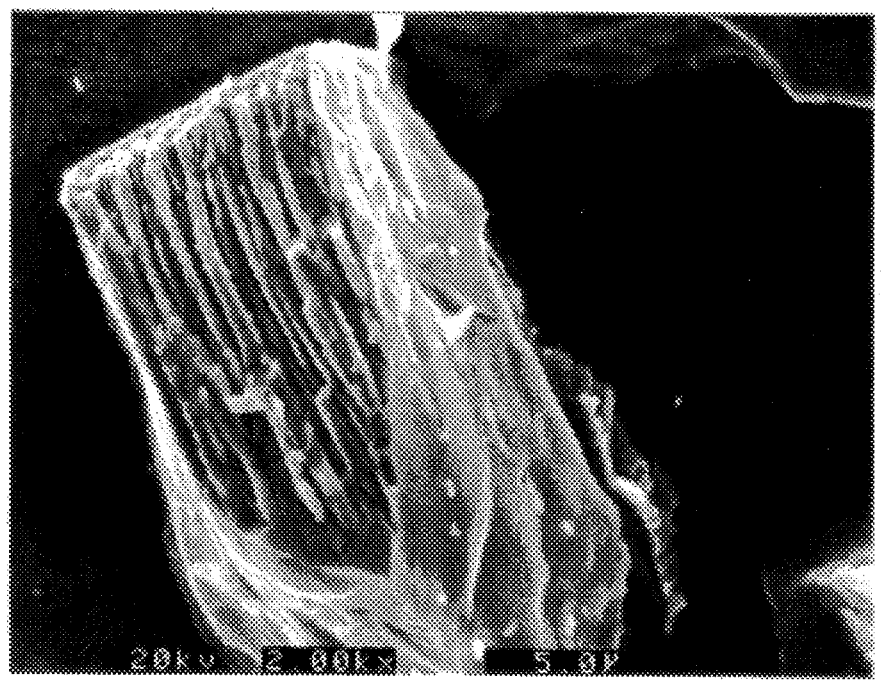
FIG. 21 is a photograph taken by an electron microscope to show the metal structure of the hydrogen-absorbing alloy according to an embodiment 12A.

FIGS. 9, 15 and 21 show the photographs taken by the SEM of the hydrogen-absorbing alloy particles contained in the negative electrode taken out from actually used batteries. The hydrogen-absorbing alloy particles shown in FIGS. 9, 15 and 21 correspond to embodiments 5, 1 and 8, respectively.

Although clear alloy particles in which columnar structure is grown are observed as shown in the central portion of FIG. 15, the clear alloy particles are also surrounded by alloy particles whose crystal structure cannot be clearly observed because they are eroded by the electrolyte of a battery or an etching solution used to observe them with the SEM.

In particular, when the etching solution is not suitable to the composition of the hydrogen-absorbing alloy, the metal structure of the alloy cannot be observed because the surface of the alloy is eroded by the etching solution.

A method of calculating the ratio of crystal particle having the aspect ratio of 1:2 or higher occupying in the entire crystal particles based on the above SEM photographs will be described. First, the number of hydrogen-absorbing alloy particles whose metal structure can be clearly observed is counted in the entire alloy particles observed in the cross section of a single polished piece of a negative electrode and the count value is represented by N1. At this time, a specific signal from an rare earth element is detected by using an X-ray microanalyzer (EPMA), energy dispersion type X-ray analyzer (EDX) or the like to confirm that the alloy particles are composed of the hydrogen-absorbing alloy. When this specific signal is not detected from the rare earth element, the alloy particles are assumed to be stuck materials such as pulverized pieces and determined not to be the hydrogen-absorbing alloy particles and excluded from the number of the alloy particles.

Next, the number of the alloy particles N1' in which crystal particles having the aspect ratio of 1:2 or higher occupy 50% or more of the area of the metal structure is counted in the N1 pieces of the alloy particles. Hereinafter, the same count will executed to the respective pieces of the specimens of the negative electrode.

The ratio of the columnar structure is calculated by substituting thus determined values of N1–N10 and N1'–N10' for the following equation.

Ratio of columnar structure (%) = $(N1'+N2' \ldots +N10')/(N1+N2+ \ldots +N10) \times 100$ Next, a method of calculating the ratio of the columnar structure occupying in the metal structure will be described. Note, the long crystal particles having the aspect ratio of 1:2 were made to the object to be investigated as the columnar structure. Further, not only equi-axed crystals but also chill crystals and various stuck materials were included in the crystal particles having the aspect ratio of less than 1:2. The area occupied by the columnar structure was measured by using an image analyzer (Model LUZEX 500 made by Nippon Regulator Co., Ltd.). More specifically, when description is made by using the embodiment 5 as an example, a thin tracing paper (basis weight: about 40 g/m$^2$) was placed on the SEM photograph of the metal structure shown in FIG. 9 and particle boundaries were copied to the tracing paper so that a copied paper as shown in FIG. 10 was created. In the hydrogen-absorbing alloy particles, an eroded portion 30 eroded by a battery electrolyte was formed on the left side of columnar structure 31. Further, a stuck material 33 such as a fragment or the like of a pulverized matter was located at the central portion of the region R.

Figure 11:
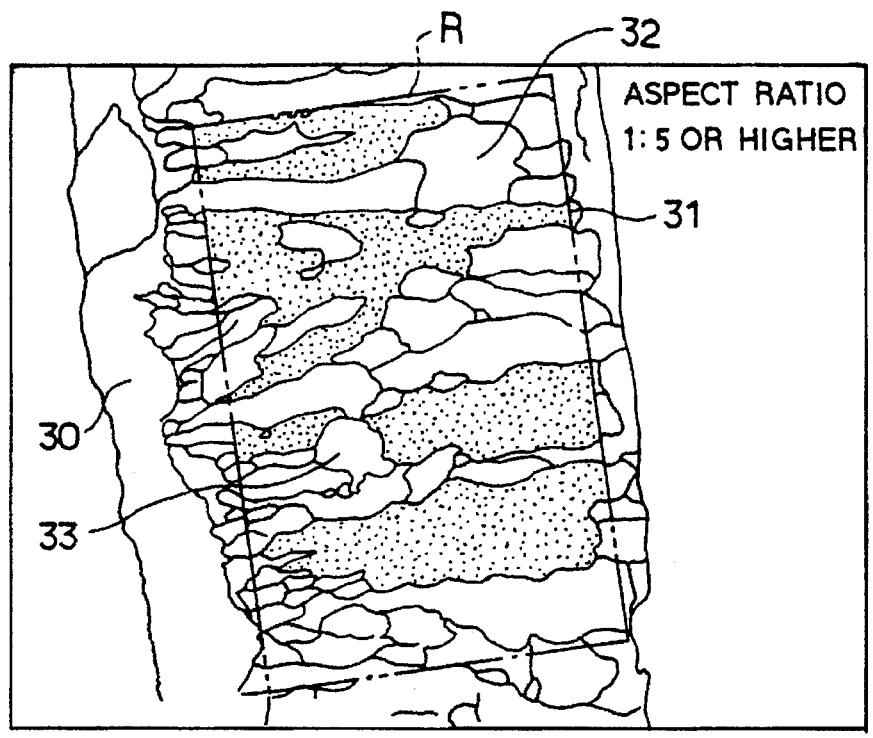
FIG. 11 is a schematic diagram showing the columnar structure having an aspect ratio of 1:5 or higher in the metal structure shown in FIG. 9.
Figure 12:
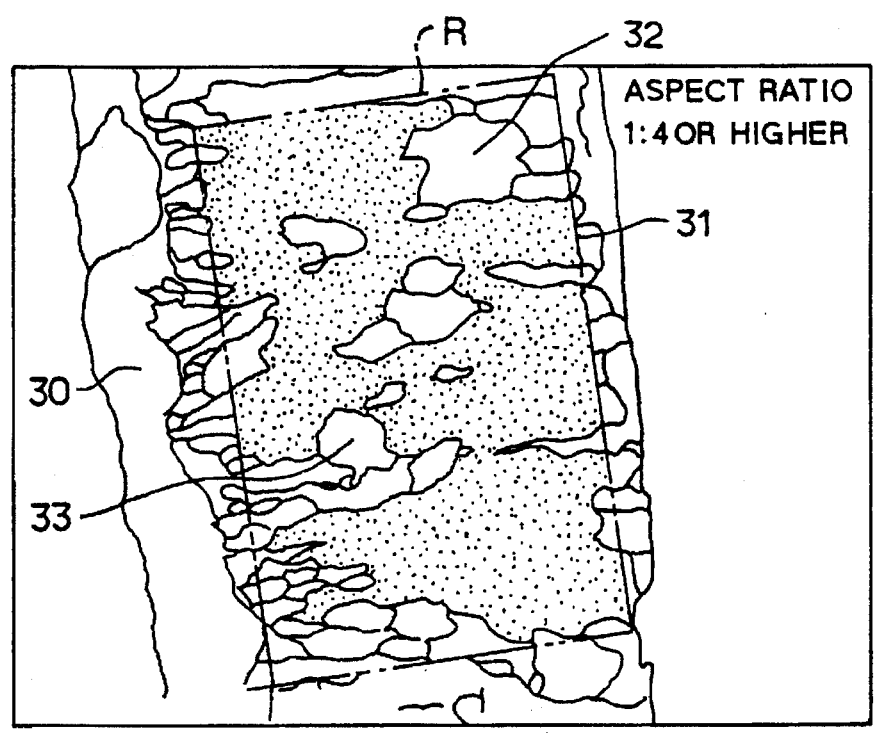
FIG. 12 is a schematic diagram showing the columnar structure having an aspect ratio of 1:4 or higher in the metal structure shown in FIG. 9.
Figure 13:
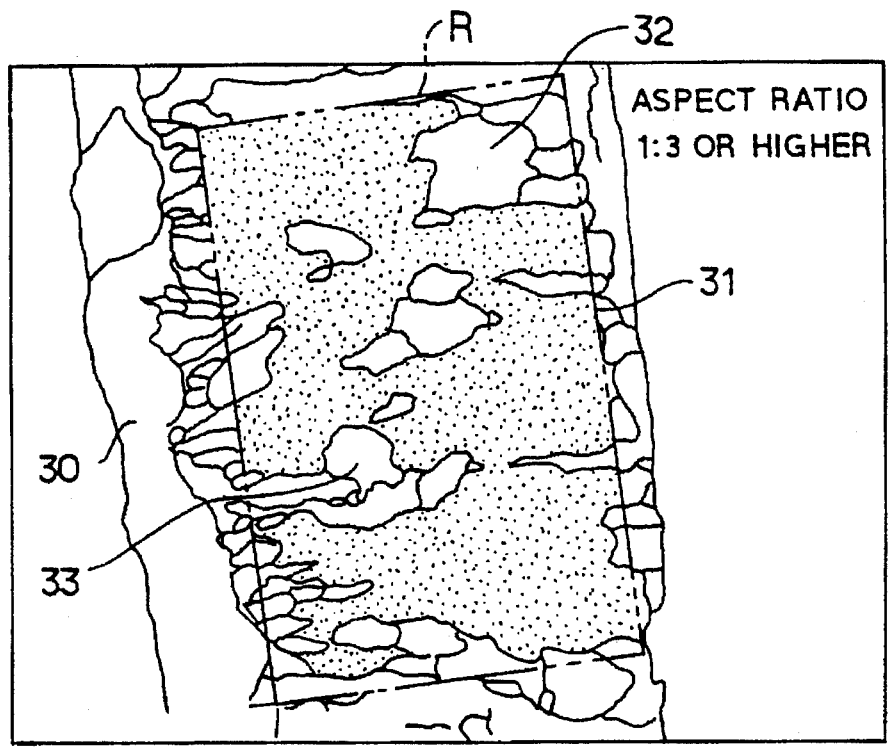
FIG. 13 is a schematic diagram showing the columnar structure having an aspect ratio of 1:3 or higher in the metal structure shown in FIG. 9.
Figure 14:
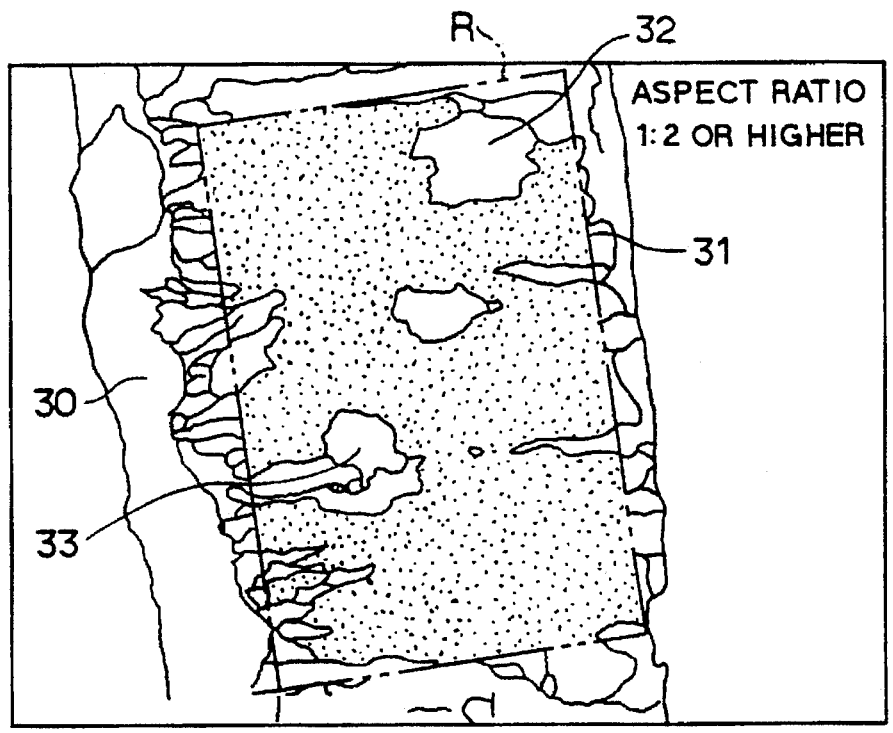
FIG. 14 is a schematic diagram showing the columnar structure having an aspect ratio of 1:2 or higher in the metal structure shown in FIG. 9.

Next, the portion corresponding to the columnar structure having the aspect ratio of 1:5 or higher was colored with black to obtain FIG. 11. Then, the portion corresponding to the columnar structure having the aspect ratio of 1:4 or higher was colored with black to obtain FIG. 12 in the same way. Next, the portions having the aspect ratios of 1:3 and 1:2 or higher were colored with black in the same way to obtain FIGS. 13 and 14. Next FIGS. 11–14 were subjected to an image processing by using an image analyzer so that the area ratios of the columnar structures corresponding to these aspect ratios were optically analyzed and calculated. More specifically, the image analyzer recognized the presence and absence of the columnar structure in the object range R by a shade of color and calculated the area ratios.

FIGS. 15–20 and FIGS. 21–26 show the examples in which the area ratio is cumulatively calculated with respect to other alloy structures. FIG. 15 is an SEM photograph showing the hydrogen-absorbing alloy particles according to the embodiment 1. The copy shown in FIG. 16 was obtained by tracing the crystal structure of the alloy particles at the central portion which could be clearly recognized in the alloy particles shown in the SEM photograph of FIG. 15. In FIG. 16, the linear portion at the upper edge is an abutted face 34 abutted against a cooling roll and fine chill crystals 35 made by the super-rapid quenching action of the cooling roll are located along the abutted face 34. Note, since the chill crystals 35 are fine, the crystal boundaries thereof are not shown. Further, a stuck material 33 is located on the right side of the region R.

Next, the portions of the columnar structures having the aspect ratios of 1:5 or higher, 1:4 or higher, 1:3 or higher and 1:2 or higher are colored with black, respectively to obtain the copies shown in FIGS. 17–20 in the same way as the embodiment 5.

The copy of FIG. 22 showing the crystal structure of the hydrogen-absorbing alloy according to the embodiment was made from the SEM photograph shown in FIG. 21 in the same way and the columnar structures corresponding to respective aspect ratios were colored with black to make FIGS. 23–26 which were analyzed by the image analyzer to determine the area ratios of the columnar structure portions.

As apparent from FIGS. 9–26, it was confirmed that columnar structures 31 were sufficiently grown in any of the crystal structures, whereas equi-axed crystals 32 partially existed in the structures.

Note, as shown in FIGS. 10, 16 and 22, the region subjected to the above analysis was limited to the region R partitioned by a maximum rectangular shape in which the crystal structure of the alloy integrally touched in the entire indefinite crystal structure in which crystal particles could be visually confirmed. Note, the columnar structure located on the boundary of the region R employed the area thereof located only in the region R and the aspect ratios of them were assumed from the entire configuration of the columnar structures including their portions located to the outside of the region.

Table 1 shows the area ratio and minor diameter of the columnar structure of the respective hydrogen-absorbing alloys according to the embodiments 1–9, the maximum electrode capacity of the electrodes and the activation number of the electrodes using the hydrogen-absorbing alloys, and the number of charge/discharge cycles of the batteries.

TABLE 1

| Specimen No. | Alloy Composition | Manufacturing Method | RPM of Cooling Roll (r.p.m) | Area Ratio of Columnar Structures (%) Aspect Ratio | | | | | Minor Dia of Columnar Structures (μm) | Characteristics | | |
|---|---|---|---|---|---|---|---|---|---|---|---|---|
| | | | | 1:2 or higher | 1:3 or higher | 1:4 or higher | 1:5 or higher | As a whole | | Electrode Capacity (mAh/g) | Cycle Life (cycles) | Number of Activation (times) |
| Embodiment 1 | LmNi$_{4.0}$Co$_{0.4}$Mn$_{0.3}$Al$_{0.3}$ | Single Roll Method | 600 | 95 | 89 | 82 | 71 | 59 | 2.5 | 259 | 612 | 3 |
| Embodiment 2 | LmNi$_{3.8}$Co$_{0.4}$Mn$_{0.5}$Al$_{0.3}$ | Single Roll Method | 600 | 97 | 89 | 78 | 75 | 66 | 2.3 | 263 | 557 | 2 |
| Embodiment 3 | LmNi$_{4.0}$Co$_{0.4}$Mn$_{0.3}$Cr$_{0.3}$ | Single Roll Method | 600 | 96 | 88 | 82 | 79 | 68 | 2.3 | 256 | 575 | 3 |
| Embodiment 4 | LmNi$_{3.8}$Co$_{0.4}$Mn$_{0.5}$Cr$_{0.3}$ | Single Roll Method | 600 | 96 | 91 | 88 | 85 | 71 | 2.3 | 264 | 544 | 2 |
| Embodiment 5 | LmNi$_{4.2}$Mn$_{0.5}$Cu$_{0.3}$ | Single Roll Method | 600 | 97 | 91 | 89 | 83 | 62 | 2.6 | 261 | 548 | 2 |
| Embodiment 6 | LmNi$_{4.2}$Mn$_{0.8}$ | Single Roll | 600 | 96 | 92 | 87 | 84 | 73 | 2.7 | 271 | 539 | 2 |

TABLE 1-continued

| Specimen No. | Alloy Composition | Manu-facturing Method | RPM of Cooling Roll (r.p.m) | Area Ratio of Columnar Structures (%) | | | | | Minor Dia of Columnar Structures (μm) | Characteristics | | |
|---|---|---|---|---|---|---|---|---|---|---|---|---|
| | | | | Aspect Ratio | | | | As a whole | | Electrode Capacity (mAh/g) | Cycle Life (cycles) | Number of Activation (times) |
| | | | | 1:2 or higher | 1:3 or higher | 1:4 or higher | 1:5 or higher | | | | | |
| Embodiment 7 | LmNi$_{4.4}$Mn$_{0.3}$Al$_{0.3}$ | Single Roll Method | 600 | 95 | 86 | 79 | 76 | 57 | 2.5 | 258 | 563 | 2 |
| Embodiment 8 | LmNi$_{4.0}$Co$_{0.4}$Mn$_{0.3}$Fe$_{0.3}$ | Single Roll Method | 600 | 97 | 96 | 95 | 87 | 68 | 2.4 | 250 | 579 | 2 |
| Embodiment 9 | LmNi$_{4.0}$Co$_{0.4}$Mn$_{0.3}$Si$_{0.3}$ | Single Roll Method | 600 | 95 | 89 | 86 | 81 | 64 | 2.2 | 247 | 548 | 2 |

As apparent from Table 1, since each of the hydrogen-absorbing alloys for battery according to the examples 1–9 prepared by rapidly quenching the molten alloys each having the predetermined composition added with Mn has the columnar structure sufficiently grown in the alloy structure thereof and a very small amount of segregations of the elements constituting the alloy, when the alloys are used as a negative electrode material, an electrode capacity can be greatly improved without shortening a life.

Further, since a maximum electrode capacity can be achieved by the small number of charge/discharge cycles or the small number of activations such as 2–3 cycles (times), the battery characteristics can be rapidly risen up at an initial time and the manufacturing cost of the battery can be reduced.

Note, the metal structure of the respective hydrogen-absorbing alloy powders made in the embodiments 1–9 was analyzed according to the procedures shown in the following items (A), (B) and the above item (4) before electrodes were made from the alloy powders.

(A) Burying of Resin

An alloy specimen was taken in an amount of 100 mg and dispersed to the center of a resin burying frame (made of polypropylene) with a diameter of 20 mm for SEM specimen.

Next, an epoxy resin (EPO-MIX made by Buller Ltd.) commercially available as a resin for burying a SEM specimen and a curing agent were sufficiently mixed and the thus obtained mixed material was poured into the burying frame and cured. At that time, it was preferable to preheat the resin to about 60° C. to lower the viscosity thereof or to remove foams therefrom by evacuating the resin in a vacuum desiccator after it had been poured into the frame to improve the intimate contact property of the resin with the specimen.

(B) Polishing

Next, the specimen buried by the above procedure was polished by a rotary polishing machine until it was mirror-polished. Since the specimen of the hydrogen-absorbing alloy was liable to react with water, it was polished with water-resistant abrasive papers mounted on the polishing machine rotating at 200 rpm while dropping methyl alcohol. At that time, the abrasive papers were sequentially changed to finer ones of #180, #400 and #800. Then, the specimen was mirror-polished by the diamond paste on the rotary polishing machine having a felt set thereon, the felt being provided with the diamond paste whose grain size was made finer in the sequence of 15 microns, 3 microns and 0.25 micron.

The area ratios and minor diameters of the columnar structures of the hydrogen-absorbing alloys contained in the respective specimens obtained by the above procedures were measured by the method shown in the above item (4). As a result, it was confirmed that the hydrogen-absorbing alloys according to the embodiments 1–9 exhibited values substantially equal to the respective measured values (Table 1) of the columnar crystals of the alloy contained in the negative electrode taken from a nickel-hydrogen battery charged and discharged 10 cycles.

Embodiment 10

An ingot of AB$_5$ type hydrogen-absorbing alloy in the weight of 200 g was prepared by adjusting the composition thereof by taking an amount of a law material lost when it was melted into consideration, so that a rapidly-quenched molten alloy obtained by being quenched by a molten-metal-rapidly-quenching method had the composition of LmNi$_{4.0}$Co$_{0.4}$ Mn$_{0.3}$Al$_{0.3}$ (Lm is composed of a La-rich misch metal containing Ce: 3 wt %, La: 50 wt %, Nd: 40 wt %, Pr: 5 wt %, and other rare earth elements: 2 wt %) and the thus obtained ingot was melted in a high frequency induction heating furnace to prepare a molten alloy. Next, a flake-shaped rapidly-quenched molten alloy having a thickness of 50 microns was prepared by dropping the thus obtained molten alloy onto the surface of the cooling roll of the apparatus employing the single roll method shown in FIG. 1.

The rapidly-quenched molten alloy was subjected to a heat treatment in an argon atmosphere at the temperature of 300° C. for 4 hours and then pulverized, classified to 200 mesh or less and made to a hydrogen-absorbing alloy powder for battery [alloy powder (A)].

On the other hand, a rapidly-quenched molten alloy was prepared in the same way as the alloy powder (A) and subjected to a heat treatment for 4 hours at the temperatures set to 150° C., 200° C., 250° C., 350° C., 400° C., 500° C., 550° C. and 600° C., respectively, classified to 200 mesh or less and made to alloy powders (B)–(I). Further, the alloy powder (A) subjected to a heat treatment for 0.5 hour, 1 hour and 6 hours, respectively was made to powders (J)–(L).

On the other hand, for comparison, a rapidly-quenched molten alloy was prepared in the same way as the alloy powder (A), classified to 200 mesh or less and made to an alloy powder (M) without being to a heat treatment.

Table 2 shows the composition of the respective alloy powders (A)–(L) having being subjected to the heat treatment and the composition of the alloy powder (M) not subjected to the heat treatment.

TABLE 2

| Specimen | Heat Treatment Conditions | | | Alloy Composition After Heat Treatment |
|---|---|---|---|---|
| | Temperature (°C.) | Time (Hr) | Atmosphere | |
| Alloy Powder (A) | 300 | 4 | Ar | $Lm_{0.96}Ni_{4.00}Co_{0.41}Mn_{0.29}Al_{0.31}$ |
| Alloy Powder (B) | 150 | 4 | Ar | $Lm_{0.97}Ni_{4.00}Co_{0.41}Mn_{0.30}Al_{0.30}$ |
| Alloy Powder (C) | 200 | 4 | Ar | $Lm_{0.96}Ni_{4.00}Co_{0.41}Mn_{0.30}Al_{0.31}$ |
| Alloy Powder (D) | 250 | 4 | Ar | $Lm_{0.96}Ni_{4.00}Co_{0.41}Mn_{0.30}Al_{0.30}$ |
| Alloy Powder (E) | 350 | 4 | Ar | $Lm_{0.97}Ni_{4.00}Co_{0.40}Mn_{0.30}Al_{0.30}$ |
| Alloy Powder (F) | 400 | 4 | Ar | $Lm_{0.97}Ni_{4.00}Co_{0.40}Mn_{0.29}Al_{0.30}$ |
| Alloy Powder (G) | 500 | 4 | Ar | $Lm_{0.96}Ni_{4.00}Co_{0.40}Mn_{0.29}Al_{0.31}$ |
| Alloy Powder (H) | 550 | 4 | Ar | $Lm_{0.93}Ni_{4.00}Co_{0.41}Mn_{0.27}Al_{0.30}$ |
| Alloy Powder (I) | 600 | 4 | Ar | $Lm_{0.91}Ni_{4.00}Co_{0.42}Mn_{0.26}Al_{0.31}$ |
| Alloy Powder (J) | 300 | 0.5 | Ar | $Lm_{0.98}Ni_{4.00}Co_{0.40}Mn_{0.30}Al_{0.30}$ |
| Alloy Powder (K) | 300 | 1 | Ar | $Lm_{0.98}Ni_{4.00}Co_{0.41}Mn_{0.30}Al_{0.31}$ |
| Alloy Powder (L) | 300 | 6 | Ar | $Lm_{0.97}Ni_{4.00}Co_{0.40}Mn_{0.30}Al_{0.29}$ |
| Alloy Powder (M) | — | — | Ar | $Lm_{0.98}Ni_{4.00}Co_{0.40}Mn_{0.31}Al_{0.30}$ |

As apparent from the result shown in Table 2, the alloy powder (M) not subjected to the heat treatment exhibits substantially a desired composition. Further, a large variation in the composition is not admitted in the alloy powders (A)–(G) and (J)–(L) having been subjected to the heat treatment in the temperature range of from 150° C. to 500° C. On the other hand, the alloy powders (H) and (I) exhibit a large variation of the composition because they are subjected to the heat treatment at a little higher temperature and thus the rare earth elements and Mn which are liable to be evaporated are reduced in a little large amount. Since the composition of the alloys is liable to be changed when they are subjected to the heat treatment at a high temperature, the heat treatment is preferably carried out in a low temperature range.

Next, any one of the thus prepared powders (A)–(M), PTFE powder and carbon powder were weighed so that they were 95.5 wt %, 4.0 wt % and 0.5 wt % and kneaded to prepare respective electrode sheets. The electrode sheets were cut off to a desired size and attached to a nickel collector under pressure to make hydrogen-absorbing alloy electrodes. The electrode made of the alloy powders (A)–(M) were referred to as electrodes (A)–(M), respectively.

Then, the respective hydrogen absorbing-alloy electrodes (A)–(M) were charged up to 300 mAh/g at a current value of 220 mA per 1 g of alloy (220 mA/g) and discharged with the above current value until a potential difference of −0.5 V was achieved with respect to an Hg/HgO reference electrode and at that time a maximum electrode capacity was measured. The result of the measurement is shown Table 3.

On the other hand, a paste was prepared by adding a small amount of CMC (carboxymethyl cellulose) and water to 90 wt % of nickel hydroxide and 10 wt % of cobalt monoxide and stirring and mixing them. This paste was filled to a porous nickel member having a three-dimensional structure and dried and rolled by a roller press to make a nickel electrode.

Then, AA type nickel-metal hydride batteries were assembled by combining the above respective hydrogen absorbing-alloy electrodes (A)–(M) and the nickel electrode. Here, the battery using the alloy electrode (A) as the negative electrode was referred to as a battery (A) and in the same way the batteries using the alloy electrodes (B)–(M) were referred to as batteries (B)–(M), respectively. Here, the capacity of the respective batteries was set to 650 mAh as the theoretical capacity of the nickel electrode and a solution mixed with 7N potassium hydroxide and 1N lithium hydroxide was used as a battery electrolyte.

Next, the respective batteries (A)–(M) were charged with 650 mA for 1.5 hours and repeatedly subjected to charge/discharge cycles so that a current was discharged at the current of 1 A until the batteries had a voltage of 1 V and the number of the cycles at which the capacity of the batteries became 80% of an initial capacity was measured as a battery life, and the result shown in Table 3 was obtained.

TABLE 3

| Specimen | Electrode Capacity of Hydrogen-absorbing Alloy (mA/g) | Battery Life (Number of Cycles) |
|---|---|---|
| Alloy Powder (A) | 278 | 794 |
| Alloy Powder (B) | 251 | 624 |
| Alloy Powder (C) | 261 | 711 |
| Alloy Powder (D) | 268 | 750 |
| Alloy Powder (E) | 271 | 781 |
| Alloy Powder (F) | 268 | 689 |
| Alloy Powder (G) | 260 | 678 |
| Alloy Powder (H) | 231 | 426 |
| Alloy Powder (I) | 220 | 372 |
| Alloy Powder (J) | 251 | 608 |
| Alloy Powder (K) | 269 | 703 |
| Alloy Powder (L) | 274 | 776 |
| Alloy Powder (M) | 259 | 612 |

As apparent from the result shown in Table 3, when the alloy powders subjected to the heat treatment are used, a high electrode capacity can be obtained as shown in the alloy electrodes (A), (C)–(G) and (K)–(L). Further, it is confirmed that the batteries (A), (C)–(G) and (K)–(L) using the alloy powders subjected to the heat treatment can improve life characteristics to 650–794 cycles.

These phenomena are assumed to be achieved by the following mechanism. That is, the heat treatment effectively acts in the alloy electrodes (A), (C)–(G) and (K)–(L) to remove fine crystal distortions in the alloy structure. As a result, a hydrogen absorbing capability per unit weight of the alloy is improved. Therefore, the electrode capacity of these alloy electrodes is greatly increased as compared with that of the alloy electrode (M) not subjected to the heat treatment. Further, stress is reduced when hydrogen is absorbed/ released and the life characteristics of the batteries using these alloy electrodes are greatly improved. In particular, it is verified that when the alloy powders (A), (D), (E), (K) and (L) subjected to the heat treatment within the temperature range of 250°–350° C. for 1 hour or longer are used, the effect of improvement is particularly enhanced.

On the other hand, since the alloy powder (B) is subjected to the heat treatment at the low temperature of 150° C. and the alloy powder (J) is subjected to the heat treatment for the short time of 0.5 hour, they can not sufficiently remove the crystal distortions and can only obtain substantially the same electrode capacity and battery life as those of the alloy powder (M) not subjected to the heat treatment.

Further, since the alloy powders (H) and (I) are subjected to the heat treatment at the excessively high temperature of 550°–600° C., the composition of the alloy powders is varied by the reduction in the amount of the high volatile Mn and rare earth elements and the strength of the alloys is lowered by the secondary recrystallization and thus both the electrode capacity and battery life of them are lowered.

Embodiment 11

Various rapidly-quenched molten alloys were prepared by the molten-metal-rapidly-quenching method similar to the embodiment 10 while changing a substituted amount x of Mn. The rapidly-quenched molten alloys had the composition formula of $LmNi_{4.3-x}Co_{0.4}Mn_xAl_{0.3}$ and the substituted amount of Mn was changed to 0, 0.1, 0.3, 0.5, 0.8, and 1.2. Further, Lm was La-rich misch metal similar to that of the embodiment 10. The thus obtained rapidly-quenched molten alloys were used as they are without being subjected to .a heat treatment to form alloy electrodes. Further, the alloy electrodes were combined with nickel electrodes to prepare batteries and the electrode capacity and life of the batteries were measured.

Further, the respective alloys were subjected to a heat treatment under the conditions (heated in an Ar atmosphere at the temperature of 300° C. for 4 hours) which were most effective in the embodiment 10. Then, various hydrogen-absorbing alloy electrodes and AA type nickel-metal hydride batteries were prepared in the same way as the embodiment 10 and the electrode capacity and battery life thereof were measured. Note, the methods of measuring electrode capacity and battery life were the same as those of the embodiment 10.

On the other hand, as a comparative example, an electrode and battery having the same specification were made by using the ingot of the hydrogen-absorbing alloy having the composition of $Lm\ Ni_{4.0}Co_{0.4}Mn_{0.3}Al_{0.3}$ and prepared by a melting/casing method in place of the molten-metal-rapidly-quenching method and the electrode capacity and battery life (cycle life) thereof were measured in the same way to obtain the result shown in Table 4.

TABLE 4

| Substituted Amount of Mn (X) | Before Heat treatment | | After Heat treatment | |
|---|---|---|---|---|
| | Electrode Capacity (mAh/g) | Cycle Life (No. of Cycles) | Electrode Capacity (mAh/g) | Cycle Life (No. of Cycles) |
| 0.0 | 221 | 506 | 228 | 597 |
| 0.1 | 240 | 541 | 256 | 693 |
| 0.3 | 259 | 612 | 278 | 794 |
| 0.5 | 263 | 557 | 281 | 762 |
| 0.8 | 268 | 526 | 283 | 717 |
| 1.2 | 275 | 410 | 286 | 475 |
| Ingot (0.3) | 250 | 412 | 252 | 406 |

As apparent from the result shown in Table 4, the effect of the heat treatment is small in the alloy composition not containing Mn. On the other hand, the alloy compositions containing Mn obtain a great improvement effect in both the electrode capacity and battery life. When, however, the substituted amount of Mn exceeds 1 and reaches 1.2, the battery life is rapidly dropped and there is no significant difference between the characteristics of the conventional alloy ingot made by the melting/casing method and those of the rapidly-quenched molten alloys.

On the other hand, since the alloy ingot made by the melting/casing method has the segregations caused to the components constituting the alloy ingot and located in the wide range of the crystal structure thereof, the homogeneity of the alloy is not arisen under the heat treatment conditions limited in the method of this embodiment (heated at 300° C. for 4 hours). Therefore, the effect of the heat treatment is not almost realized and thus the improvement of the battery characteristics is difficult.

Embodiment 12

Six kinds of rapidly-quenched molten alloys were prepared by the molten-metal-rapidly-quenching method similar to the embodiment 11 while changing a substituted amount x of Mn. The rapidly-quenched molten alloys had the composition of $Lm\ Ni_{4.3-x}Co_{0.4}Mn_xCr_{0.3}$ and the substituted amount of Mn was changed to 0, 0.1, 0.3, 0.5, 0.8, and 1.2.

On the other hand, as a comparative example, the ingot of a hydrogen-absorbing alloy made by the melting/casing method and having the composition of $Lm\ Ni_{4.0}Co_{0.4}Mn_{0.3}Cr_{0.3}$ was prepared.

Then, alloy electrodes and AA type nickel-metal hydride batteries were made by using the above various kinds of the rapidly-quenched molten alloys and the ingot of the hydrogen-absorbing alloy in the same way as the embodiment 11 and the electrode capacity and battery life thereof were measured.

Further, the rapidly-quenched molten alloys and the ingot of the hydrogen-absorbing alloy were subjected to a heat treatment under the conditions (heated in an Ar atmosphere at the temperature of 300° C. for 4 hours) which were most effective in the embodiment 10. Then, hydrogen-absorbing alloy electrodes and AA type nickel-metal hydride batteries were prepared by using the various heat treated alloys and the electrode capacity and battery life (cycle life) thereof were measured in the same way as the embodiment 10, and the result shown in Table 5 was obtained.

TABLE 5

| Substituted Amount of Mn (X) | Before Heat treatment | | After Heat treatment | |
|---|---|---|---|---|
| | Electrode Capacity (mAh/g) | Cycle Life (No. of Cycles) | Electrode Capacity (mAh/g) | Cycle Life (No. of Cycles) |
| 0.0 | 218 | 415 | 221 | 436 |
| 0.1 | 243 | 530 | 262 | 603 |
| 0.3 | 256 | 575 | 270 | 756 |
| 0.5 | 264 | 544 | 277 | 741 |
| 0.8 | 270 | 524 | 285 | 705 |
| 1.2 | 277 | 371 | 290 | 449 |
| Ingot (0.3) | 258 | 386 | 259 | 403 |

As apparent from the result shown in Table 5, the alloy composition not containing Mn does not almost exhibit the improvement effect of the battery characteristics resulting from the heat treatment. On the other hand, the electrode capacity is increased and the battery life is extended by the heat treatment in the alloy components in which the substituted amount x of Mn is $0.1 \leq x \leq 1$.

When, however, the substituted amount x of Mn exceeds 1, it is confirmed that the battery life is lowered to the level same as that of the case in which the ingot of cast alloy is used, in the same way as the embodiment 11.

Embodiment 13

Five kinds of rapidly-quenched molten alloys were prepared by the molten-metal-rapidly-quenching method similar to the embodiment 11 while changing a substituted amount x of Cu. The rapidly-quenched molten alloys had the composition of Lm $Ni_{4.5-x}Mn_{0.5}Cu_x$ and the substituted amount x of Cu was changed to 0, 0.3, 0.5, 0.8, and 1.2, respectively.

On the other hand, as a comparative example, a hydrogen-absorbing alloy ingot made by the melting/casting method and having the composition of Lm $Ni_{4.2}Mn_{0.5}Cu_{0.3}$ was prepared.

Then, alloy electrodes and AA type nickel-metal hydride batteries were made by using the above various kinds of the rapidly-quenched molten alloys and the ingot of the hydrogen-absorbing alloy in the same way as the embodiment 11 and the electrode capacity and battery life thereof were measured.

Further, the rapidly-quenched molten alloys and the ingot of the hydrogen-absorbing alloy were subjected to the heat treatment in the Ar atmosphere at the temperature of 300° C. for 4 hours. Then, hydrogen-absorbing alloy electrodes and AA type nickel-metal hydride batteries were made by using the various heat treated alloys and the electrode capacity and battery life (cycle life) thereof were measured in the same way as the embodiment 10, and the result shown in Table 6 was obtained.

TABLE 6

| Substituted Amount of Mn (X) | Before Heat treatment | | After Heat treatment | |
|---|---|---|---|---|
| | Electrode Capacity (mAh/g) | Cycle Life (No. of Cycles) | Electrode Capacity (mAh/g) | Cycle Life (No. of Cycles) |
| 0.0 | 270 | 526 | 283 | 641 |
| 0.3 | 261 | 548 | 271 | 673 |
| 0.5 | 249 | 573 | 260 | 697 |
| 0.8 | 236 | 563 | 247 | 671 |
| 1.2 | 207 | 372 | 214 | 469 |
| Ingot (0.3) | 253 | 309 | 256 | 316 |

In the result shown in Table 6, since the substituted amount of Mn exhibiting large meritorious effects depending upon the presence or absence of the heat treatment is given, the variation of the characteristics of the alloy electrodes and batteries according to the embodiment 13 is relatively small as compared with the embodiments 10–12. From the tendency as a whole, however, it can be confirmed the tendency that both the electrode capacity and battery life are increased by the execution of the heat treatment.

Further, it is also confirmed that the electrode capacity is lowered by the increased substituted amount of Cu and that in particular, when the substituted amount is 1 or more, there is a tendency that the capacity is rapidly lowered. In addition, it is also confirmed that when the substituted amount exceeds 1, the cycle life is rapidly shortened.

According to the hydrogen-absorbing alloys for battery of the embodiments 10–13, since the molten alloys each having the predetermined composition containing Mn as an essential component element are prepared by being rapidly quenched, the alloy electrodes and batteries having a less amount of segregations, a high electrode capacity and long life can be formed.

In particular, it is possible to remove internal distortion while keeping the homogeneity of the alloys by further subjecting the above rapidly-quenched molten alloys to a heat treatment for 1 hour or longer at the temperature range of from 200° to 500° C. and preferably at the low temperature range of from 200° to 350° C. Therefore, nickel-metal hydride batteries having more excellent battery characteristics can be provided.

Embodiments 1A–9A

Hydrogen-absorbing alloy electrodes according to embodiments 1A–9A were prepared, respectively under the same conditions as those of the embodiments 1–9 except that hydrogen-absorbing alloys were made in such a manner that the respective rapidly-quenched molten alloys prepared by the single roll method in the embodiments 1–9 were further subjected to a heat treatment in an Ar gas atmosphere at the temperature of 300° C. for 4 hours. Further, the respective hydrogen-absorbing alloy electrodes (negative electrodes) were combined with a nickel electrode (positive electrode) to make AA type nickel-metal hydride batteries.

Next, the area ratios of the columnar structures, minor diameters of the columnar structures, maximum electrode capacity, life (the number of charge-discharge cycles), and the rising-up of the initial battery characteristics of the hydrogen-absorbing alloys were measured under the same conditions as those of the embodiment 1 and the like, and the results shown in Table 7 was obtained.

TABLE 7

| Specimen No. | Alloy Composition | Manufacturing Method | RPM of Cooling Roll (r.p.m) | Area Ratio of Columnar Structures (%) | | | | | Minor Dia of Columnar Structures (μm) | Characteristics | | |
|---|---|---|---|---|---|---|---|---|---|---|---|---|
| | | | | Aspect Ratio | | | | | | | | Number |
| | | | | 1:2 or higher | 1:3 or higher | 1:4 or higher | 1:5 or higher | As a whole | | Electrode Capacity (mAh/g) | Cycle Life (cycles) | of Activation (times) |
| Embodiment 1A | $LmNi_{4.0}Co_{0.4}Mn_{0.3}Al_{0.3}$ | Single Roll Method | 600 | 95 | 89 | 82 | 75 | 63 | 2.5 | 278 | 794 | 3 |
| Embodiment 2A | $LmNi_{3.8}Co_{0.4}Mn_{0.5}Al_{0.3}$ | Single Roll Method | 600 | 93 | 87 | 80 | 72 | 62 | 2.3 | 281 | 762 | 2 |
| Embodiment 3A | $LmNi_{4.0}Co_{0.4}Mn_{0.3}Cr_{0.3}$ | Single Roll Method | 600 | 97 | 85 | 79 | 71 | 60 | 2.3 | 270 | 756 | 3 |
| Embodiment 4A | $LmNi_{3.8}Co_{0.4}Mn_{0.5}Cr_{0.3}$ | Single Roll Method | 600 | 96 | 92 | 86 | 81 | 78 | 2.3 | 277 | 741 | 2 |
| Embodiment | $LmNi_{4.2}Mn_{0.5}Cu_{0.3}$ | Single | 600 | 98 | 93 | 87 | 78 | 62 | 2.6 | 271 | 673 | 2 |

TABLE 7-continued

| Specimen No. | Alloy Composition | Manufacturing Method | RPM of Cooling Roll (r.p.m) | Area Ratio of Columnar Structures (%) | | | | | Minor Dia of Columnar Structures (μm) | Characteristics | | |
|---|---|---|---|---|---|---|---|---|---|---|---|---|
| | | | | Aspect Ratio | | | | | | Electrode Capacity (mAh/g) | Cycle Life (cycles) | Number of Activation (times) |
| | | | | 1:2 or higher | 1:3 or higher | 1:4 or higher | 1:5 or higher | As a whole | | | | |
| ment 5A | | Roll Method | | | | | | | | | | |
| Embodiment 6A | LmNi$_{4.2}$Mn$_{0.8}$ | Single Roll Method | 600 | 94 | 90 | 82 | 79 | 65 | 2.7 | 283 | 548 | 2 |
| Embodiment 7A | LmNi$_{4.4}$Mn$_{0.3}$Al$_{0.3}$ | Single Roll Method | 600 | 97 | 89 | 77 | 73 | 45 | 2.5 | 274 | 567 | 2 |
| Embodiment 8A | LmNi$_{4.0}$Co$_{0.4}$Mn$_{0.3}$Fe$_{0.3}$ | Single Roll Method | 600 | 96 | 91 | 89 | 79 | 68 | 2.4 | 262 | 589 | 2 |
| Embodiment 9A | LmNi$_{4.0}$Co$_{0.4}$Mn$_{0.3}$Si$_{0.3}$ | Single Roll Method | 600 | 93 | 90 | 86 | 77 | 67 | 2.2 | 256 | 562 | 2 |

As apparent from the result shown in Table 7, since the hydrogen-absorbing alloys of the respective embodiments having been subjected to the heat treatment at the relatively low temperature of 300° C. effectively correct crystal distortions without damaging the homogeneity thereof, hydrogen can be easily absorbed and disabsorbed. Therefore, it is verified that the electrode capacity and the cycle life of the batteries are greatly improved as compared with the batteries using the respective hydrogen-absorbing alloys shown in Table 1. In particular, the battery capacity is increased by about 10%.

Comparative Examples 1A-1D

Figure 2:
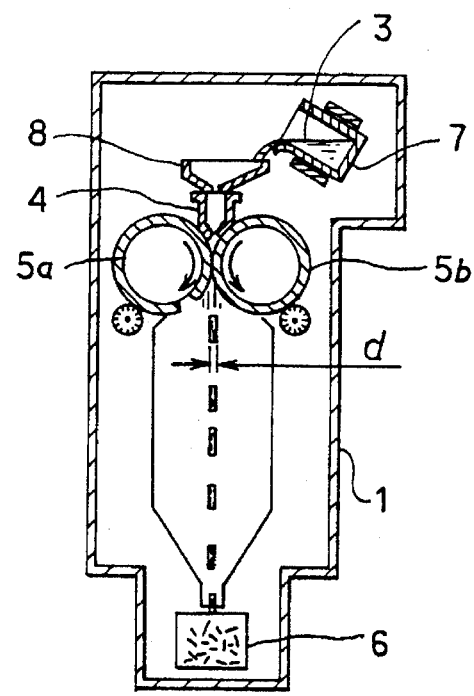
FIG. 2 is a schematic diagram showing a molten-molten-metal-rapidly-quenching apparatus using a double roll method.

Molten alloys were rapidly quenched by using a double roll apparatus having two iron cooling rolls with a diameter of 100 mm disposed in confrontation to each other as shown in FIG. 2 and hydrogen-absorbing alloys according to comparative examples 1A-1D having the final composition of Mm Ni$_{3.55}$Mn$_{0.4}$Al$_{0.3}$ Co$_{0.75}$ were prepared. Note, the rotation speed of the cooling rolls was set to 1500 rpm (comparative example 1A), 2000 rpm (comparative example 1B), 2500 rpm (comparative example 1C) and 3000 rpm (comparative example 1D), respectively.

Comparative Examples 2A-2D, 3A and 3B

Molten alloys were rapidly quenched by using a single roll apparatus having a copper cooling roll with a diameter of 300 mm and hydrogen-absorbing alloys according to comparative examples 2A-2D and 3A-3B having the final compositions shown in Table 8 were prepared. Note, the rotation speed of the cooling roll was set to 1000 rpm (comparative example 2A), 1500 rpm (comparative example 2B), 2000 rpm (comparative examples 2B and 2C), 2500 rpm (comparative example 2D), 200 rpm (comparative example 3A), and 200 rpm (comparative example 3B), respectively. Note, the rapid quenching was carried out in an Ar gas atmosphere at 1 atm., the distance between the extreme end of an injection nozzle for injecting the molten alloys and the cooling roll was set to 50 mm, and an injection pressure was set to 0.1 Kgf/cm$^2$.

Comparative Examples 4-6

Molten alloys were rapidly quenched by using a single roll apparatus having a copper cooling roll with a diameter of 300 mm and hydrogen-absorbing alloys according to comparative examples 4-6 having the final compositions shown in Table 8 were prepared, respectively. Note, the rapid quenching was carried out in an Ar gas atmosphere at 1 atm., the distance between the extreme end of an injection nozzle for injecting the molten alloys and the cooling roll was set to 50 mm, an injection pressure was set to 0.02 Kgf/cm$^2$, and the rotation speed of the cooling roll was set to 1000 rpm.

Note, as crucibles for preparing the molten alloys, there were used a crucible made of calcia (comparative example 4), a crucible made of alumina (comparative example 5) and a crucible made of quartz (comparative example 6), respectively.

Comparative Examples 7A-7D

A Molten alloy was rapidly quenched by using a single roll apparatus having a ceramic spray coated roll having a diameter of 300 mm and hydrogen-absorbing alloys according to comparative examples 7A-7D having the final compositions of Lm Ni$_{4.2}$Co$_{0.2}$Mn$_{0.3}$Al$_{0.3}$ were prepared. Note, the rapid quenching was carried out in an Ar gas atmosphere at 1 atm., the distance between the extreme end of an injection nozzle for injecting the molten alloy and the ceramic spray coating roll was set to 50 mm, an injection pressure was set to 0.1 Kgf/cm$^2$. Further, the rotation speed of the ceramic spray coating roll was set to 1000 rpm (comparative example 7A), 1500 rpm (comparative example 7B), 2000 rpm (comparative examples 7C), and 2500 rpm (comparative example 7D), respectively.

Comparative Examples 8A-9B

Molten alloys were rapidly quenched by using a single roll apparatus having a copper cooling roll with a diameter of 200 mm and hydrogen-absorbing alloys according to comparative examples 8A-9B having the final compositions shown in Table 9 were prepared. Note, the rapid quenching was carried out in an Ar gas atmosphere at 1 atm., the distance between the extreme end of an injection nozzle for injecting the molten alloys and the cooling roll was set to 50 mm, an injection pressure was set to 100 mm-H$_2$O, and the rotation speed of the cooling roll was set to 2000 rpm (comparative examples 8A), 2500 rpm (comparative example 8B), 2000 rpm (comparative examples 9A), and 2500 rpm (comparative example 9B), respectively.

Comparative Examples 10–13

The materials of hydrogen-absorbing alloy powder were adjusted so that the compositions of alloy ingots had the composition of Mm $Ni_{3.2}Co_{1.4}Al_{0.5}$ (comparative example 10), Mm $Ni_{3.2}Co_{1.1}Al_{0.7}$ (comparative example 11), Mm $Ni_{3.5}Co_{0.7}Al_{0.8}$ (comparative example 12), and Mm $Ni_{3.7}Co_{0.4}Al_{0.9}$ (comparative example 13), respectively and were put into a crucible made of alumina, and molten alloys were prepared by melting them at 1400° C. by a high frequency induction heating. Next, the molten alloys were cast in a water-cooled steel casting mold and solidified to make the ingots of the hydrogen-absorbing alloys according to the comparative examples 10–13, respectively.

Comparative Examples 14A–14B

The material of a hydrogen-absorbing alloy powder adjusted so that the composition of an alloy ingot had the composition of $Ni_{3.55}Co_{0.75}Mn_{0.4}Al_{0.3}$ was put into a crucible made of mullite and melted by being heated to 1500° C. by a high frequency induction heating coil disposed around the outside periphery of the crucible to prepare a molten alloy. Next, the thus obtained molten alloy was cast in a water-cooled steel casting mold and alloy ingots were prepared with the distance between casting mold surfaces set to 55 mm (comparative example 14A) and 35 mm (comparative example 14B) at a casting speed of 3 Kg/sec./m². Further, the thus obtained alloy ingots were subjected to a heat treatment in an argon gas atmosphere at 1050° C. for 6 hours to prepare hydrogen-absorbing alloys according to the comparative examples 14A–14B, respectively.

Comparative Examples 15–20

As comparative examples 15, 16, 18–20, the materials of hydrogen-absorbing alloy powders adjusted so that the composition of alloy ingots had the values shown in Table 9 were put into a crucible made of alumina and heated to 1400° C. by high frequency induction heating to prepare molten alloys. Note, in the comparative example 17, the molten alloy was prepared by an arc melting method. Next, the thus obtained respective molten alloys were cast in a water-cooled casting mold and solidified to prepare the ingots of hydrogen-absorbing alloys according to the comparative examples 15–20. In addition, the ingot of the hydrogen-absorbing alloy of the comparative example 16 was further subjected to a heat treatment in an Ar gas atmosphere at 1000° C. for 6 hours.

The thus obtained rapidly-quenched molten alloys or hydrogen-absorbing alloys according to the comparative examples 1A–20 were pulverized by a stamp mill and classified to 200 mesh or less to prepare hydrogen-absorbing alloy powders for battery. Next, hydrogen-absorbing alloy electrodes (negative electrodes) were prepared by using the respective hydrogen-absorbing alloy powders for battery in the same procedure as that of the embodiment 1 and combined with a nickel electrode (positive electrode) to assemble AA type nickel-metal hydride batteries. Then, the electrode capacity, the number of charge/discharge cycles (life) and the number of activations of the electrodes were measured by the same method as that of the embodiment 1 and the results shown in Tables 8 and 9 were obtained.

TABLE 8

| Specimen No. | Alloy Composition | Manufacturing Method | RPM of Cooling Roll (r.p.m) | Area Ratio of Columnar Structure (%) | | | | |
|---|---|---|---|---|---|---|---|---|
| | | | | Aspect Ratio | | | | |
| | | | | 1:2 or higher | 1:3 or higher | 1:4 or higher | 1:5 or higher | As a whole |
| Comparative Example 1A | $MmNi_{3.55}Mn_{0.3}Al_{0.3}Co_{0.75}$ | Single Roll Method | 1500 | 48 | 44 | 35 | 25 | 22 |
| Comparative Example 1B | $MmNi_{3.55}Mn_{0.4}Al_{0.3}Co_{0.75}$ | Single Roll Method | 2000 | 38 | 30 | 25 | 15 | 19 |
| Comparative Example 1C | $MmNi_{3.55}Mn_{0.4}Al_{0.3}Co_{0.75}$ | Single Roll Method | 2500 | 33 | 28 | 20 | 12 | 12 |
| Comparative Example 1D | $MmNi_{3.55}Mn_{0.4}Al_{0.3}Co_{0.75}$ | Single Roll Method | 3000 | 25 | 19 | 13 | 7 | 10 |
| Comparative Example 2A | $MmNi_{3.3}CoAl_{0.3}Mn_{0.6}$ | Single Roll Method | 1000 | 49 | 47 | 38 | 31 | 23 |
| Comparative Example 2B | $MmNi_{3.2}CoAl_{0.2}Mn_{0.6}$ | Single Roll Method | 1500 | 40 | 33 | 22 | 17 | 19 |
| Comparative Example 2B' | $MmNi_{1.3}Ni_{3.2}CoAl_{0.2}Mn_{0.6}$ | Single Roll Method | 2000 | 25 | 18 | 15 | 9 | 8 |
| Comparative Example 2C | $MmNi_{3.2}CoAl_{0.2}Mn_{0.6}$ | Single Roll Method | 2000 | 21 | 18 | 10 | 7 | 8 |
| Comparative Example 2D | $MmNi_{3.2}CoAl_{0.2}Mn_{0.6}$ | Single Roll Method | 2500 | 9 | 8 | 5 | 2 | 3 |
| Comparative Example 3A | $MmNi_{3.2}CoAl_{0.2}Mn_{0.6}$ | Single Roll Method | 200 | 11 | 10 | 8 | 5 | 3 |
| Comparative Example 3B | $Mm_{1.4}Ni_{3.2}CoAl_{0.2}Mn_{0.6}$ | Single Roll Method | 200 | 10 | 9 | 7 | 4 | 2 |
| Comparative Example 4 | $MmNi_5Ca_{0.01}$ | Single Roll Method | 1000 | 13 | 12 | 9 | '5 | 6 |
| Comparative Example 5 | $MmNi_5Al_{0.01}$ | Single Roll Method | 1000 | 10 | 9 | 5 | 2 | 4 |
| Comparative Example 6 | $MmNi_5Si_{0.01}$ | Single Roll Method | 1000 | 15 | 9 | 7 | 3 | 7 |
| Comparative Example 7A | $LmNi_{4.2}Co_{0.2}Mn_{0.3}Al_{0.3}$ | Single Roll Method | 1000 | 47 | 41 | 35 | 19 | 21 |
| Comparative Example 7B | $LmNi_{4.2}Co_{0.2}Mn_{0.3}Al_{0.3}$ | Single Roll Method | 1500 | 31 | 28 | 21 | 19 | 12 |
| Comparative Example 7C | $LmNi_{4.2}Co_{0.2}Mn_{0.3}Al_{0.3}$ | Single Roll Method | 2000 | 15 | 14 | 8 | 5 | 8 |
| Comparative Example 7D | $LmNi_{4.2}Co_{0.2}Mn_{0.3}Al_{0.3}$ | Single Roll Method | 2500 | 7 | 6 | 4 | 2 | 2 |

| Specimen No. | Minor Dia of Columnar Structures (μm) | Characteristics | | |
|---|---|---|---|---|
| | | Electrode Capacity (mAh/g) | Cycle Life (cycles) | Number of Activation (times) |
| Comparative Example 1A | 2.2 | 212 | 521 | 7 |
| Comparative Example 1B | 2.1 | 208 | 501 | 6 |
| Comparative Example 1C | 2.2 | 210 | 485 | 6 |
| Comparative Example 1D | 1.8 | 212 | 468 | 6 |
| Comparative Example 2A | 2.2 | 228 | 515 | 7 |

TABLE 8-continued

| | | | | |
|---|---|---|---|---|
| Comparative Example 2B | 2.0 | 227 | 497 | 8 |
| Comparative Example 2B' | 1.8 | 235 | 415 | 7 |
| Comparative Example 2C | 1.9 | 229 | 473 | 6 |
| Comparative Example 2D | 1.6 | 226 | 456 | 7 |
| Comparative Example 3A | 2.3 | 223 | 459 | 8 |
| Comparative Example 3B | 2.0 | 235 | 430 | 7 |
| Comparative Example 4 | 1.6 | 204 | 317 | 7 |
| Comparative Example 5 | 1.8 | 208 | 342 | 7 |
| Comparative Example 6 | 1.7 | 199 | 357 | 7 |
| Comparative Example 7A | 2.4 | 227 | 480 | 5 |
| Comparative Example 7B | 1.8 | 223 | 467 | 7 |
| Comparative Example 7C | 1.7 | 225 | 465 | 6 |
| Comparative Example 7D | 1.7 | 226 | 448 | 6 |

TABLE 9

| Specimen No. | Alloy Composition | Manufacturing Method | RPM of Cooling Roll (r.p.m) | Area Ratio of Columnar Structure (%) Aspect Ratio 1:2 or higher | 1:3 or higher | 1:4 or higher | 1:5 or higher | As a whole | Minor Dia of Columnar Structures (μm) |
|---|---|---|---|---|---|---|---|---|---|
| Comparative Example 8A | $LaNi_{4.6}Al_{0.4}$ | Single Roll Method | 2000 | 12 | 11 | 7 | 5 | 3 | 2.4 |
| Comparative Example 8B | $LaNi_{4.6}Al_{0.4}$ | Single Roll Method | 2500 | 6 | 5 | 3 | 1> | 2 | 2.2 |
| Comparative Example 9A | $LaNi_{4.0}Co_{0.6}Al_{0.4}$ | Single Roll Method | 2000 | 21 | 18 | 13 | 7 | 9 | 2.1 |
| Comparative Example 9B | $LaNi_{4.0}Co_{0.6}Al_{0.4}$ | Single Roll Method | 2500 | 9 | 4 | 2 | 1> | 3 | 2.2 |
| Comparative Example 10 | $MmNi_{3.0}Co_{1.4}Al_{0.6}$ | Casting Method | — | 30 | 28 | 25 | 22 | 14 | 2.6 |
| Comparative Example 11 | $MmNi_{3.2}Co_{1.1}Al_{0.7}$ | Casting Method | — | 39 | 37 | 31 | 23 | 23 | 2.5 |
| Comparative Example 12 | $MmNi_{3.5}Co_{0.7}Al_{0.8}$ | Casting Method | — | 35 | 31 | 29 | 25 | 16 | 2.2 |
| Comparative Example 13 | $MmNi_{3.7}Co_{0.4}Al_{0.9}$ | Casting Method | — | 28 | 23 | 17 | 11 | 13 | 2.5 |
| Comparative Example 14A | $MmNi_{3.55}Co_{0.75}Mn_{0.4}Al_{0.3}$ | Casting Method | — | 85 | 43 | 22 | 10 | 5 | 120 |
| Comparative Example 14B | $MmNi_{3.55}Co_{0.75}Mn_{0.4}Al_{0.3}$ | Casting Method | — | 93 | 47 | 35 | 27 | 11 | 100 |
| Comparative Example 15 | $MmNi_{3.5}Co_{0.7}Al_{0.8}$ | Casting Method | — | Max. Crystal Grain Size 150 μm | | | | | |
| Comparative Example 16 | $MmNi_{3.7}Al_{0.5}Fe_{0.7}Cu_{0.1}$ | Casting Method | — | Max. Crystal Grain Size 200 μm | | | | | |
| Comparative Example 17 | $MmNi_{3.8}Co_{0.2}Al_{0.5}$ | Casting Method | — | Max. Crystal Grain Size 100 μm | | | | | |
| Comparative Example 18 | $LaNi_{4.5}Al_{0.5}$ | Casting Method | — | Max. Crystal Grain Size 170 μm | | | | | |
| Comparative Example 19 | $LaNi_{4.7}Al_{0.3}$ | Casting Method | — | Max. Crystal Grain Size 180 μm | | | | | |
| Comparative Example 20 | $LaNi_{4.2}Co_{0.3}Sn_{0.2}Al_{0.3}$ | Casting Method | — | Max. Crystal Grain Size 170 μm | | | | | |

| Specimen No. | Characteristics Electrode Capacity (mAh/g) | Cycle Life (cycles) | Number of Activation (times) |
|---|---|---|---|
| Comparative Example 8A | 225 | 376 | 6 |
| Comparative Example 8B | 223 | 360 | 7 |
| Comparative Example 9A | 200 | 462 | 6 |
| Comparative Example 9B | 205 | 447 | 7 |
| Comparative Example 10 | 200 | 497 | 8 |
| Comparative Example 11 | 207 | 525 | 8 |
| Comparative Example 12 | 215 | 509 | 7 |
| Comparative Example 13 | 219 | 475 | 8 |
| Comparative Example 14A | 260 | 432 | 6 |
| Comparative Example 14B | 262 | 441 | 5 |
| Comparative Example 15 | 200 | 520 | 7 |
| Comparative Example 16 | 210 | 70 | 8 |
| Comparative Example 17 | 208 | 440 | 7 |
| Comparative Example 18 | 220 | 385 | 7 |
| Comparative Example 19 | 233 | 370 | 5 |
| Comparative Example 20 | 207 | 390 | 6 |

As apparent from the result shown in Table 8 and Table 9, in each of the hydrogen-absorbing alloys shown in the comparative examples 1A–20, the area ratio of the columnar structures in a metal structure is reduced as compared with that of the embodiments shown in Tables 1 and 7. Therefore, it is confirmed that the electrode capacity using these alloys is low and the battery life (cycle life) represented by the number of charge/discharge cycles is also short.

Further, in the electrodes of the comparative examples, the number of charge/discharge cycles (the number of activations) necessary to obtain a maximum electrode capacity is 5–9 times which are twice or more the 2–3 times of the embodiments, and thus it is confirmed that the initial rising-up property of the electrodes is also low.

In particular, the columnar structures are not sufficiently grown even in the hydrogen-absorbing alloys according to the comparative examples 1A–1D, 2A–2D, 3A–3B, 7A–7D each added with Mn in the same way as the embodiments and the ratio of equi-axed crystals are increased in some cases, and thus the battery characteristics are lowered as compared with the embodiments shown in Tables 1 and 7.

Figure 27:
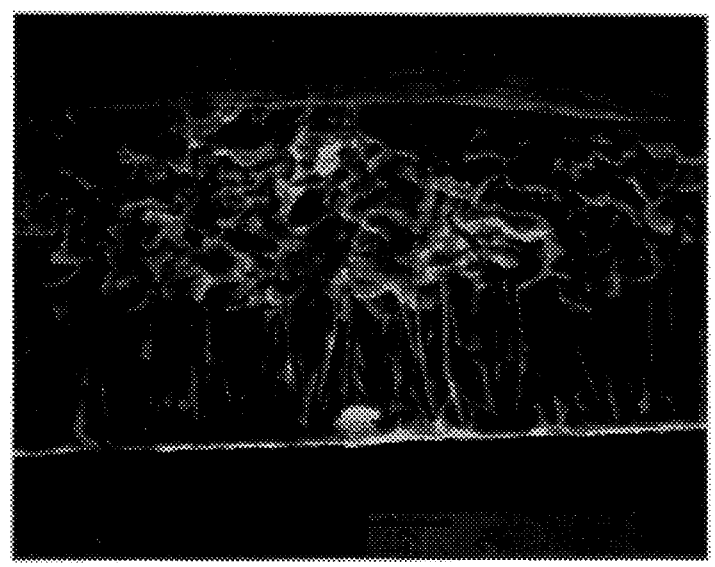
FIG. 27 is a photograph taken by an electron microscope to show the metal structure of the hydrogen-absorbing alloy according to a comparative example 7B.

FIG. 27 is a photograph taken by an electron microscope (SEM) to show the metal structure of the cross section of the hydrogen-absorbing alloy according to the comparative example 7B. In FIG. 27, the lower portion of the cross section is a quenched side in contact with the cooling roll and the upper portion thereof is a free side. Columnar structures are grown from the quenched side toward the free side, whereas an equi-axed crystal structure is formed in the portion near to the free side because of an insufficient quenching rate. The area ratio of the columnar structures in an entire crystal structure is 50% or less.

Further, in the batteries using the hydrogen-absorbing alloys according to the comparative examples 4, 5, 6 8A–9B to which Mn is not contained, an electrode capacity is about 200–225 mAh/g and further a battery life is as low as 300–400 cycles.

Further, it is found that the hydrogen-absorbing alloys according to the comparative examples 10–13 made by being gradually cooled by the casting method have a small area ratio of columnar structures, low electrode capacity and a bad initial rising-up property of electrode.

On the other hand, it is found that the hydrogen-absorbing alloys containing Mn according to the comparative examples 14A–14B made by being gradually cooled by the casting method have sufficiently grown columnar structures, but a battery life is short and an initial rising-up property of electrode is bad because the minor diameter of the columnar structures is as large as 100–120 microns, although a relatively high electrode capacity can be obtained.

Further, the hydrogen-absorbing alloys without containing Mn according to the comparative examples 15–20 made by being gradually cooled by the casting method have a crystal particle size increased to about 100–200 microns, and thus an alloy strength is lowered and a battery life is short.

As described above, when the respective embodiments shown in Tables 1 and 7 are compared with the respective comparative examples shown in Tables 8 and 9, it is found that the hydrogen-absorbing alloys and batteries according to the embodiments satisfy all of the three leading characteristics of the electrode capacity, battery life and initial rising-up property.

Next, the relationship between the crystal particle size and the battery life of hydrogen-absorbing alloy will be described with reference to the following embodiments and comparative examples.

Embodiments 14–17 and Comparative Examples 21–22

The material of an alloy powder adjusted so that the composition of a hydrogen-absorbing alloy was Lm $Ni_{4.0}Co_{0.4}Mn_{0.3}Al_{0.3}$ was put into a an crucible and heated by high frequency induction heating to prepare a molten alloy.

As embodiments 14–17, respective hydrogen-absorbing alloys were made by rapidly quenching the molten alloy by using a single roll apparatus having a cooling roll with a diameter of 300 mm. The material and the rotating speed of the cooling roll were set as shown in Table 10.

On the other hand, as comparative examples 21–22, respective hydrogen-absorbing alloys were made in such a manner that the above molten alloy was put into a water-cooled copper casting mold and cast with the distance between casting mold surfaces set to 45 mm (comparative example 21) and 80 mm (comparative example 22).

Hydrogen-absorbing alloy electrodes (negative electrodes) were prepared by crushing the hydrogen-absorbing alloys according to the embodiments 14–17 and comparative examples 21–22 under the same conditions as those of the embodiment 1 and further combined with nickel electrodes (positive electrodes) to prepare nickel-metal hydride batteries. Then, the number of charge/discharge cycles of the respective batteries was measured under the same conditions as the embodiment 1, and the result shown in Table 10 was obtained.

TABLE 10

| Specimen No. | Manufacturing Method | Material of Cooling Roll or Casting Mold | RPM of Cooling Roll (r.p.m) | Dia. of Crystal Grains (Minor Dia.) (μm) | Cycle Life (cycles) |
| --- | --- | --- | --- | --- | --- |
| Embodiment 14 | Single Roll Method | Cu | 600 | 2.5 | 612 |
| Embodiment 15 | Single Roll Method | Fe | 600 | 9 | 593 |
| Embodiment 16 | Single Roll Method | Fe + 5 μm thick Cr plated | 600 | 19 | 543 |
| Embodiment 17 | Single Roll Method | $Si_3N_4$ | 300 | 28 | 511 |
| Comparative Example 21 | Casting Method | Cu | — | 83 | 448 |
| Comparative Example 22 | Casting Method | Cu | — | 105 | 440 |

Figure 28:
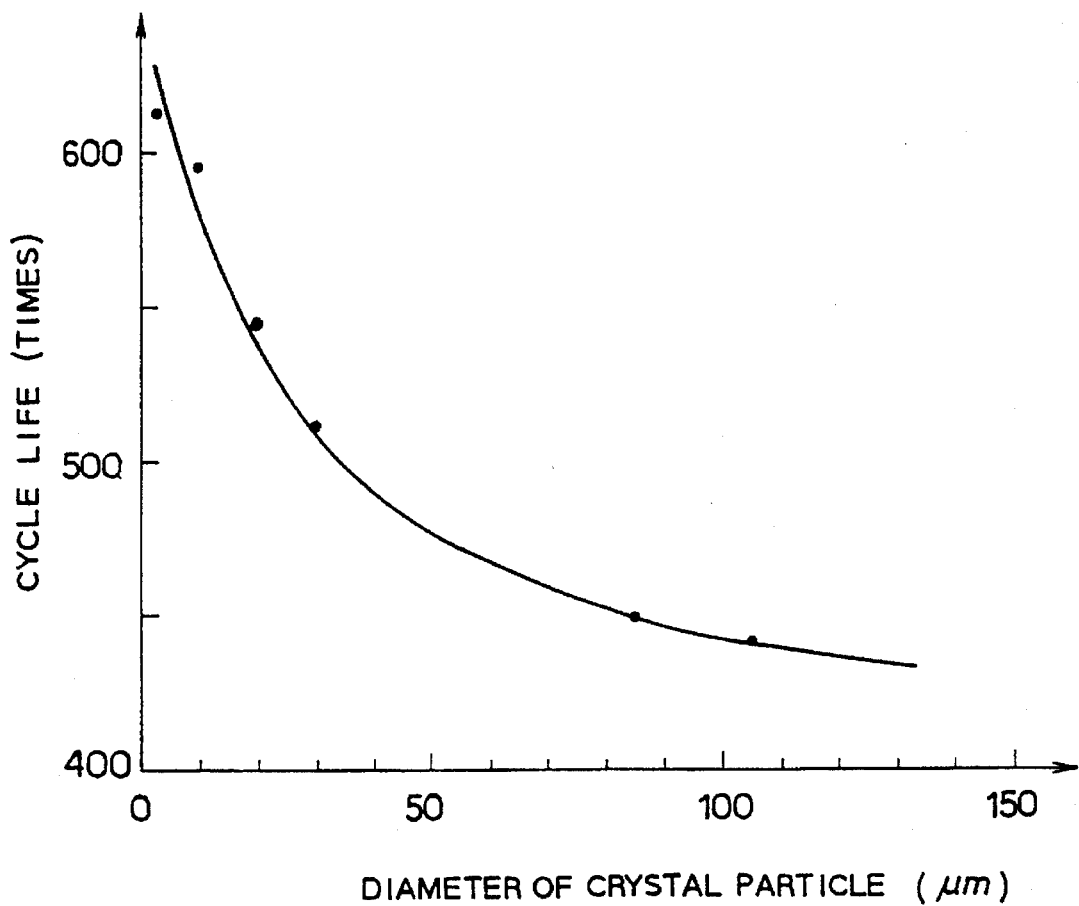
FIG. 28 is a characteristic diagram showing the relationship between the diameter of crystal particles of a hydrogen absorbing alloy and the cycle life of the battery.
Figure 29:
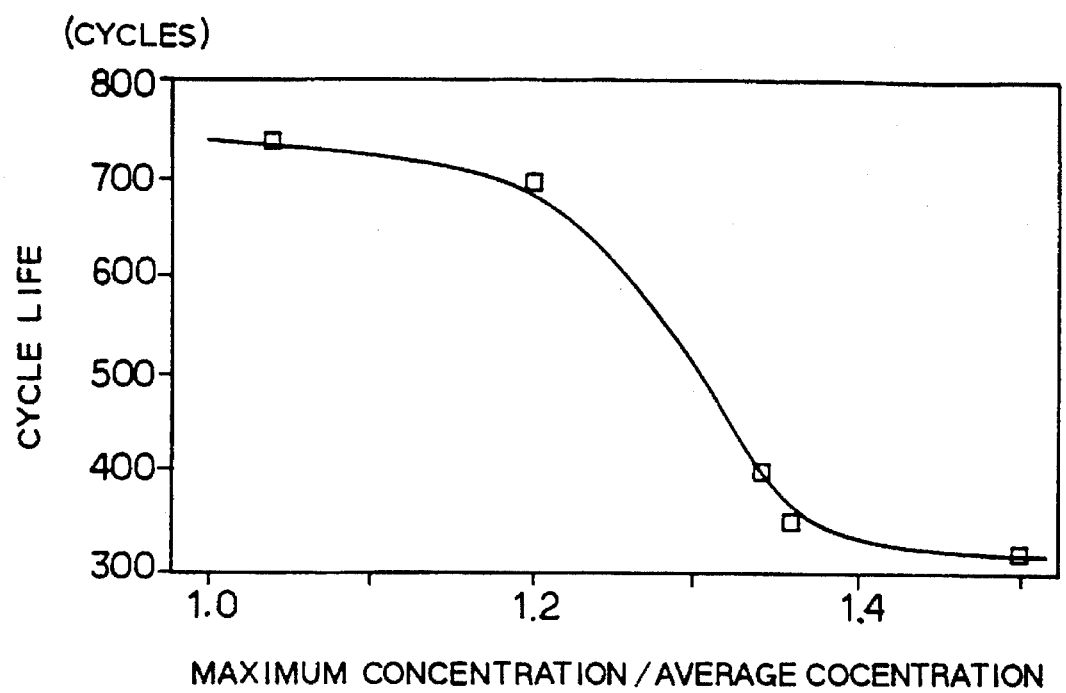
FIG. 29 is a characteristic diagram showing the relationship between the ratio of the maximum value to the average value of the Mn concentration in an alloy and the cycle life of the battery.
Figure 30:
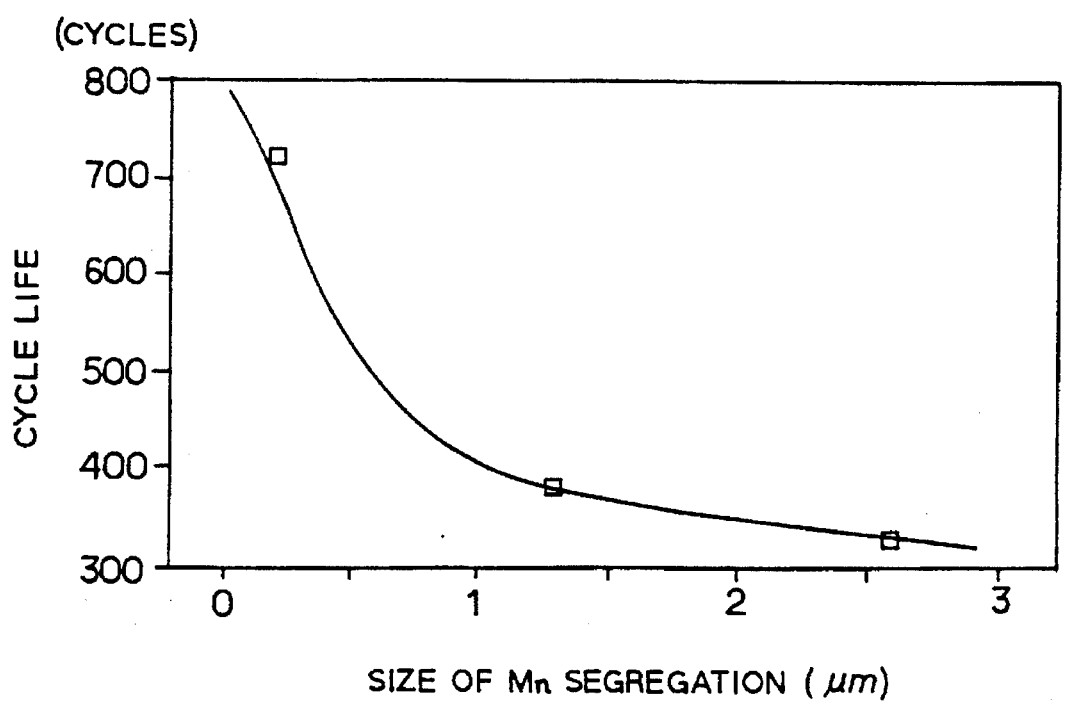
FIG. 30 is a characteristic diagram showing the relationship between the maximum diameter of the Mn particles segregated in an alloy and the cycle life of the battery.

Further, FIG. 28 shows the relationship between the crystal particle size and the cycle life. Note, in the embodiments 14–17 having grown columnar structures, the crystal particle size is shown by a minor diameter.

As apparent from the result shown in Table 10 and FIG. 28, it is found that as the crystal particle size is increased, a battery life tends to be rapidly shortened. To achieve the battery life (the number of charge/discharge cycles) of 500 cycles or more, the crystal particle size of the hydrogen-absorbing alloy used to negative electrode must be set to 30 microns or less.

Embodiments 18A–18C and Comparative Example 23

As embodiments 18A–18C, the material of an alloy powder adjusted so that the composition of a hydrogen-absorbing alloy was Lm $Ni_{0.4}Co_{0.4}Mn_{0.3}Al_{0.3}$ was put into a crucible made of Ti-boride and heated by high frequency induction heating to prepare a molten alloy. On the other hand, the molten alloy was rapidly quenched at an average quenching rate of 2400°–3100° C./sec. by using a single roll apparatus having a cooling roll (cooling water temperature: 20° C.) with a diameter of 300 mm made of copper to make the hydrogen-absorbing alloys of the embodiments 18A–18C.

The quenching rate was calculated as follows. When the molten alloy was injected from an nozzle, the molten alloy was rapidly quenched and solidified because the heat thereof was conducted to the cooling roll, and then the rapidly quenched and solidified alloy was exfoliated from the cooling roll and driven away from the cooling roll: when the cooling roll was rotated at about 600 rpm, the rapidly quenched alloy was exfoliated and driven away from the cooling roll after it had been completely solidified, whereas when the cooling roll was rotated at about 1000 rpm, the rapidly quenched alloy was exfoliated and driven away from the cooling roll before it had been completely solidified because the cooling roll had a strong centrifugal force. Although the moving distance of the molten alloy from the time at which it came into contact with the cooling roll to the time at which it was exfoliated therefrom changed depending upon the composition of the alloy, when the injecting state of the molten metal of the embodiment 18A (rotation: 600 rpm) was photographed by a high-speed video camera, that distance corresponded to ⅛ rotation of the cooling roll. When the time necessary to move this distance was assumed to be a quenching time, the quenching time was ⅟80 sec. Then, since the time necessary to drop the temperature of the molten alloy from an injecting temperature (1380° C.) to a solidifying point (1350° C.) was ⅟80 sec., the quenching rate was about 2400° C./sec. Since, however, there was a dispersion in the position where the alloy was exfoliated, an average quenching rate was employed.

On the other hand, as a comparative example 23, the material of an alloy powder adjusted so that the composition of a hydrogen-absorbing alloy was Lm $Ni_{3.5}Co_{0.7}Mn_{0.4}Zn_{0.1}Al_{0.3}$ was put into a crucible made of alumina and heated by high frequency induction heating to prepare a molten alloy. On the other hand, the molten alloy was rapidly quenched at a quenching rate of 1150° C./sec. by using a single roll apparatus having an iron cooling roll (cooling water temperature: 50° C., rpm: 200) with a diameter of 300 mm to make the hydrogen-absorbing alloy.

Then, hydrogen-absorbing alloy electrodes (negative electrodes) were prepared by crushing the hydrogen-absorbing alloys according to the embodiments 18A–18C and comparative example 23 under the same conditions as those of the embodiment 1 and further combined with nickel electrodes (positive electrodes) to prepare nickel-metal hydride batteries. Then, the number of charge/discharge cycles of the respective batteries was measured under the same conditions as the embodiment 1 as well as the hydrogen-absorbing alloys were taken out and the ratio of the columnar structures in the metal structure of each of the hydrogen-absorbing alloys was measured, and the result shown in Table 11 was obtained.

TABLE 11

| Specimen No. | Average Quenching Rate (°C./sec) | Area Ratio of Columnar Structures (%) | | | | | Minor Dia of Columnar Structures (μm) | Characteristics | | |
| --- | --- | --- | --- | --- | --- | --- | --- | --- | --- | --- |
| | | Aspect Ratio | | | | As a Whole | | Electrode Capacity (mAh/g) | No. of Charge/Discharge Cycles (cycles) | No. of Activation (times) |
| | | 1:2 or higher | 1:3 or higher | 1:4 or higher | 1:5 or higher | | | | | |
| Embodiment 18A | 2400 | 96 | 90 | 83 | 75 | 63 | 1.9 | 261 | 610 | 3 |
| Embodiment 18B | 2700 | 94 | 91 | 87 | 77 | 65 | 1.7 | 263 | 612 | 2 |
| Embodiment 18C | 3100 | 95 | 93 | 84 | 78 | 63 | 1.7 | 262 | 612 | 2 |
| Comparative Example 23 | 1150 | 20 | 18 | 9 | 7 | 2.2 | 5 | 255 | 480 | 4 |

As apparent from the result shown in Table 11, the alloys according to the embodiments 18A–18C prepared at the increased peripheral speed of the cooling roll and the high quenching rate have sufficiently grown columnar structures and exhibit excellent battery characteristics as compared with the comparative example 23 quenched at the low quenching rate.

Embodiment 19

Next, the composition ratio x of a rare earth element A and the other elements B in the hydrogen-absorbing alloy composed $AB_x$ was changed in the range of from 4.4 to 6.1 and the effect of the change of the composition ratio x on the electrode capacity and the number of charge/discharge cycles was investigated. That is, various hydrogen-absorbing alloys represented by Lm $(Ni_{0.8}Co_{0.08}Mn_{0.06}Al_{0.06})_x$ were made by rapidly quenching a molten alloy at a quenching rate of 2400° C./sec.

When the composition ratio x=5, this hydrogen-absorbing alloy corresponded to the hydrogen-absorbing alloy of the first embodiment. The thus obtained respective hydrogen-absorbing alloy were processed in the same way as the embodiment 1 to make negative electrodes, and the electrode capacity of the negative electrodes was measured as well as the negative electrodes were combined with a positive electrode to assemble nickel-metal hydride batteries and the number of charge/discharge cycles thereof were measured, and the result shown in FIG. 31 was obtained.

Figure 31:
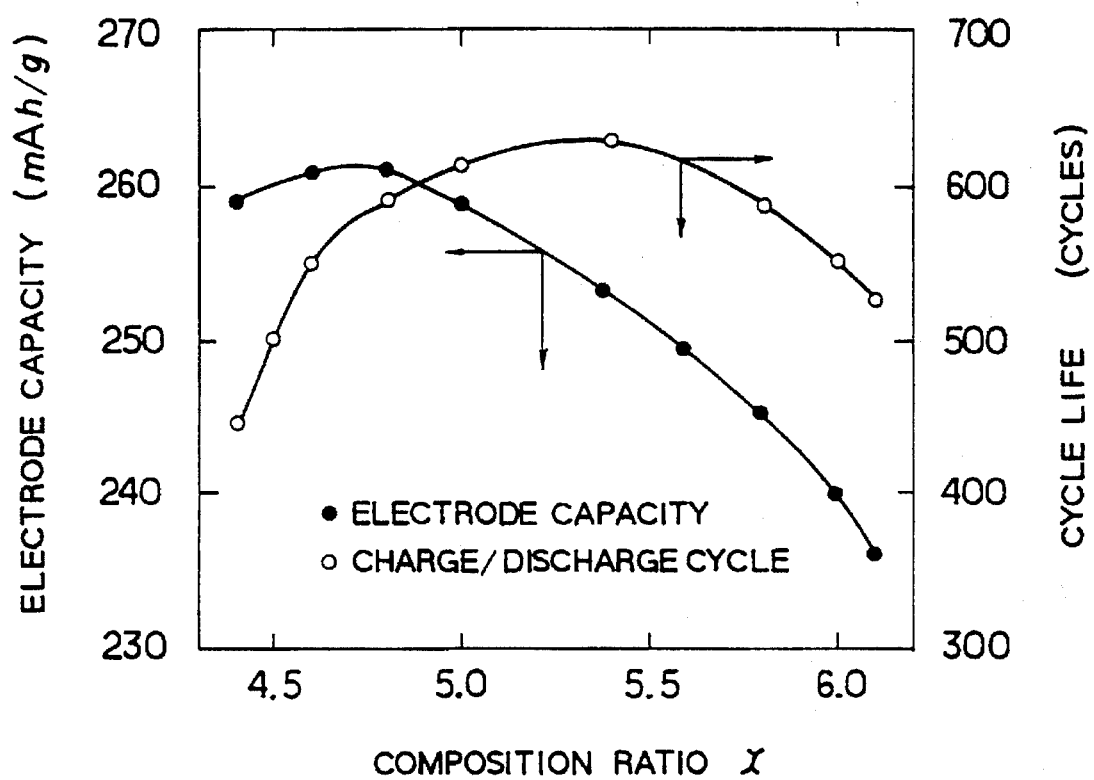
FIG. 31 is a characteristic diagram showing the relationship between the composition ratio x, electrode capacity, and the cycle life in an embodiment 19.

As apparent from the result shown in FIG. 31, it is confirmed that the electrode capacity is 240 mAh/g or more within the range of 4.5≦x≦6.0 limited in the present invention and the excellent battery characteristics such as the number of charge/discharge cycles of 500 times or more are achieved. Further, it is also verified that the excellent battery characteristics of the electrode capacity of 250 mAh/g or more and the number of charge/discharge cycles of 550 times or more are achieved in the more preferable range (4.6≦x≦5.8) of the composition ratio x.

As described above, the hydrogen-absorbing alloy for battery according to this embodiment is an $AB_5$ type alloy containing Mn as an essential element, which can provide a negative electrode material having a high electrode capacity and excellent cycle life and initial characteristics used to secondary nickel-metal hydride battery because the components constituting the hydrogen-absorbing alloy have a less amount of segregations. The above alloy can be obtained by rapidly quenching a molten alloy at a quenching rate of 1800° C./sec. or higher.

Further, internal distortions can be removed while maintaining the homogeneity of the alloy by subjecting the above rapidly-quenched molten alloy to a heat treatment at a relatively low temperature of about 200°–500° C., by which a nickel-metal hydride battery excellent in battery characteristics can be provided.

Further, other embodiments of the present invention will be described together with comparative examples.

Embodiment 20

(Manufacture of Alloy)

When a hydrogen-absorbing alloy having a stoichiometric composition of $LmNi_{4.0}Co_{0.4}Mn_{0.3}Al_{0.3}$ (Lm: La-rich misch metal) was made, materials were weighed in the weight ratio for achieving a non-stoichiometric composition without destroying the composition ratio of Ni, Co, Mn, Al by reducing the amount of Lm when the materials were weighed. Next, these materials were melted in a high frequency induction heating-furnace and accommodated to the ladle 2 of the aforesaid manufacturing apparatus employing the single roll method shown in FIG. 1 and a molten hydrogen-absorbing alloy 3 was dropped onto a cooled cooling roll 5 from the ladle 2 so that six kinds of flake-shaped hydrogen-absorbing alloys 6 (specimens a–f) were obtained.

The composition of the thus obtained alloys is shown in Table 12. Further, these alloys were pulverized in a ball mill and then classified through a sieve of 200 mesh to make hydrogen-absorbing alloys for electrode.

TABLE 12

| Symbol of Alloy Specimen | Alloy Composition ($AB_x$) |
|---|---|
| a | $AB_{5.0}$ |
| b | $AB_{5.05}$ |
| c | $AB_{5.5}$ |
| d | $AB_{5.8}$ |
| e | $AB_{6.0}$ |
| f | $AB_{6.2}$ |

Further, the thus obtained hydrogen-absorbing alloys (specimens a–f in Table 12) were measured by an X-ray diffraction in accordance with an internal standard method. As a result, it is confirmed that 95 vol % or more of the specimens a–e was a single phase composed of $AB_x$. Further, it is also found that 10 vol % or more of a phase (second phase) having a composition other than $AB_x$ is grown in the specimen f.

(Manufacture of Electrode)

The respective hydrogen-absorbing alloy powders, polytetrafluoroethylene (PTFE) powder and ketchen black were weighed to 95.5 wt %, 4 wt % and 0.5 wt %, respectively and then stirred and mixed by a cutter mill until the PTFE was made to fibers. The thus obtained cotton-like mixture was scattered onto a nickel metal net and rolled by a roller press to make hydrogen-absorbing alloy electrodes (negative electrodes).

(Manufacture of Battery)

A paste was prepared by adding a small amount of CMC (carboxymethyl cellulose) and 50 wt % of water to 90 wt % of nickel hydroxide and 10 wt % of cobalt monoxide and stirring and mixing them. That paste was filled to a porous nickel member having a three-dimensional structure and dried and rolled by a roller press to make nickel electrodes (positive electrodes).

Figure 3:
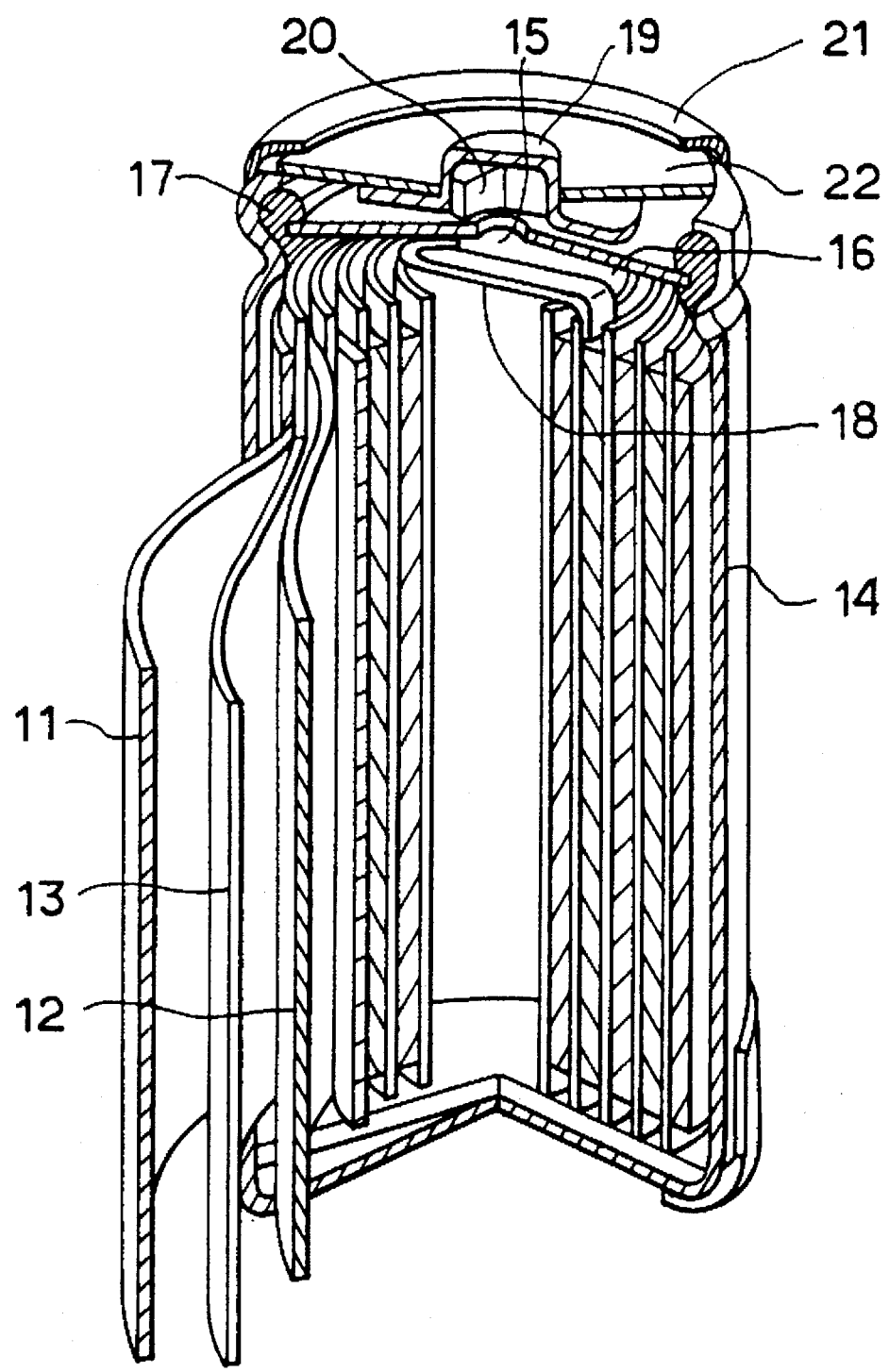
FIG. 3 is a perspective view showing an example of the arrangement of a nickel-metal hydride battery according to the present invention.

Groups of electrodes were arranged in such a manner that each of the above nickel electrodes having a theoretical capacity of 1.1 Ah was combined with each of the above hydrogen-absorbing alloy electrodes and they were wound through a separator composed of a non-woven fabric. The groups of the electrodes were inserted into AA type battery cans (containers), and each of the cans was filled with 30 wt % potassium hydroxide aqueous solution and sealed by the terminal plate of a positive electrode having a safety valve operating at a pressure of 15 $Kg/cm^2$ to assemble secondary nickel-metal hydride batteries shown in FIG. 3. Note, in the secondary nickel-metal hydride battery, a negative electrode/positive electrode ratio was set to 1.8 and the amount of battery electrolyte to the hydrogen-absorbing alloy electrode was set to 1.1 ml/Ah. The negative electrode/positive electrode ratio means the capacity ratio of the alloy in an uncharged state in the battery discharged state of the hydrogen-absorbing alloy electrode. That is, this means the ratio of the capacity of the hydrogen-absorbing alloy electrode to that of the nickel electrode, excluding the discharge reserve in the hydrogen-absorbing alloy electrode produced by the oxidation and the like of the cobalt monoxide in the nickel electrode when the battery is charged for the first time after it has been assembled.

The cycle life of the respective secondary batteries was evaluated under the conditions that the batteries were charged at 1.1 A for 1.5 hours and a discharge cycle for discharging at 1 A was repeated until a battery voltage was 0.8 V. A cycle life was determined by the number of cycles when the battery capacity was reduced to 50% of an initial capacity.

Table 13 shows the result of the evaluation.

TABLE 13

| Battery No. | Alloy Composition | Charge/Discharge Cycle (cycles) |
|---|---|---|
| 1 | $AB_{5.0}$ | 250 |
| 2 | $AB_{5.05}$ | 360 |
| 3 | $AB_{5.5}$ | 520 |
| 4 | $AB_{5.8}$ | 490 |
| 5 | $AB_{6.0}$ | 450 |
| 6 | $AB_{6.2}$ | 120 |

From Table 13, it is found that when non-stoichiometric composition is achieved, the cycle life is extended and when x of $AB_x$ exceeds 6, the cycle life is rapidly shortened. It is found from the result of the X-ray diffraction analysis effected to the $AB_{6.2}$ alloy that the second phase is grown in an amount of 10 vol % more, and from the result of the observation by EPMA that a large amount of La and Mn is segregated to the particle boundaries thereof, from which it is clear that the creation of the second phase and the segregations to the particle boundaries greatly shorten the alloy life.

Comparative Example 24

A hydrogen-absorbing alloy having the same composition as that of the embodiment 20 was made by a conventional casting method. Materials weighed so that the same composition as that of the embodiment 20 was achieved were put into a crucible and melted in a high frequency induction heating furnace and then poured into a casting mode made of iron to make the alloy. The thus obtained alloy was made to hydrogen-absorbing alloy electrodes in the same way as the embodiment 20 and subjected to a powder X-ray diffraction analysis to observe the creation of a second phase.

Table 14 shows the result of the analysis, wherein ◯ shows the creation of the single phase, x shows the creation of the second phase and Δ shows the possibility of the creation the second phase in an amount of 10 wt % or more, although not clear.

TABLE 14

| Alloy Composition | Result of Analysis |
|---|---|
| $AB_{5.0}$ | ◯ |
| $AB_{5.05}$ | Δ |
| $AB_{5.5}$ | X |
| $AB_{5.8}$ | X |
| $AB_{6.0}$ | X |
| $AB_{6.2}$ | X |

As apparent from Table 14, it is found that since a quenching rate is slow in the casting method, when the alloy is composed of the non-stoichiometric composition, the second phase is liable to be created. Although this may be improved by the use of a water-cooled casting mold or reducing a casting thickness, it is very difficult to stably form the single phase up to the vicinity of the $AB_{5.5}$ where a performance is greatly improved.

From the above mentioned facts, it is supposed that the hydrogen-absorbing alloy made by the molten-metal-rapidly-quenching method is suitable as described in the embodiment 20.

Figure 32:
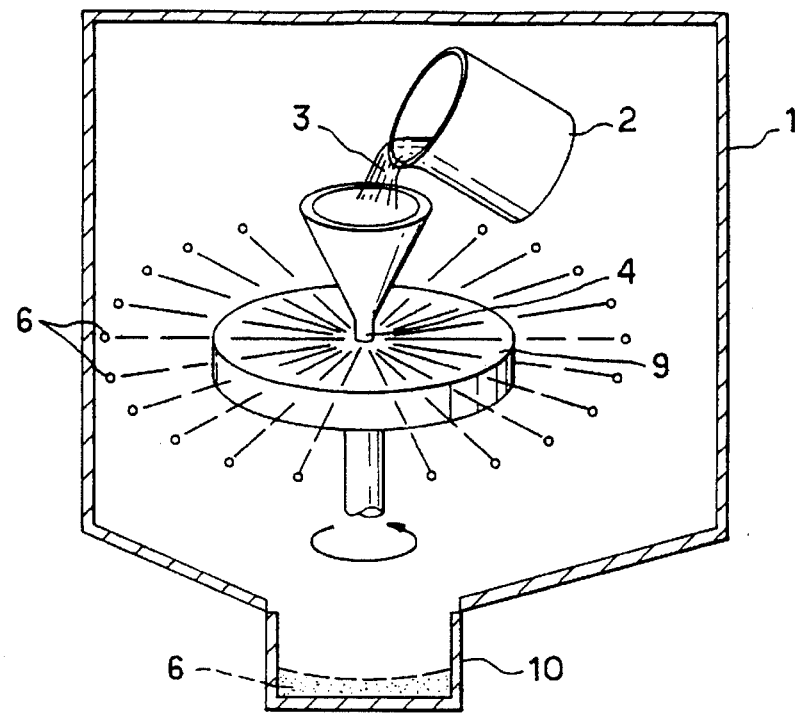
FIG. 32 is a schematic cross sectional view showing an apparatus for making hydrogen absorbing-alloy particles by a rotating disc method.
Figure 33:
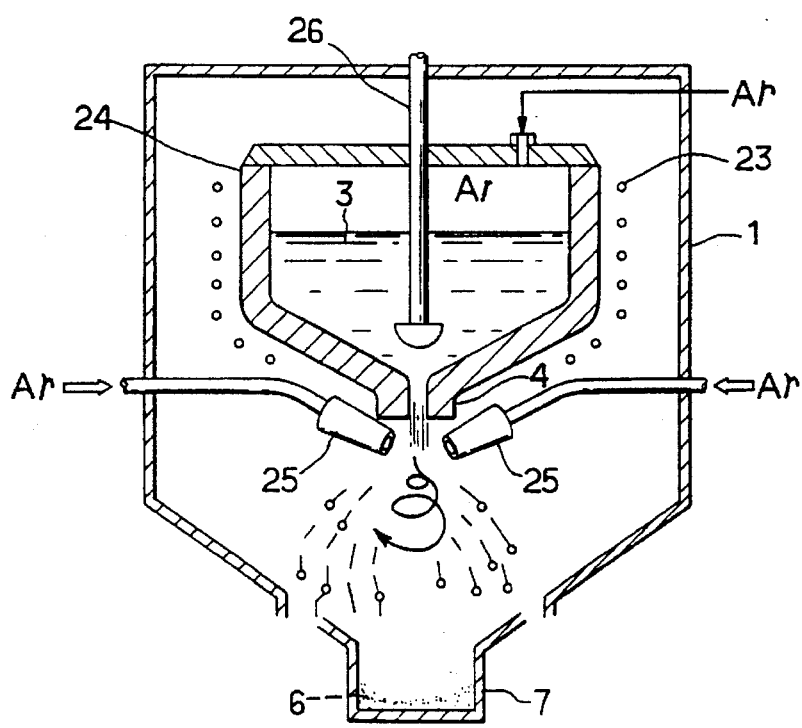
FIG. 33 is a schematic cross sectional view showing an apparatus for making hydrogen absorbing-alloy particles by a gas atomizing method.

Although the single roll method is described in the embodiment 20 as a method of easily and stably making the hydrogen-absorbing alloy having the stoichiometric composition, the rotating disk method described in FIG. 32, double roll method described in FIG. 2, gas atomizing method described in FIG. 33 and other rotating nozzle method and the like as other molten-metal-rapidly-quenching methods also can stably provide the hydrogen-absorbing alloy having the stoichiometric composition in the same way.

Although the embodiment 20 uses Ni, Co, Mn and Al as the elements constituting B of the hydrogen-absorbing alloy represented by $AB_x$, the same result can be obtained by using, for example, Si, Fe, Cr, Cu and the like.

Embodiment 21

A hydrogen-absorbing alloy in an amount of 500 g having the composition of Lm $Ni_{4.0}Co_{0.4}Mn_{0.3}Al_{0.3}$ (Lm: La-rich misch metal) was melted in a high frequency induction furnace and accommodated to the ladle 2 of the aforesaid manufacturing apparatus employing the single roll method shown in FIG. 1 and a molten hydrogen-absorbing alloy 4 was dropped onto a roll (a cooling roll) 5 from the ladle 2 so that a flake-shaped hydrogen-absorbing alloy 6 was made. The alloy 6 was pulverized in a ball mill and then classified through a 200 mesh sieve to make hydrogen-absorbing alloy powders for making electrode. Next, the hydrogen-absorbing alloy powders, PTFE powder and ketchen black were weighed to 95.5 wt %, 4 wt % and 0.5 wt %, respectively and then stirred and mixed by a cutter mill until the PTFE was made to fibers. The thus obtained cotton-like mixture was scattered onto a nickel metal net and rolled by a roller press to make hydrogen-absorbing alloy electrodes (negative electrodes).

Further, a paste separately prepared by adding a small amount of CMC and 50 wt % of water to 90 wt % of nickel hydroxide and 10 wt % of cobalt monoxide and stirring and mixing them. That paste was filled to a nickel porous member having a three-dimensional structure and dried and rolled by a roller press to make nickel electrodes (positive electrodes).

The hydrogen-absorbing alloy electrodes and nickel electrodes made by the aforesaid method were used to assemble 30 kinds of AA type secondary nickel-metal hydride batteries which had the above negative electrode/positive electrode ratio and the amount of a battery electrolyte to the hydrogen-absorbing alloy electrodes shown in Table 15. The capacity of these secondary batteries was set to 650 mAh as the theoretical capacity of the nickel electrode and the battery electrolyte was composed of a solution mixed with 7N potassium hydroxide and 1N lithium hydroxide. Further, a safety valve operating at 18 $Kg/cm^2$ was used. Note, the portion in Table 15 in which battery symbols are not shown indicates that since an electrode volume is so large that a predetermined amount of the battery electrolyte cannot be poured into the battery cans.

TABLE 15

| | | Negative Electrode/Positive Electrode Ratio | | | | | |
|---|---|---|---|---|---|---|---|
| | | 0.5 | 1.1 | 1.5 | 2.0 | 2.5 | 3.0 |
| Amount of Battery | 0.2 | A1 | A2 | A3 | A4 | A5 | A6 |
| Electrolyte to | 0.4 | B1 | B2 | B3 | B4 | B5 | B6 |
| Hydrogen-absorbing | 0.8 | C1 | C2 | C3 | C4 | C5 | C6 |
| Alloy Electrode | 1.5 | D1 | D2 | D3 | D4 | D5 | — |
| (ml/Ah) | 1.8 | E1 | E2 | E3 | E4 | — | — |
| | 2.0 | F1 | F2 | F3 | — | — | — |

Figure 34:
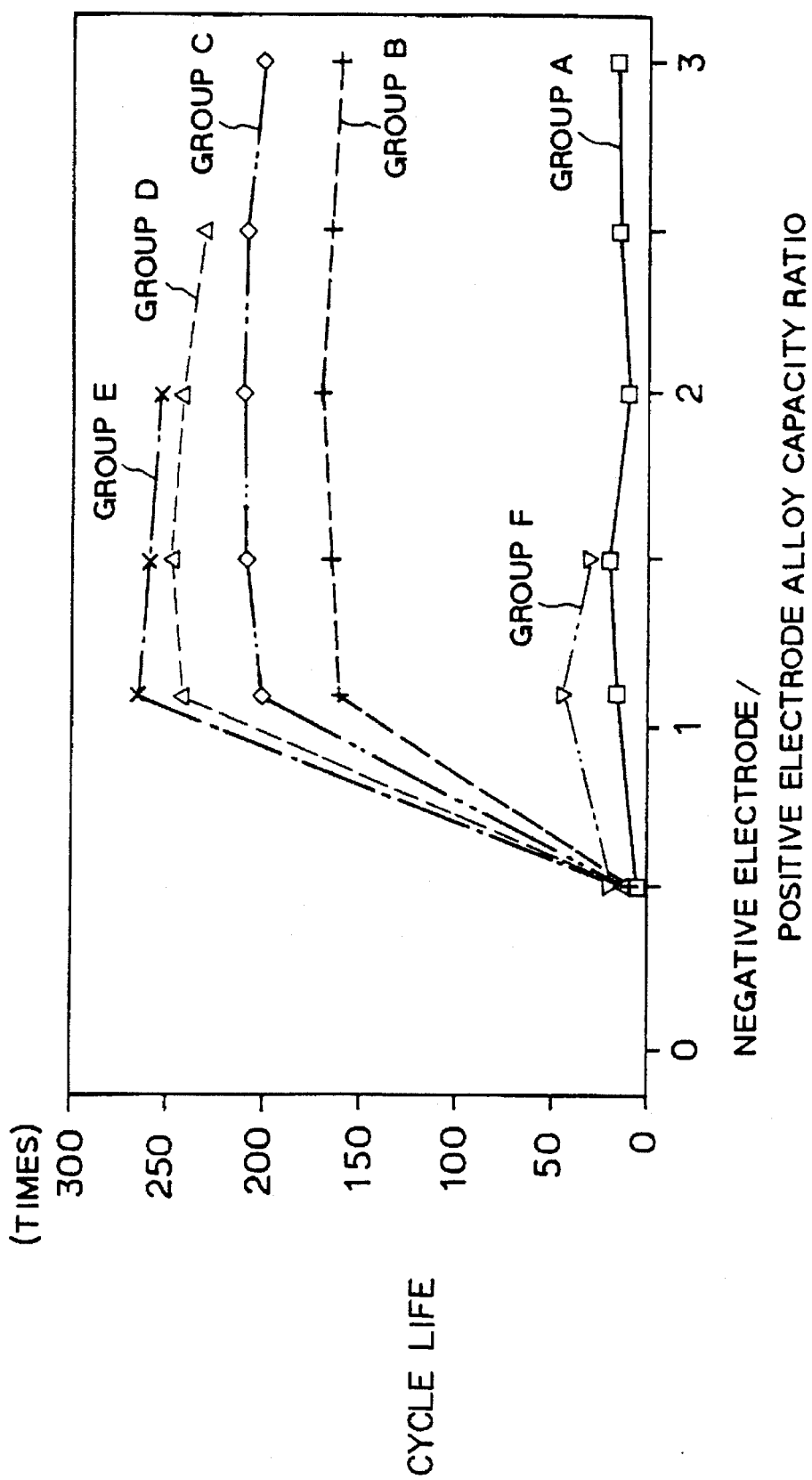
FIG. 34 is a graph comparing cycle life of a battery resulting from various capacity ratios of negative and positive electrode alloys and various amounts of a battery electrolyte.

The number of cycles of each of the respective secondary batteries, which belonged to the group of the symbol A (A1, A2, A3, A4, A5, A6), symbol group B (B1, B2, B3, B4, B5, B6), group of the symbol C (C1, C2, C3, C4, C5, C6), group of the symbol D (D1, D2, D3, D4, D5), group of the symbol E (E1, E2, E3, E4) and group of the symbol F (F1, F2, F3), was investigated until the capacity of the batteries was reduced to 50% of an initial capacity under the conditions that the batteries were charged at 650 mA for 1.5 hours and then a discharge cycle discharging at 1 A was repeated until the voltage of the batteries was 0.8 V. FIG. 34 shows the result of the investigation. In FIG. 34, □ shows the characteristics of the group A batteries in Table 15, + shows the characteristics of the group B batteries in Table 15, ◊ shows the characteristics of the group C batteries in Table 15, Δ shows the characteristics of the group D batteries in Table 15, x shows the characteristics of the group E batteries in Table 15, and ∇ shows the characteristics of the group F batteries in Table 15, respectively.

As apparent from FIG. 34, it is found that the secondary batteries having the negative electrode/positive electrode ratio of 0.5 have very short cycle life in all the amounts of the battery electrolyte. This is because that the arrangement of the batteries is limited by the hydrogen-absorbing alloy electrode and thus a capacity is only 0.5 time the positive electrode and the internal pressure of the batteries is abruptly increased at an initial charge-discharge cycle to the pressure at which the safety valve is operated and the shortage of the battery electrolyte is caused because the electrolyte is discharged through the safety valve. This fact is confirmed by the measurement of the internal pressure of the batteries and the check of disassembled batteries executed separately.

On the other hand, the secondary batteries having the negative electrode/positive electrode ratio of 1.1 or higher achieve the cycle life of 150 times or more under the charge/discharge conditions unless the amount of the battery electrolyte is excessively large or excessively small. This cycle life is a value satisfying the cycle life of 500 cycles which can be practically employed in a secondary battery in usual charge/discharge conditions and is supposed to be a sufficient cycle life. Even if the negative electrode/positive electrode ratio is 1.1 or higher, however, when the amount of the battery electrolyte is 0.2 ml/Ah to 2.0 ml/Ah, the cycle life is about 50 cycles which are not satisfactory. This is because that the amount of the battery electrolyte is insufficient at an initial charge/discharge cycle under the condition of 0.2 ml/Ah and the internal pressure of the batteries is increased to the pressure valve operating pressure at the end of the charging under the condition of 2.0 ml/Ah and thus the battery electrolyte was gradually shorted. This fact is confirmed by the measurement of the internal pressure of the batteries executed separately.

Figure 35:
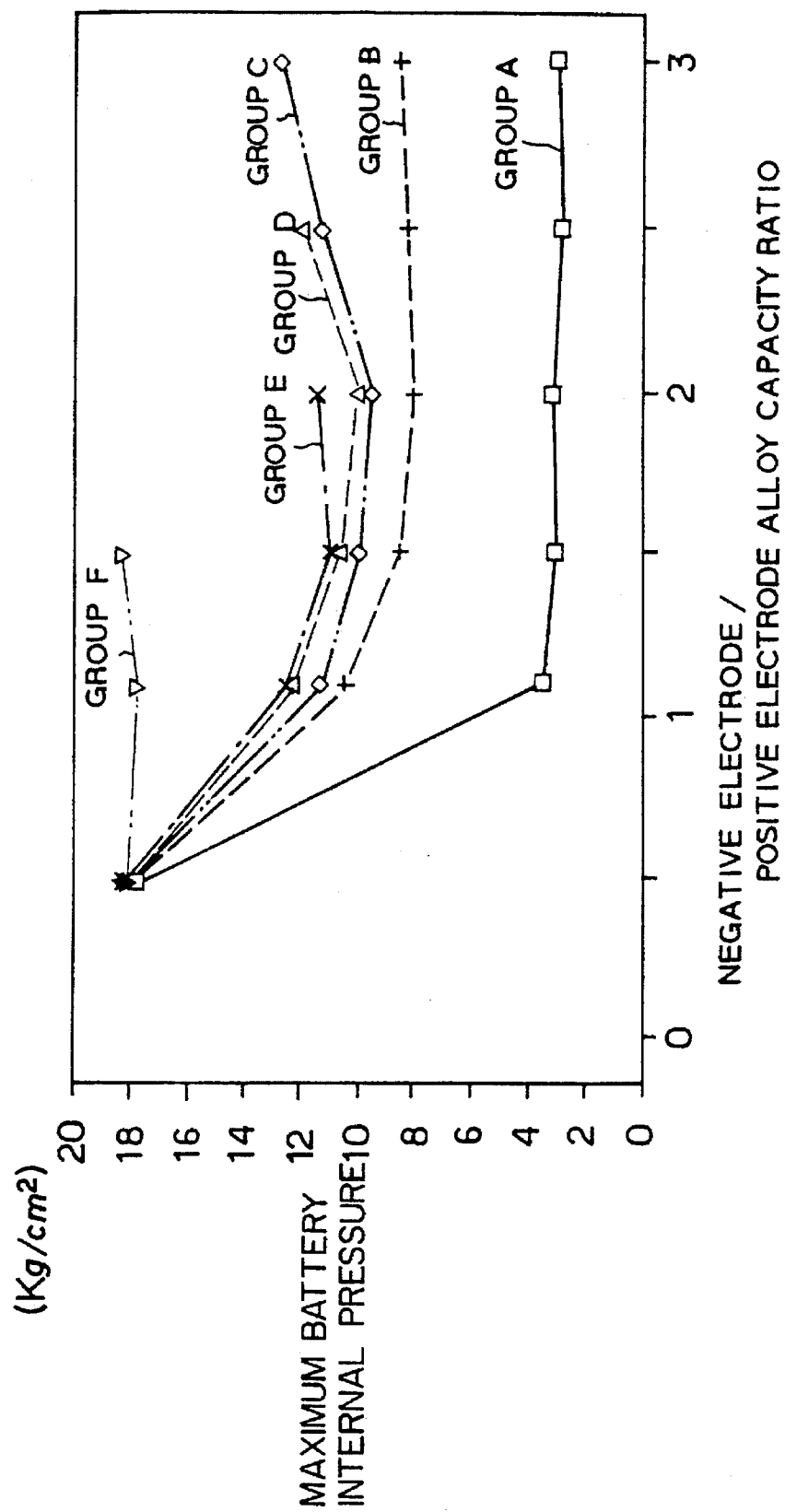
FIG. 35 is a graph comparing the maximum values of a battery internal pressure resulting from various capacity ratios of negative and positive electrode alloys and various amounts of a battery electrolyte.

Further, the secondary batteries belonging to the groups A–F in Table 15 were charged under the severe conditions of 650 mA for 5 hours and the internal pressure thereof was measured to investigate the internal pressure characteristics of the batteries which had a large effect on the battery life. FIG. 35 shows the result of the investigation. Note, in FIG. 35, □ shows the characteristics of the batteries of the group A in Table 15, + shows the characteristics of the batteries of the group B in Table 15, ◊ shows the characteristics of the batteries of the group C in Table 15, Δ shows the characteristics of the batteries of the group D in Table 15, x shows the characteristics of the batteries of the group E in Table 15, and ∇ shows the characteristics of the batteries of the group F in Table 15, respectively.

It is found from FIG. 35 that the battery internal pressure of all of the secondary batteries having the negative electrode/positive electrode ratio of 0.5 and secondary batteries having the amount of the battery electrolyte of 2 ml/Ah reaches 18 Kg/cm$^2$ at which the safety valve is operated.

When the weights of these secondary batteries were measured before and after the test, a loss of weight supposed to be caused by the leakage of the battery electrolyte was observed in a maximum amount of 300 mg and in a minimum amount of 40 mg.

The reason why the internal pressure of all the secondary batteries having the amount of the battery electrolyte of 0.2 ml/Ah is low in this experiment is that since the batteries had the very small amount of the battery electrolyte and the internal resistance in the batteries was abruptly increased, the output range of a constant current power supply used for charging was exceeded to prevent a sufficient charging. From this fact, it is found that the secondary batteries having the amount of the battery electrolyte of 0.2 ml/Ah cannot be practically used.

It is found from the above experiment for measuring the battery life and battery internal pressure that the negative electrode/positive electrode ratio must be 1.1 or higher and the amount of the battery electrolyte must be within the range of 0.4–1.8 ml per 1 Ah of the hydrogen-absorbing alloy electrode.

Further, there is admitted a tendency that the battery internal pressure is increased from the vicinity of the point where the negative electrode/positive electrode ratio exceeds 2. This is supposed to be caused by that since all the secondary batteries have the uniform capacity of 650 mAh, the volume occupied by the group of the electrodes is increased in the batteries having the large negative electrode/positive electrode ratio and thus the space in the batteries is reduced, from which it found that the amount of the battery electrolyte and negative electrode/positive electrode ratio have interdependent values and they cannot be independently determined in the design of battery.

Figure 36:
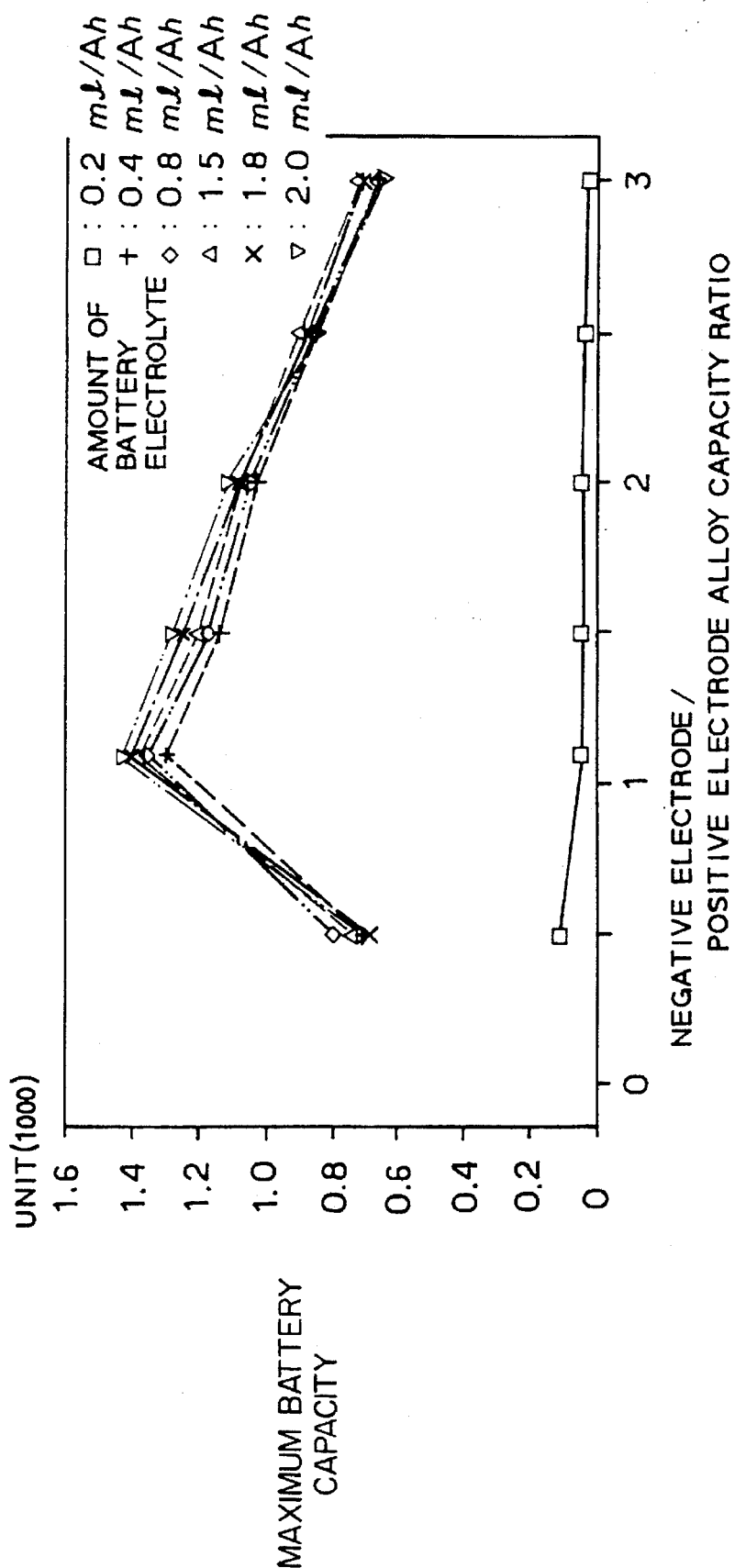
FIG. 36 is a graph comparing maximum battery capacities resulting from various capacity ratios of negative and positive electrode alloys and various amounts of a battery electrolyte.

Next, groups of electrodes each having a maximum capacity capable of being accommodated in an AA type battery can were made when a certain negative electrode/positive electrode ratio was given, batteries were assembled with battery electrolytes having various conditions and poured into them, and the capacity of each of the batteries was measured in the initial sound state of the batteries in order to confirm a high capacity as a large feature of a secondary nickel-metal hydride battery. FIG. 36 shows the result of the measurement. Note, in FIG. 36, □ shows the characteristics of the secondary battery in which the amount of the battery electrolyte to the hydrogen-absorbing alloy electrode is 0.2 ml/Ah, + shows the characteristics of the secondary battery in which the amount of the battery electrolyte is 0.4 ml/Ah, ◊ shows the characteristics of the secondary battery in which the amount of the battery electrolyte is 0.8 ml/Ah, Δ shows the characteristics of the secondary battery in which the amount of the battery electrolyte is 1.5 ml/Ah, x shows the characteristics of the secondary battery in which the amount of the battery electrolyte is 1.8 ml/Ah, and ∇ shows the characteristics of the secondary battery in which the amount of the battery electrolyte is 0.2 ml/Ah, respectively.

It is found from FIG. 36 that since the battery capacity of the battery having the negative electrode/positive electrode ratio of 0.5 is determined by the hydrogen-absorbing alloy electrode, the capacity is low.

Further, the amount of the battery electrolyte of 0.2 ml/Ah is not sufficient to cause a battery reaction, the battery capacity is also low. In the batteries except the aforesaid ones, as the negative electrode/positive electrode ratio is increased, the capacity of the nickel electrode capable of being assembled in the volume of the same group of electrodes is reduced, and thus the battery capacity is also reduced.

Then, it is found that when the negative electrode/positive electrode ratio exceeds 2.0, only a capacity similar to or less than that of the currently used high capacity type nickel-cadmium battery is obtained.

Although a higher capacity can be achieved by increasing the activating material density in electrode even if the negative electrode/positive electrode ratio is 2.0 or higher, in this case not only the manufacture of the electrode is difficult but also an oxygen reducing rate is greatly lowered at the end of charging as well as large current discharging characteristics are also greatly lowered and thus the battery using the electrode cannot be practically used.

It is found from this experiment that the negative electrode/positive electrode ratio must be 2.0 or less to enable secondary nickel-metal hydride battery to exhibit the feature of high capacity without sacrificing the battery characteristics.

Although the embodiment 21 describes in detail the example of the AA type battery arranged by the hydrogen-absorbing alloy electrode as the activating material obtained from the hydrogen-absorbing alloy made by rapidly quenching a molten alloy by the single roll method, non-sintered nickel electrode and battery electrolyte composed of the mixture of 7N potassium hydroxide and 1N lithium hydroxide, the present invention is not limited to this method.

For example, the hydrogen-absorbing alloy obtained by the rotating disc method described in FIG. 32, double roll method described in FIG. 2, gas atomizing method described in FIG. 33 and the like as the molten-metal-rapidly-quenching method exhibited the same characteristics as those obtained by the single roll method of this embodiment 21.

Further, with respect to the method of making electrode, the feature of the present invention can be also exhibited by a so-called paste type electrode made by filling or coating a kneaded material of hydrogen-absorbing alloy powder, kneading agent and water with or to a collector and then drying and rolling the same. The above hydrogen-absorbing alloy powder may be a powder obtained by being pulverized by the absorption/release of hydrogen in addition to the powder made by mechanically pulverizing a hydrogen-absorbing alloy made by the molten-metal-rapidly-quenching method. In particular, when the single roll method or double roll method is employed, a flake-shaped hydrogen-absorbing alloy can be obtained under wide manufacturing conditions. Since this flake-shaped alloy is generally thin and can be pulverized relatively easily, it is possible that the alloy is pulverized only from several hundreds of microns to a few millimeters prior to the manufacture of electrode and further pulverized in the rolling process for making the electrode together with the electrode.

The specific surface area of the hydrogen-absorbing alloy can be reduced by this processing in the manufacture of the electrode, the hydrogen-absorbing alloy can be protected from surface oxidation and pollution in the manufacturing process of the alloy as well as even the possibility of firing of the hydrogen-absorbing alloy in the manufacturing process can be reduced, and thus an operation can be executed in a safe environment.

The battery electrolyte may be, for example, a 8N potassium hydroxide solution or a battery electrolyte mixed with a sodium hydroxide solution when necessary.

Further, with respect to a battery size, the same effect can be obtained even in the battery size of, for example, 4/5 A type or A type in addition to the AA type.

As described above in detail, according to this embodiment, there can be provided a hydrogen-absorbing alloy which is less deteriorated when used as a negative electrode activating material of a secondary alkaline battery and has a long cycle life. Further, according to this embodiment, a secondary nickel-metal hydride battery can be provided which has a high capacity and long life and can be made at a low cost by using the a hydrogen-absorbing alloy electrode with a less amount of deterioration and limiting the amount of battery electrolyte and electrode capacity ratio.

Next, the dispersion of Mn concentration in a hydrogen-absorbing alloy and the effect of the particle size of segregated Mn particles on battery characteristics will be described below with reference to the following embodiments and comparative examples.

Embodiments 22–23 and Comparative Embodiments 25–27

Lm, Ni, Co, Mn, Al were weighed, previously taking the amount of them lost when they were melted into consideration, so that these materials had the composition of $Lm\ Ni_{4.3}Co_{0.1}\ Mn_{0.5}Al_{0.1}$ (Lm: La-rich misch metal) when made to an alloy.

Next, these materials were melted in a high frequency induction furnace and flowed into a usual casting mold to provide the alloy for a comparative example 25 and flowed into a water-cooled casting mold to provide the alloy for a comparative example 26 with a thickness of 10 mm. Further, in the single roll method shown in FIG. 1, a copper roll with a diameter of 300 mm was used as the cooling roll 5 and rotated at 600 rpm in vacuum, the distance between the injection nozzle 4 and the cooling roll 5 was set to 50 mm and an injection pressure was set to 0.1 Kgf/cm$^2$ so that the alloy with a thickness of about 100 microns for a comparative example 27 was provided. Further, the injection pressure was set to 0.05 Kgf/cm$^2$ so that the alloy with a thickness of about 50 microns for an embodiment 22 was provided. Further, the injection pressure was set to 0.02 Kgf/cm$^2$ so that the alloy with a thickness of about 20 microns for an embodiment 23 was provided. Thus, three kinds of the specimens of the flake-shaped alloys were made. In addition to the above, a hydrogen-absorbing alloy powder with an average particle size of 20 microns was prepared as an embodiment 24 by the inert gas atomizing method shown in FIG. 33.

The distribution of Mn concentration in these alloy specimens was investigated by the following method.

1) Burying of Resin

An alloy specimen was taken in an amount of 100 mg and dispersed to the center of a resin burying frame (made of polypropylene) with a diameter of 20 mm for SEM specimen.

Next, an epoxy resin (EPO-MIX made by Buller Ltd.) commercially available as a resin for burying SEM specimen and a curing agent were sufficiently mixed and then the thus obtained mixed material was poured into the burying frame and cured. At that time, it was further preferable to preheat the resin to about 60° C. to lower the viscosity thereof or to remove foams therefrom by evacuating the resin in a vacuum desiccator after it had been poured into the frame to improve the intimate contact property of the resin with the specimen.

2) Polishing

Next, the specimen buried by the above procedure was polished by a rotary polishing machine until it was mirror-polished. Since the specimen of the hydrogen-absorbing alloy was liable to react with water, it was polished with water-resistant abrasive papers mounted on the polishing machine rotating at 200 rpm while dropping methyl alcohol. At that time, the abrasive papers were sequentially changed to finer ones of #180, #400 and #800. Then, the specimen was mirror-polished by the diamond paste on the rotary polishing machine having a felt set thereon, the felt being provided with the diamond paste whose grain size was made finer in the sequence of 15 microns, 3 microns and 0.25 micron.

3) Observation by EPMA

Next, each of these specimens were set to an EPMA (Model V6, made by Shimazu Seisakusho). First, a region where Mn is not contained at all (e.g., a specimen table) was observed to perform a mapping observation and the intensity value of characteristic X-rays was recorded when a Mn concentration was 0. Next, the specimen was moved so that it was located at the center of a visual field and the entire image of the distribution of the Mn concentration was grasped by the mapping observation. Note, in the measurement, a magnification was set such that an observation region of 20×20 microns was within the visual field. Further, at that time, a caution was taken so that the edge of the specimens was not located in the visual field. Then, the visual field was vertically and horizontally divided into 100 portions to form 10000 pieces of unit regions and the EPMA was set to measure the intensity value of the X-rays for each region.

The distribution of the characteristic X-ray intensity within the observed surface obtained by the above observation was corrected by the previously determined intensity value within the region in which Mn was not contained.

The average value of the characteristic X-ray intensity within the observed surface was determined by simply averaging the characteristic X-ray intensity corresponding to the respective unit regions obtained as described above. Further, the maximum value of the characteristic X-ray intensity was used as a maximum value. Further, the ratio of the maximum value to the average value of the X-ray intensity was calculated.

The above analysis was performed 10 times while changing the visual field.

Table 16 shows the result of the analysis. Further, Table 16 also shows the quenching rates when the specimens were made, the quenching rates (cooling speeds) being measured by the same method as that in the embodiments 18A–18C.

TABLE 16

| Specimen No. | Max. Intensity Value | Average Intensity Value | Max. Intensity Value/Average Intensity Value | Quenching Rate (°C./S) |
|---|---|---|---|---|
| Comparative Example 25 | 68 | 48 | 1.42 | 80 |
| Comparative Example 26 | 70 | 51 | 1.37 | 250 |
| Comparative Example 27 | 64 | 47 | 1.36 | 1000 |
| Embodiment 22 | 60 | 49 | 1.22 | 2000 |
| Embodiment 23 | 60 | 52 | 1.15 | 3000 |
| Embodiment 24 | 60 | 50 | 1.20 | 50000 |

It is found from Table 16 that the ratio of the maximum intensity value to the average intensity value is lowered in the sequence of the comparative example 25, comparative example 26, comparative example 27, embodiment 22, embodiment 24, and embodiment 23.

Next, Table 17 shows the result of observation of the crystal types of the respective specimens observed by the method described in the embodiments 1–9.

embodiment 24 a structure other than the columnar structure is also formed, although the kind of the structure cannot be recognized.

When Table 16 is compared with Table 17, the reason why there is the correspondence between the ratio of columnar structures and the uniformity of the Mn distribution in the comparative examples 26, 27 and the embodiments 22 and 23 is as described below. That is, when the quenching rate is high as in the case of the embodiments 22, 23, the molten alloy is rapidly quenched and solidified and the solidification progresses in one direction from the quenched surface and columnar structures are liable to be grown so that the ratio of the columnar structures is increased.

Further, it is supposed that since the molten alloy is rapidly solidified, particular elements cannot exist in a molten state for the period of time necessary for the particular elements to form segregations in particles and particle boundaries and thus even the element such as Mn liable to produce an irregular distribution and segregations is solidified while keeping the uniformity of distribution.

Further, it is supposed that the reason why the embodiment 24 is excellent in the uniformity of Mn distribution regardless of that no columnar structure is recognized therein is that since the quenching rate is also very high and particular elements cannot exist in a molten state for the time necessary for the elements to form segregations in particles and particle boundaries, even the element such as Mn liable to produce an irregular distribution and segregations is solidified while keeping the uniformity of distribution.

Next, electrodes were made by using these specimens by using the following procedure. First, the above alloys were pulverized in a ball mill and the particles thereof larger than 200 mesh were removed by a 200 mesh sieve to provide hydrogen-absorbing alloy powders. Next, the hydrogen-absorbing alloy powders, PTFE powder and ketchen black were weighed to 95.5 wt %, 4 wt % and 0.5 wt %, respectively and then stirred and mixed by a cutter mill until the PTFE was made to fibers. The thus obtained cotton-like mixture was dispersed onto a nickel metal net and rolled by a roller press to make hydrogen-absorbing alloy electrodes.

Each of these electrodes was bound with a sintered type nickel electrode through a nylon separator and immersed into a 8N potassium hydroxide solution and the cycle life thereof was evaluated through charging/discharging.

TABLE 17

| Specimen No. | Area Ratio of Columnar Structure (%) Aspect Ratio | | | | | Minor Dia of Columnar Structures (μm) |
|---|---|---|---|---|---|---|
| | 1:2 or higher | 1:3 or higher | 1:4 or higher | 1:5 or higher | As a Whole | |
| Comparative Example 25 | Max. Crystal Grain Size 180 μm | | | | | |
| Comparative Example 26 | 19 | 10 | 3 | 2 | 9 | 9.5 |
| Comparative Example 27 | 39 | 28 | 21 | 10 | 11 | 1.9 |
| Embodiment 22 | 71 | 69 | 62 | 51 | 33 | 2.7 |
| Embodiment 23 | 95 | 89 | 82 | 89 | 69 | 2.5 |
| Embodiment 24 | Max. Crystal Grian Size 10 μm | | | | | |

Figure 37:
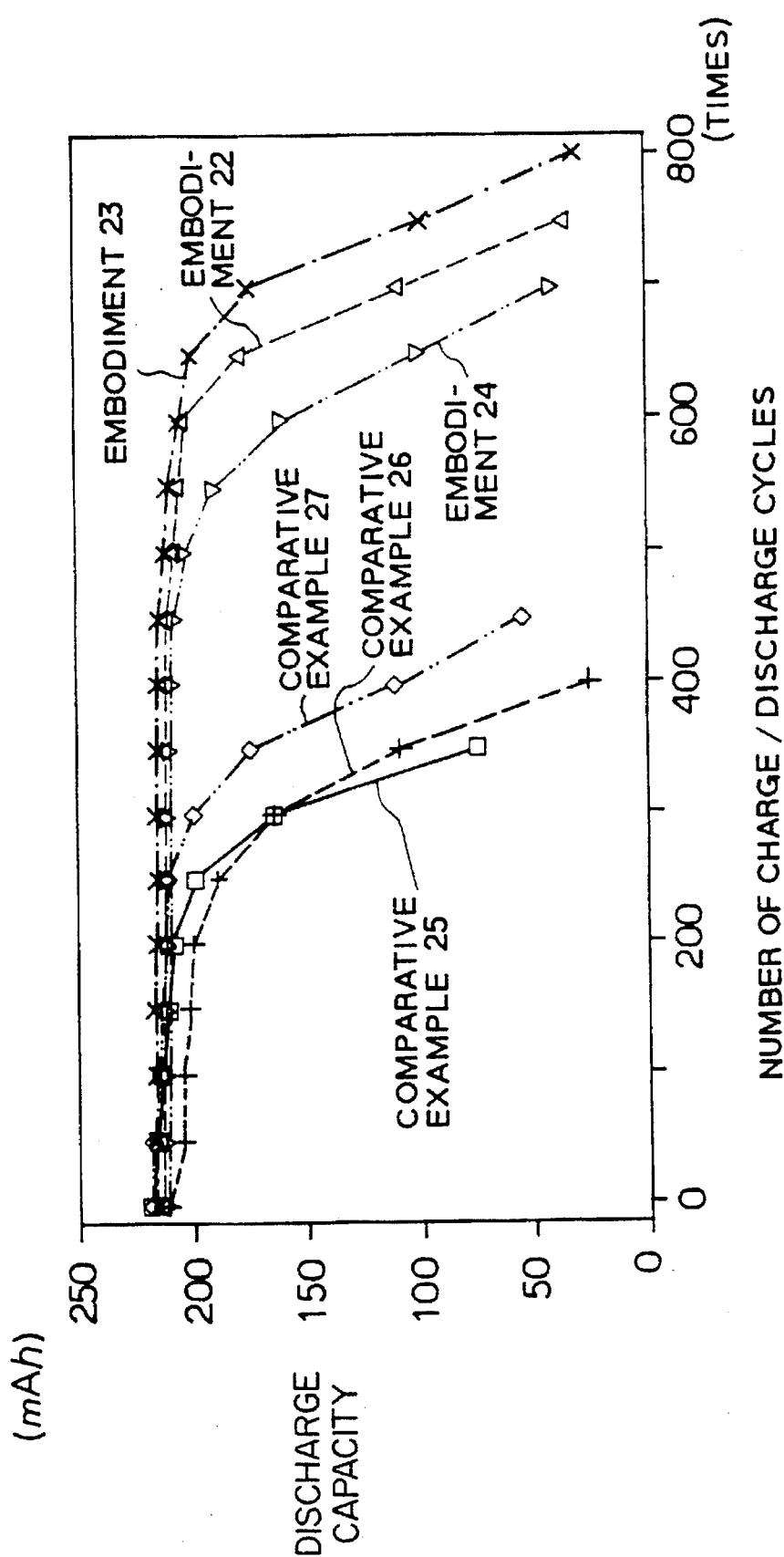
FIG. 37 is a graph showing the relationship between the charge/discharge cycle and the battery capacity of comparative examples 25, 26 and 27 and examples 22, 23 and 24.

In Table 17, the reason why no numerical value is shown in the comparative example 25 and embodiment 24 is that an equi-axed crystal structure is observed on the entire cross section of the comparative example 25 and a columnar structure is not recognized therein, and further in the The evaluation was carried out by repeating a charge/discharge cycle under the conditions that charging was effected for 1 hour at a current of 220 mA per 1 g of the alloy in the electrode and discharging was effected also at the current of 220 mA until −0.5 V was achieved to a Hg/HgO electrode. A cycle life was determined by the number of cycles when an electrode capacity was lowered to 50% of an initial electrode capacity. The evaluation was performed at 20° C. FIG. 37 shows the change of capacity as the cycle proceeds and Table 18 shows the cycle life.

TABLE 18

| Specimen No. | Max. Intensity Value/ Average Intensity Value | Cycle Life (cycles) |
| --- | --- | --- |
| Comparative Example 25 | 1.42 | 320 |
| Comparative Example 26 | 1.37 | 350 |
| Comparative Example 27 | 1.36 | 400 |
| Embodiment 22 | 1.22 | 700 |
| Embodiment 23 | 1.15 | 740 |
| Embodiment 24 | 1.20 | 620 |

As shown in the above, it is confirmed that in the comparative examples 25–27 in which the X-ray intensity ratio to the Mn concentration in the hydrogen-absorbing alloy is about 1.2, the cycle life of the electrode is about 350 cycles, whereas in the embodiments 22–24 in which an X-ray intensity ratio is 1.3 or less which is within the range of the present invention, the cycle life in the electrode is greatly extended to 620–740 cycles.

Next, to investigate the performance in actual batteries, batteries was made in the following procedure by using these alloys and the cycle life thereof was evaluated.

The hydrogen-absorbing alloy electrodes were made by the same method as that of the above electrodes for evaluation.

Note, a caution was taken so that the amount of the hydrogen-absorbing alloy in the electrodes was set to 9 g±0.2 g.

A nickel electrode was made in such a manner that a paste was prepared by adding a small amount of CMC and 50 wt % of water to 90 wt % of nickel hydroxide and 10 wt % of cobalt monoxide and stirring and mixing them and filled with a nickel porous member having a three-dimensional structure and dried and rolled by a roller press. At that time, a capacity calculated from the weight of the nickel hydroxide in the electrode was set to 1.1 Ah.

Each of the thus made hydrogen-absorbing alloy electrodes and the nickel electrode were combined and wound separated by a polypropylene non-woven fabric to provide groups of electrodes. Each of the groups of the electrodes was inserted into a battery can, and the can was filled with a solution mixed with 7N potassium hydroxide and 1N lithium hydroxide as an battery electrolyte and sealed by the terminal plate of a positive electrode having a safety valve operating at a pressure of 15 Kg/cm$^2$ to assemble a test battery shown in FIG. 3.

Figure 38:
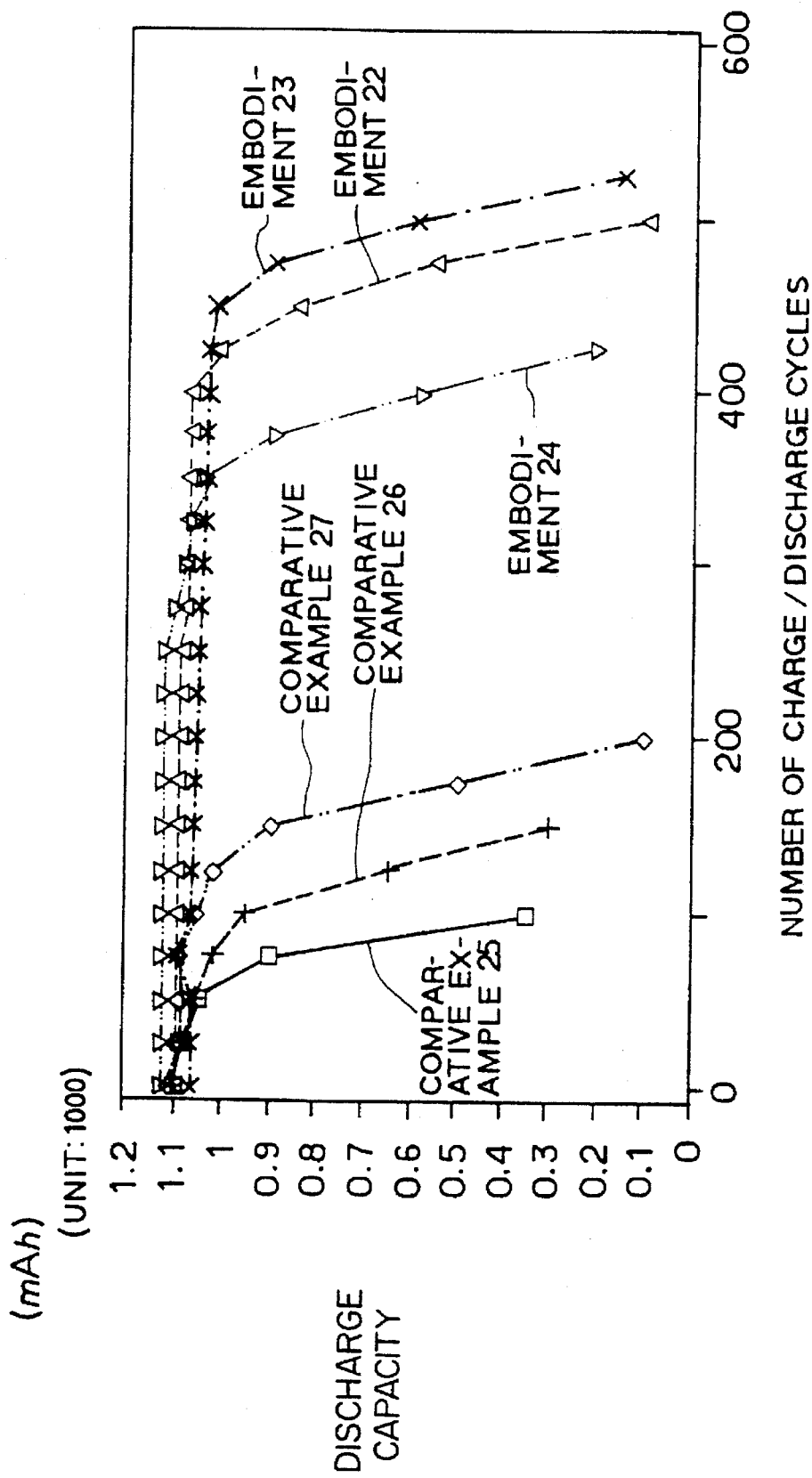
FIG. 38 is a graph showing the relationship between the charge/discharge cycle and the battery capacity of an AA type battery.
Figure 39:
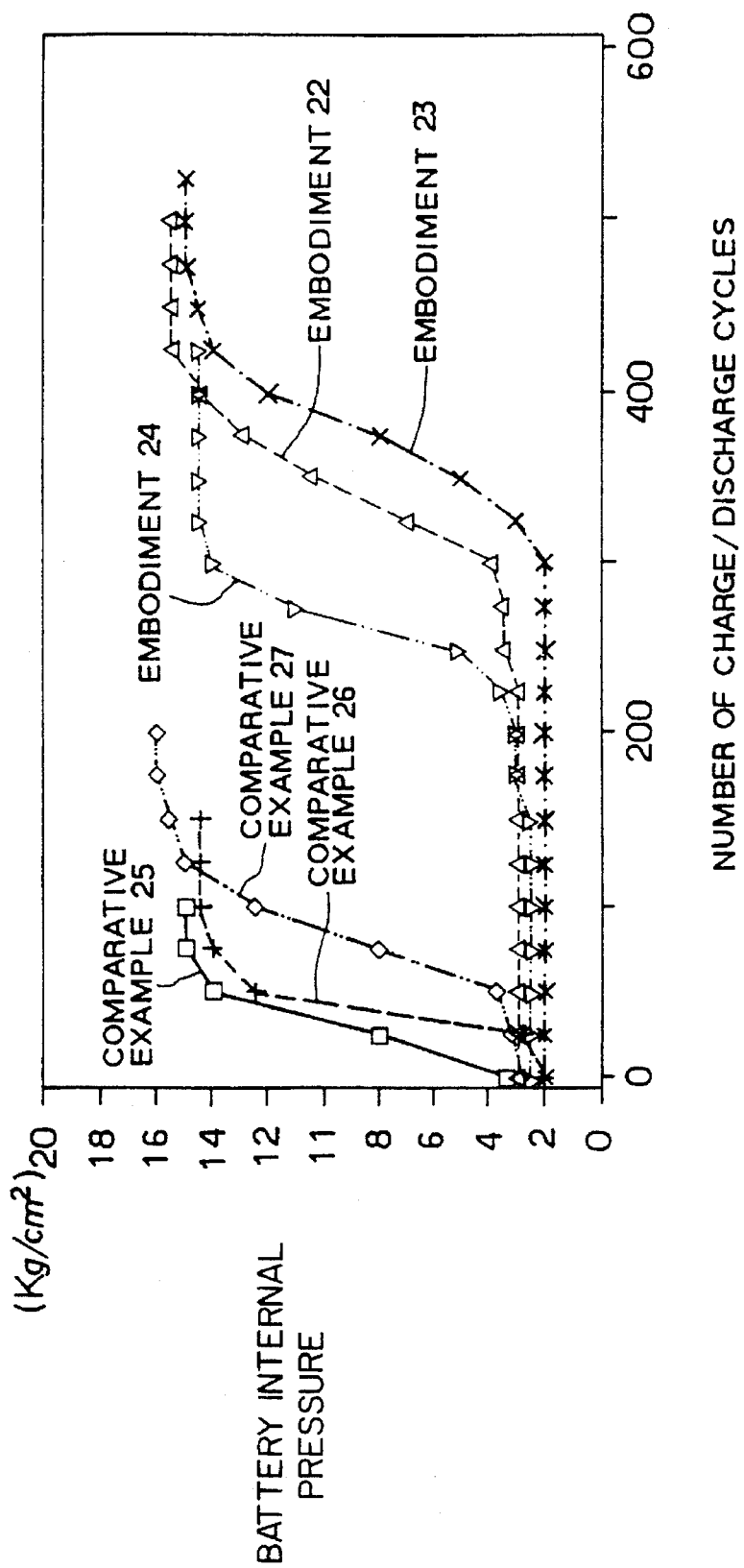
FIG. 39 is a graph showing the relationship between the charge/discharge cycle and the battery internal pressure of the AA type battery.

The cycle life was evaluated by using these batteries by repeating a charge/discharge cycle under the conditions that each battery was charged at 1.1 A for 1.5 hours and then discharged at 1 A until a battery voltage was 0.8 V. A cycle life was determined by the number of cycles when the battery capacity was lowered to 50% of an initial capacity. A test temperature was 25° C. FIG. 38 shows the change of capacity-as the cycle proceeds and Table 19 shows the cycle life.

Note, at this time, it is confirmed that the uniformity of Mn distribution can be also observed in the electrodes made to battery by the following procedure in the same way as the case of the alloy.

1) Discharge of Battery

First, batteries in which a charge/discharge cycles were not progressed after they had been made were prepared as specimens. As a charge/discharge cycle progressed, the Mn uniformity in an alloy was changed and thus it was preferable that the number of the charge/discharge cycle of the batteries used as the specimens was 10 cycles or less, if possible.

These batteries were discharged in a battery state at a current of 110 mA until a voltage was 0.8 V and then remained they were for 10 hours with a resistance of 10K Ω connected between the electrodes of each of the batteries so that they were perfectly discharged. The reason why the batteries were discharged in the two steps was to prevent firing caused by remaining hydrogen.

2) Washing of Electrode

After the completion of the discharge, the batteries were disassembled and the hydrogen-absorbing alloy electrodes were taken out therefrom. The thus taken-out alloy electrodes were sufficiently washed with pure water and then perfectly dried in a vacuum drier for the purpose of removing hydrogen remaining in the electrodes and preventing the insufficient solidification of the resin caused by the battery electrolyte and the strength by which the specimens were attached to the resins from being lowered.

3) Burying of Resin

Each of the dried electrodes was cut off to the size of about 10 mm×5 mm and dispersed to the center of a resin burying frame (made of polypropylene) with a diameter of 20 mm for SEM specimen. Next, an epoxy resin (EPO-MIX made by Buller Ltd.) commercially available as a resin for burying a SEM specimen and a curing agent were sufficiently mixed and then the thus obtained mixed material was poured into the burying frame and cured. At that time, it was further preferable to preheat the resin to about 60° C. to lower the viscosity thereof or to remove foams therefrom by evacuating the resin in a vacuum desiccator after it had been poured into the frame to improve the intimate contact property of the resin with the specimen.

4) Polishing

Next, the specimen buried by the above procedure was polished by a rotary polishing machine until it was mirror-polished. Since the specimen of the hydrogen-absorbing alloy was liable to react with water, it was polished with water-resistant abrasive papers mounted on the polishing machine rotating at 200 rpm while dropping methyl alcohol. At that time, the abrasive papers were sequentially changed to finer ones of #180, #400 and #800. Then, the specimen was mirror-polished by the diamond paste on the rotary polishing machine having a felt set thereon, the felt being provided with the diamond paste whose grain size was made finer in the sequence of 15 microns, 3 microns and 0.25 micron.

5) Observation by EPMA

Next, the average value and maximum value of the X-ray intensity corresponding to the Mn concentration in the specimens were measured in the same procedure as above by using an EPMA.

Table 20 shows the result of the measurement, wherein substantially the same numerical values as those in Table 16 are obtained and thus it is confirmed that observation is sufficiently possible even after the alloys have been made to electrode and battery.

TABLE 19

| Specimen No. | Cycle Life (cycles) |
| --- | --- |
| Comparative Example 25 | 95 |
| Comparative Example 26 | 130 |
| Comparative Example 27 | 170 |
| Embodiment 22 | 480 |
| Embodiment 23 | 510 |
| Embodiment 24 | 410 |

TABLE 20

| Specimen No. | Max. Intensity Value | Average Intensity | Max. Intensity Value/ Average Intensity Value |
| --- | --- | --- | --- |
| Comparative Example 25 | 69 | 48 | 1.44 |
| Comparative Example 26 | 68 | 50 | 1.36 |
| Comparative Example 27 | 67 | 50 | 1.34 |
| Embodiment 22 | 57 | 47 | 1.21 |
| Embodiment 23 | 59 | 50 | 1.18 |
| Embodiment 24 | 60 | 50 | 1.20 |

As shown in the above, in the batteries using the alloys of the comparative examples 25–27 having the low uniformity of the Mn distribution, the increase of the internal pressure of the batteries caused by the deterioration of the hydrogen-absorbing alloys is admitted from the relatively initial stage of the charge/discharge cycles, in the same way as the result of the above evaluation of electrodes. Since the battery electrolyte is flown out from the safety valve by the increase of the internal pressure, battery capacities are reduced and thus the cycle life of only about 130 cycles is obtained. Whereas, the internal pressure of the batteries using the alloys of the embodiments 22–24 having improved uniformity is relatively gradually increased, and as a result the cycle life of 410 to 510 cycles is successfully obtained in the batteries which greatly exceeds 300 cycles as the practical life of a secondary battery. Thus, it is confirmed that the cycle life can be greatly increased even in actual batteries by setting the uniformity of the Mn distribution within the range of the present invention.

Embodiments 25, 26 and Comparative Examples 28, 29

Lm, Ni, Co, Mn, Al were weighed, previously taking the amount of them lost when they were melted into consideration, so that these materials had the composition of $Lm\ Ni_{4.0}Co_{0.4}Mn_{0.3}Al_{0.3}$ (Lm: La-rich misch metal) when made to an alloy.

Next, these materials were melted in a high frequency induction furnace and flowed into a usual casting mold to make the alloy for a comparative example 28. Further, in the single roll method shown in FIG. 1, a copper roll with a diameter of 300 mm was used as the cooling roll and rotated at 800 rpm in vacuum, the distance between the injection nozzle and the cooling roll was set to 50 mm and an injection pressure was set to 0.1 $Kgf/cm^2$ so that the alloy with a thickness of about 100 microns was prepared for a comparative example 29. Further, the injection pressure was set to 0.02 $Kgf/cm^2$ so that a flake-shaped alloy specimen with a thickness of 20 microns was made for an embodiment 25. In addition to the above, a hydrogen-absorbing alloy powder with an average particle size of 20 microns was prepared as an embodiment 26 by the inert gas atomizing method shown in FIG. 33.

The size of the segregated Mn in these alloy specimens was investigated by the method described below. First, the alloy specimens were sealed in synthetic resin by the same procedure as the embodiments 22–24 and mirror-polished by a polisher.

Next, each of the specimens was set to SEM (Model ABT-55 made by ABT) with EDX (made by KEVEX) and observed. First, a mapping observation of the Mn and other elements constituting the hydrogen-absorbing alloy was performed by the EDX and the locations where Mn was independently segregated were searched. Since, however, the EDX had a lower resolution as compared with that of the EPMA and it was difficult to directly determine the size of the segregations from the result of the mapping observation, the points having high Mn concentration determined by the EDX had to be observed by the SEM to correctly find the size of the segregations of Mn. That is, since the points where the concentration of Mn and other elements was different from the alloy composition were observed as the points where the intensity of a reflected electron beam was different from that of the alloy portion in the SEM, the reason why the intensity was different was determined by the EDX and then the size of a region was determined from the result of observation by the SEM.

Table 21 shows the result of observation of the size of segregations of Mn of the comparative examples 28,29 and embodiments 25 and 26 performed by the SEM and EDX. Note, 10 visual fields were observed for each specimen to prepare Table 21.

TABLE 21

| Specimen No. | Max. Diameter of Segregated Mn (μm) |
| --- | --- |
| Comparative Example 28 | 1.52 |
| Comparative Example 29 | 0.71 |
| Embodiment 25 | 0.41 |
| Embodiment 26 | 0.10 |

Next, the crystal types of the respective specimens were observed by the method described in the embodiments 1–9 and Table 22 shows the result of the observation.

TABLE 22

| Specimen No. | Area Ratio of Columnar Structure (%) Aspect Ratio | | | | | Minor Dia of Columnar Structures (μm) |
| --- | --- | --- | --- | --- | --- | --- |
| | 1:2 or higher | 1:3 or higher | 1:4 or higher | 1:5 or higher | As a Whole | |
| Comparative Example 28 | Max. Crystal Grain Size 160 μm | | | | | |
| Comparative Example 29 | 17 | 11 | 3 | 1 | 10 | 9.0 |
| Embodiment 25 | 88 | 72 | 62 | 51 | 89 | 2.7 |
| Embodiment 26 | Max. Crystal Grain Size 10 μm | | | | | |

In Table 22, the reason why no numerical value is shown in the comparative example 28 and embodiment 26 is that an equi-axed crystal structure is observed on the entire surface of the comparative example 28 and a columnar structure is not recognized therein, and further in the embodiment 26 a structure other than the columnar structure is also formed, although the kind of the structure cannot be clearly recognized.

When Table 21 is compared with Table 22, the reason why there is a correspondence between the ratio of columnar structures and the size of Mn segregations in the comparative examples 29 and embodiments 25 is as described below. That is, when a quenching rate is high as in the case of the comparative example 29 and embodiments 25, the molten alloy is rapidly quenched and solidified, and the solidification is liable to progress in a given direction from the quenched surface and thus columnar structures are liable to be grown so that the ratio of the columnar structures is increased. Further, it is supposed that since the molten alloy is rapidly solidified, particular elements cannot exist in a molten state until the time at which the particular elements form segregations in the particles and particle boundaries, and even if the segregations are made, they are difficult to be grown, and thus even the element such as Mn liable to be segregated cannot be made to a large segregated material. Further, the reason why in the embodiment 26 the Mn segregations have a small size regardless of that no columnar structure is admitted is supposed to be that since a quenching rate is also very high, particular elements cannot exist in a molten state until the time at which the particular elements form segregations in the particles and particle boundaries, and even if the segregations are made, they are difficult to be grown, and thus even the element such as Mn liable to be segregated cannot be made to a large segregated material.

Next, these specimens each in an amount of 20 g were sealed in a sealed vessel (volume: 50 cc) with a gas introduction pipe and the sealed vessel absorbed hydrogen pressurized to 10 Kg/cm$^2$ through the pipe while the vessel was immersed into cooled water of 10° C. and then the hydrogen was released from the sealed vessel by connecting the pipe to a vacuum pump while the vessel was immersed in hot water of 60° C. After the repetition of the absorption and release of the hydrogen 1000 times, the distribution of particles of the specimens were measured by a laser scattering type particle distribution measuring instrument (made by Seishin Kigyo Co.) Table 23 shows the result of the measurement.

TABLE 23

| Specimen No. | Particle Size of Hydrogen-absorbing Alloy (μm) |
| --- | --- |
| Comparative Example 28 | 9 |
| Comparative Example 29 | 13 |
| Embodiment 25 | 27 |
| Embodiment 26 | 17 |

It is found from Table 23 that in the embodiment having the Mn segregations whose size is small and within the range of the present invention, even if the absorption/release of hydrogen is repeated 1000 times, the average size of 35 microns prior to the test is reduced only to 27 microns and the average size of 20 microns in the embodiment 26 is reduced only to 17 microns, and thus it is found that the pulverization caused by the absorption/release of hydrogen to the hydrogen-absorbing alloy is restricted. On the other hand, it is confirmed that the initial average size of 35 microns in the comparative examples 28 and 29 is reduced to 9 microns and 13 microns, respectively.

Next, a cycle life test was executed to electrodes to confirm the effect of the difference in the pulverizing behavior confirmed in the above test on the actual electrode characteristics.

Here, electrodes were made by the following procedures. First, the above alloys were pulverized in a ball mill and the particles thereof larger than 200 mesh were removed by a 200 mesh sieve to provide hydrogen-absorbing alloy powders.

Next, the hydrogen-absorbing alloy powders, PTFE powder and ketchen black were weighed to 95.5 wt %, 4 wt % and 0.5 wt %, respectively and then stirred and mixed by a cutter mill until the PTFE was made to fibers. The thus obtained cotton-like mixture was scattered onto a nickel metal net and rolled by a roller press to make hydrogen-absorbing alloy electrodes.

Each of the electrodes was bound to a sintered type nickel electrode through a nylon separator and immersed into a 8N potassium hydroxide solution and the cycle life thereof was evaluated through charging and discharging.

The evaluation was carried out by repeating a charge/discharge cycle under the conditions that charging was effected for 1 hour at a current of 220 mA per 1 g of the alloy in the electrode and discharging was effected also at the current of 220 mA per 1 g of the alloy until −0.5 V was achieved to a Hg/HgO electrode. The number of cycles was determined by the cycle life when an electrode capacity was lowered to 50% of an initial electrode capacity. The evaluation was performed at 20° C. Table 24 shows the cycle life.

TABLE 24

| Specimen No. | Cycle Life (cycles) |
| --- | --- |
| Comparative Example 28 | 330 |
| Comparative Example 29 | 380 |
| Embodiment 25 | 725 |
| Embodiment 26 | 650 |

When the result of Table 24 is compared with that of Table 23, it is found that the comparative examples 28, 29 in which pulverization is liable to be progressed has a shorter life than the embodiments 25, 26 in which pulverization is restricted and it is confirmed that the cycle life can be remarkably extended by the restriction of the progress of pulverization.

Note, at this time, it is confirmed that the size of Mn segregations in the alloy made to electrode by the following procedures also can be observed in the same way as alloy as a single body.

1) Discharge of Electrode

First, electrodes in which a charge/discharge cycles were not progressed after they had been made were prepared as specimens. As the charge/discharge cycle progressed, the state of Mn segregations in the alloys was changed and thus it was preferable that the number of the charge/discharge cycle of the electrodes used as the specimens was 10 cycles or less, if possible. These electrodes were discharged at a current of 0.1 A until −0.5 V was achieved to a Hg/HgO electrode so that they were perfectly discharged. The reason why the they were perfectly discharged was to prevent firing caused by remaining hydrogen.

2) Washing of Electrode

After the completion of the discharge, the hydrogen-absorbing alloy electrodes were sufficiently washed with pure water and then perfectly dried in a vacuum drier for the purpose of removing hydrogen remaining in the electrodes and preventing the insufficient solidification of resins caused by the battery electrolyte and the strength by which the specimens were attached to the resins from being lowered.

3) Burying of Resin

Each of the dried electrodes was cut off to the size of about 10 mm×5 mm and dispersed to the center of a SEM resin burying frame (made of polypropylene) with a diameter of 20 mm for SEM specimen. Next, an epoxy resin (EPO-MIX made by Buller Ltd.) commercially available as a resin for burying a SEM specimen and a curing agent were sufficiently mixed and then the thus obtained mixed material was poured into the burying frame and cured. At that time, it was further preferable to preheat the resin to about 60° C. to lower the viscosity thereof or to remove foams therefrom by evacuating the resin in a vacuum desiccator after it had been poured into the frame to improve the intimate contact property of the resin with the specimen.

4) Polishing

Next, the specimen buried by the above procedure was polished by a rotary polishing machine until it was mirror-polished. Since the specimen of the hydrogen-absorbing alloy was liable to react with water, it was polished with water resistant abrasive papers mounted on the polishing machine rotating at 200 rpm while dropping methyl alcohol. At this time, the abrasive papers were sequentially changed to finer ones of #180, #400 and #800. Then, the specimen was mirror-polished by the diamond paste on the rotary polishing machine on which a felt was set with the grain size of the diamond paste made finer in the sequence of 15 microns, 3 microns and 0.25 micron.

5) Observation by EDX

Next, each of the specimens was set to SEM (Model ABT-55 made by ABT) with EDX (made by KEVEX) and observed. First, a mapping observation of the Mn and other elements constituting the hydrogen-absorbing alloy was performed by the EDX and the locations where Mn was independently segregated were searched. Since, however, the EDX had a lower resolution as compared with that of the EPMA and it was difficult to directly determine the size of the segregations from the result of the mapping observation, the points with high Mn concentration determined by the EDX had to be observed by the SEM to correctly find the size of the segregations of Mn. That is, since the points where the concentration of Mn and other elements was different from the alloy composition were observed as the points where the intensity of a reflected electron beam was different from that of the alloy portion in the SEM, the reason why the intensity was different was determined by the EDX and then the size of a region was determined from the result of observation by the SEM.

The above analysis was performed 10 times while changing the visual field.

Although Ni, Co, Mn, Al were used as the elements constituting B in the above embodiment, the same effect could be obtained even if a part thereof was substituted for Cr, Si, Fe, Cu, Ag, Pd, Sn, In, Ga, Ge, Ti, Zr, Zn or the like.

As described above in detail, the corrosion resistance of the alloys against a thick alkaline solution as a battery electrolyte is improved as well as the pulverization caused by the expansion/shrinkage due to the absorption/release of hydrogen can be suppressed by setting the maximum value of Mn concentration in the hydrogen-absorbing alloys containing Mn which is very effective to increase the capacity of the hydrogen-absorbing alloys to 1.3 times or less the average value thereof or setting the maximum diameter of Mn segregated in the alloys to 0.1 micron or less, whereby the life of the hydrogen-absorbing alloys can be extended. As a result, the life of the secondary nickel-metal hydride battery employing these alloys can be extended. Consequently, the hydrogen-absorbing alloys according to the present invention have a very large industrial value.

As described above, since the first to third hydrogen-absorbing alloys for battery of the present invention are composed of an $AB_5$ type alloy containing Mn as an essential element, the hydrogen-absorbing alloys can provide a negative electrode material having a high capacity and excellent cycle life and initial characteristics when used to secondary alkaline battery.

Further, when the alloys are subjected to a heat treatment at a relatively low temperature of about 200°–500° C., the internal distortion of the alloys can be removed while keeping the homogeneity thereof, and thus the alloys can provide nickel-metal hydride battery having more excellent battery characteristics.

Further, the method of manufacturing hydrogen-absorbing alloys according to the present invention can provide a negative electrode material having a high capacity and excellent cycle life and initial characteristics for secondary nickel-metal hydride battery.

Further, the fourth hydrogen-absorbing alloy according to the present invention can form electrode having a less amount of deterioration and long cycle life when used as a negative electrode activating material.

Further, the secondary nickel-metal hydride battery according to the present invention has a high capacity and long life and can be made at low cost.

What is claimed is:

1. A hydrogen-absorbing alloy for a battery, comprising an alloy having the composition represented by a general formula $A\,Ni_a\,Mn_b\,M_c$ where A is at least one element selected from the group consisting of rare earth elements including Y (yttrium), M is a metal mainly composed of at least one element selected from the group consisting of Co, Al, Fe, Si, Cr, Cu, Ti, Zr, Zn, Hf, V, Nb, Ta, Mo, W, Ag, Pd, B, Ga, In, Ge and Sn, $3.5 \leq a \leq 5$, $0.1 \leq b \leq 1$, $0 \leq c \leq 1$, $4.5 \leq a+b+c \leq 6$, wherein said alloy has columnar structures in which an area ratio of the columnar structures having the ratio of a width to a length (aspect ratio) of 1:2 or higher is 50% or more, and said columnar structures have an average width of 30 microns or less.

2. A hydrogen-absorbing alloy for a battery according to claim 1, wherein said hydrogen-absorbing alloy is composed of a rapidly-quenched molten metal having a thickness of 10–150 microns.

3. A hydrogen-absorbing alloy for a battery comprising an alloy having the composition represented by a general formula $A\,Ni_a\,Mn_b\,M_c$ where A is at least one element selected from the group consisting of rare earth elements including Y (yttrium), M is a metal mainly composed of at least one element selected from the group consisting of Co, Al, Fe, Si, Cr, Cu, Ti, Zr, Zn, Hf, V, Nb, Ta, Mo, W, Ag, Pd, B, Ga, In, Ge and Sn, $3.5 \leq a \leq 5$, $0.1 \leq b \leq 1$, $0 \leq c \leq 1$, $4.5 \leq a+b+c \leq 6$, wherein when the characteristic X-ray intensity of Mn contained in said alloy is observed by an X-ray microanalyzer in the respective unit regions of said alloy obtained by vertically and horizontally dividing into 100 portions the observation regions of said alloy each composed of a cross sectional area of 20 microns×20 microns, the maximum value among the characteristic X-ray intensity of Mn in said respective observation regions is 1.3 times or less the average value of the characteristic X-ray intensity of Mn in said respective observation regions.

4. A hydrogen-absorbing alloy for a battery according to claim 3, wherein said alloy has columnar structures in which the area ratio of columnar structures having the ratio of a width to a length (aspect ratio) of 1:2 or higher is 50% or more.

5. A hydrogen-absorbing alloy for a battery according to claim 4, wherein said columnar structures have an average width of 30 microns or less.

6. A hydrogen-absorbing alloy for a battery, comprising an alloy having the composition represented by a general formula $A\,Ni_a\,Mn_b\,M_c$ where A is at least one element selected from the group consisting of rare earth elements including Y (yttrium), M is a metal mainly composed of at least one element selected from the group consisting of Co, Al, Fe, Si, Cr, Cu, Ti, Zr, Zn, Hf, V, Nb, Ta, Mo, W, Ag, Pd, B, Ga, In, Ge and Sn, $3.5 \leq a \leq 5$, $0.1 \leq b \leq 1$, $0 \leq c \leq 1$, $4.5 \leq a+b+c \leq 6$, wherein the maximum diameter of the Mn particles segregated in said alloy is 0.5 micron or less.

7. A hydrogen-absorbing alloy for a battery according to claim 6, wherein said alloy has columnar structures in which the area ratio of columnar structures having the ratio of a width to a length (aspect ratio) of 1:2 or higher is 50% or more.

8. A hydrogen-absorbing alloy for a battery according to claim 7, wherein said columnar structures have an average width of 30 microns or less.

9. A hydrogen-absorbing alloy for a battery according to claim 6, wherein when the characteristic X-ray intensity of Mn contained in said alloy is observed by an X-ray microanalyzer in the respective unit regions of said alloy obtained by vertically and horizontally dividing into 100 portions the observation regions of said alloy each composed of a cross sectional area of 20 microns×20 microns, the maximum value among the characteristic X-ray intensity of Mn in said respective observation regions is 1.3 times or less the average value of the characteristic X-ray intensity of Mn in said respective observation regions.

10. A hydrogen-absorbing alloy for a battery according to claim 7, wherein when the characteristic X-ray intensity of Mn contained in said alloy is observed by an X-ray microanalyzer in the respective unit regions of said alloy obtained by vertically and horizontally dividing into 100 portions the observation regions of said alloy each composed of a cross sectional area of 20 microns×20 microns, the maximum value among the characteristic X-ray intensity of Mn in said respective observation regions is 1.3 times or less the average value of the characteristic X-ray intensity of Mn in said respective observation regions.

11. A hydrogen-absorbing alloy for a battery according to claim 8, wherein when the characteristic X-ray intensity of Mn contained in said alloy is observed by an X-ray microanalyzer in the respective unit regions of said alloy obtained by vertically and horizontally dividing into 100 portions the observation regions of said alloy each composed of a cross sectional area of 20 microns×20 microns, the maximum value among the characteristic X-ray intensity of Mn in said respective observation regions is 1.3 times or less the average value of the characteristic X-ray intensity of Mn in said respective observation regions.

12. A hydrogen-absorbing alloy for a battery, wherein at least 90 vol % of said hydrogen-absorbing alloy is composed of $AB_x$ of single phase where A is at least one element selected from the group consisting of rare earth elements including Y (yttrium), B is a metal mainly composed of Ni and at least one element selected from Co, Al, Fe, Si, Cr, Cu, Ti, Zr, Zn, Hf, V, Nb, Ta, Mo, W, Ag, Pd, B, Ga, In, Ge and Sn, $5.05 \leq x \leq 6$.

13. A secondary nickel-metal hydride battery including a negative electrode containing a hydrogen-absorbing alloy and a positive electrode containing nickel oxide, each disposed through a separator and sealed together with an alkaline battery electrolyte, wherein said hydrogen-absorbing alloy comprises an alloy having the composition represented by a general formula $A\,Ni_a\,Mn_b\,M_c$ where A is at least one element selected from the group consisting of rare earth elements including Y (yttrium), M is a metal mainly composed of at least one element selected from the group consisting of Co, Al, Fe, Si, Cr, Cu, Ti, Zr, Zn, Hf, V, Nb, Ta, Mo, W, Ag, Pd, B, Ga, In, Ge and Sn, $3.5 \leq a \leq 5$, $0.1 \leq b \leq 1$, $0 \leq c \leq 1$, $4.5 \leq a+b+c \leq 6$, and said alloy has columnar structures in which an area ratio of the columnar structures having the ratio of a width to a length (aspect ratio) of 1:2 or higher is 50% or more, and said columnar structures have an average width of 30 microns or less.

14. A secondary nickel-metal hydride battery including a negative electrode containing a hydrogen-absorbing alloy and a positive electrode containing nickel oxide, each disposed through a separator and sealed together with an alkaline battery electrolyte, wherein said hydrogen-absorbing alloy comprises an alloy having the composition represented by a general formula $A\,Ni_a\,Mn_b\,M_c$ where A is at least one element selected from the group consisting of rare earth elements including Y (yttrium), M is a metal mainly composed of at least one element selected from the group consisting of Co, Al, Fe, Si, Cr, Cu, Ti, Zr, Zn, Hf, V, Nb, Ta, Mo, W, Ag, Pd, B, Ga, In, Ge and Sn, $3.5 \leq a \leq 5$, $0.1 \leq b \leq 1$, $0 \leq c \leq 1$, $4.5 \leq a+b+c \leq 6$ and when the characteristic X-ray intensity of Mn contained in said alloy is observed by an X-ray microanalyzer in the respective unit regions of said alloy obtained by vertically and horizontally dividing into 100 portions the observation regions of said alloy each composed of a cross sectional area of 20 microns×20 microns, the maximum value among the characteristic X-ray intensity of Mn in said respective observation regions is 1.3 times or less the average value of the characteristic X-ray intensity of Mn in said respective observation regions.

15. A secondary nickel-metal hydride battery according to claim 14, wherein said alloy has columnar structures in which an area ratio of columnar structures having the ratio of a width to a length (aspect ratio) of 1:2 or higher is 50% or more.

16. A secondary nickel-metal hydride battery according to claim 14, wherein said columnar structures have an average width of 30 microns or less.

17. A secondary nickel-metal hydride battery including a negative electrode containing a hydrogen-absorbing alloy and a positive electrode containing nickel oxide, each disposed-through a separator and sealed together with an alkaline battery electrolyte, wherein said hydrogen-absorbing alloy comprises an alloy having the composition represented by a general formula $A\,Ni_a\,Mn_b\,M_c$ where A is at least one element selected from the group consisting of rare earth elements including Y (yttrium), M is a metal mainly composed of at least one element selected from the group consisting of Co, Al, Fe, Si, Cr, Cu, Ti, Zr, Zn, Hf, V, Nb, Ta, Mo, W, Ag, Pd, B, Ga, In, Ge and Sn, $3.5 \leq a \leq 5$, $0.1 \leq b \leq 1$, $0 \leq c \leq 1$, $4.5 \leq a+b+c \leq 6$ and the maximum diameter of the Mn particles segregated in said alloy is 0.5 micron or less.

18. A secondary nickel-metal hydride battery according to claim 17, wherein said alloy has columnar structures in which the area ratio of columnar structures having the ratio of a width to a length (aspect ratio) of 1:2 or higher is 50% or more.

19. A secondary nickel-metal hydride battery according to claim 18, wherein columnar structures have an average width of 30 microns or less.

20. A secondary nickel-metal hydride battery according to claim 17, wherein when the characteristic X-ray intensity of Mn contained in said alloy is observed by an X-ray microanalyzer in the respective unit regions of said alloy obtained by vertically and horizontally dividing into 100 portions the observation regions of said alloy each composed of a cross sectional area of 20 microns×20 microns, the maximum value among the characteristic X-ray intensity of Mn in said respective observation regions is 1.3 times or less the average value of the characteristic X-ray intensity of Mn in said respective observation regions.

21. A secondary nickel-metal hydride battery according to claim 18, wherein when the characteristic X-ray intensity of Mn contained in said alloy is observed by an X-ray microanalyzer in the respective unit regions of said alloy obtained by vertically and horizontally dividing into 100 portions the observation regions of said alloy each composed of a cross sectional area of 20 microns×20 microns, the maximum value among the characteristic X-ray intensity of Mn in said respective observation regions is 1.3 times or less the average value of the characteristic X-ray intensity of Mn in said respective observation regions.

22. A secondary nickel-metal hydride battery according to claim 21, wherein said columnar structures have an average width of 30 microns or less.

23. A secondary nickel-metal hydride battery including a negative electrode containing a hydrogen-absorbing alloy and a positive electrode containing nickel oxide, each disposed through a separator and sealed together with an alkaline battery electrolyte, wherein at least 90 vol % of said hydrogen-absorbing alloy is composed of $AB_x$ of single phase where A is at least one element selected from the group consisting of rare earth elements including Y (yttrium), B is a metal mainly composed of Ni and at least one element selected from the group consisting of Co, Al, Fe, Si, Cr, Cu, Ti, Zr, Zn, Hf, V, Nb, Ta, Mo, W, Ag, Pd, B, Ga, In, Ge and Sn, $5.05 \leq x \leq 6$.

24. A secondary nickel-metal hydride battery, wherein a hydrogen-absorbing alloy is composed of a rapidly-quenched molten alloy, the amount of an alkaline battery electrolyte is within the range of from 0.4–1.8 ml/Ah to the capacity of the hydrogen-absorbing alloy of a negative electrode, and the alloy capacity ratio in the uncharged state of the hydrogen-absorbing alloy of a negative electrode to the capacity of the nickel oxide of the positive electrode is within the range of from 1.1 to 2.0 in a battery discharged state.

25. A secondary nickel-metal hydride battery comprising a negative electrode having an alloy with the composition represented by a general formula $A Ni_a Mn_b M_c$ where A is at least one element selected from the group consisting of rare earth elements including Y (yttrium), M is a metal mainly composed of at least one element selected from the group consisting of Co, Al, Fe, Si, Cr, Cu, Ti, Zr, Zn, Hf, V, Nb, Ta, Mo, W, Ag, Pd, B, Ga, In, Ge and Sn, $3.5 \leq a \leq 5$, $0.1 \leq b \leq 1$, $0 \leq c \leq 1$, $4.5 \leq a+b+c \leq 6$, wherein:

said alloy has columnar structures in which an area ratio of the columnar structures having the ratio of a width to a length (aspect ratio) of 1:2 or higher is 50% or more; and the ratio of the number of said alloy with the columnar structures with respect to the number of the entire particles of the hydrogen-absorbing alloy having metal structures which can be visually recognized is 30% or more.

26. The alloy as claimed in claim 1, wherein said alloy is prepared by a process comprising the steps of:

injecting a molten alloy having the composition represented by general formula $A Ni_a Mn_b M_c$ where A is at least one element selected from rare earth elements including Y (yttrium), M is a metal mainly composed of at least one element selected from Co, Al, Fe, Si, Cr, Cu, Ti, Zr, Zn, Hf, V, Nb, Ta, Mo, W, Ag, Pd, B, Ga, In, Ge and Sn, $3.5 \leq a \leq 5$, $0.1 \leq b \leq 1$, $0 \leq c \leq 1$, $4.5 \leq a+b+c \leq 6$ onto a traveling surface of a cooling roll(s) rotating at a high speed, and rapidly quenching and solidifying said molten alloy at a quenching rate of 1800° C./sec. or higher to prepare a rapidly-quenched molten alloy to provide said hydrogen-absorbing alloy for battery.

* * * * *